United States Patent
Watanabe

(10) Patent No.: US 9,430,760 B2
(45) Date of Patent: Aug. 30, 2016

(54) CONTENT DATA DISTRIBUTION SYSTEM, ON-VEHICLE APPARATUS, SERVER, COMMUNICATION TERMINAL, AND LICENSE ISSUING METHOD

(71) Applicant: JVC KENWOOD Corporation, Yokohama-shi (JP)

(72) Inventor: Yuki Watanabe, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 14/473,661

(22) Filed: Aug. 29, 2014

(65) Prior Publication Data

US 2014/0372317 A1    Dec. 18, 2014

Related U.S. Application Data

(63) Continuation of application No. PCT/JP2013/062785, filed on May 2, 2013.

(30) Foreign Application Priority Data

| May 23, 2012 | (JP) | 2012-117434 |
| May 23, 2012 | (JP) | 2012-117869 |
| May 23, 2012 | (JP) | 2012-117870 |
| May 23, 2012 | (JP) | 2012-117871 |
| May 23, 2012 | (JP) | 2012-117872 |

(51) Int. Cl.
*G06F 21/00* (2013.01)
*G06Q 20/12* (2012.01)
(Continued)

(52) U.S. Cl.
CPC ............ *G06Q 20/1235* (2013.01); *G06F 21/10* (2013.01); *G06Q 50/10* (2013.01); *G06Q 90/00* (2013.01); *G06Q 2220/18* (2013.01)

(58) Field of Classification Search
CPC .................................................. G06Q 2220/18
USPC ............................................................ 705/59
See application file for complete search history.

(56) References Cited

U.S. PATENT DOCUMENTS

2005/0119977 A1    6/2005   Raciborski
2007/0255659 A1   11/2007   Yen et al.
(Continued)

FOREIGN PATENT DOCUMENTS

JP    2007-207066 A    8/2007
JP    2007-524921 A    8/2007
(Continued)

OTHER PUBLICATIONS

International Search Report and Written Opinion in PCT International Application No. PCT/JP2013/062785, dated Jul. 9, 2013.

*Primary Examiner* — Charles C Agwumezie
(74) *Attorney, Agent, or Firm* — Venable LLP; Michael A. Sartori

(57) ABSTRACT

An on-vehicle apparatus transmits first license request information to content to be purchased, to a server, and receives content data, to which a first license issued by the server based on the first license request information is added, from the server. The server transmits the content data, to which the first license is added based on the first license request information, to the on-vehicle apparatus, transmits second license request urging information to a communication terminal based on driving end notification information, and issues a second license to the content data based on the second license request information. The communication terminal transmits driving end notification information to the server based on determination that driving of a vehicle having the on-vehicle apparatus mounted thereon is ended, and transmits second license request information according to the second license request urging information to the server.

3 Claims, 61 Drawing Sheets

(51) Int. Cl.
*G06Q 50/10* (2012.01)
*G06Q 90/00* (2006.01)
*G06F 21/10* (2013.01)

(56) References Cited

U.S. PATENT DOCUMENTS

2009/0265539 A1* 10/2009 Koyasu .............. H04L 9/0838
                                                                713/150
2011/0302662 A1* 12/2011 Kannari ............ G06Q 20/1235
                                                                726/29
2012/0101660 A1* 4/2012 Hattori ................ G05D 1/0022
                                                                701/2

FOREIGN PATENT DOCUMENTS

| JP | 2008-198109 A | 8/2008 |
| JP | 2009-535992 A | 10/2009 |
| JP | 2012-018662 A | 1/2012 |

* cited by examiner

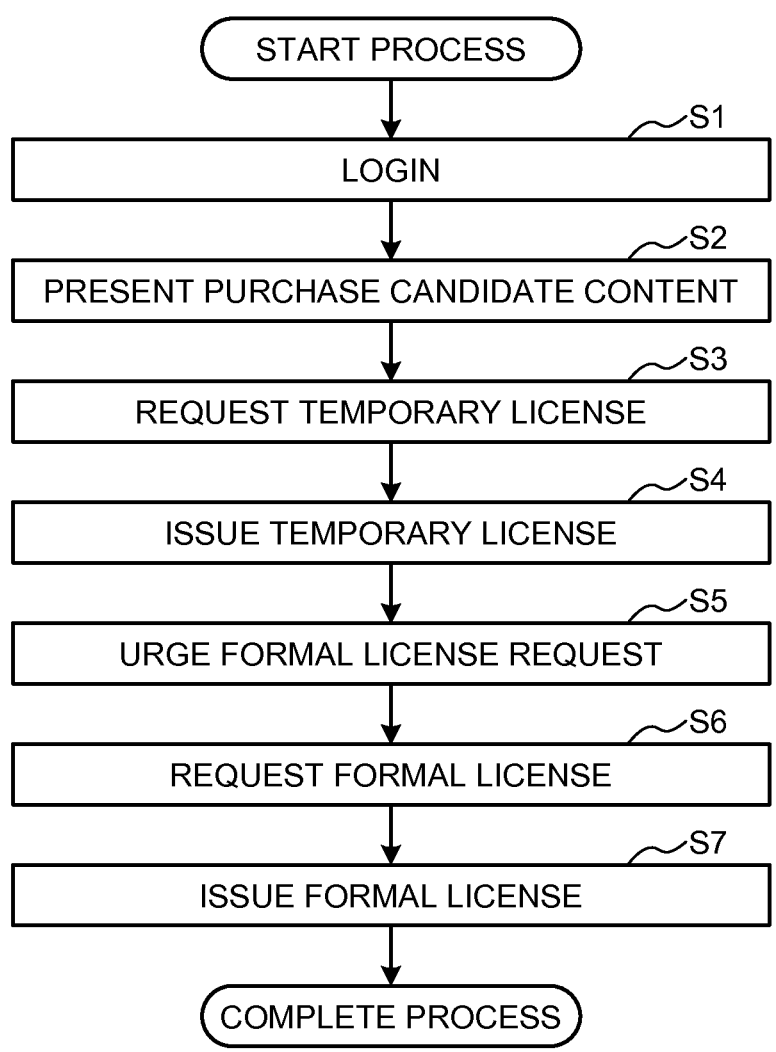

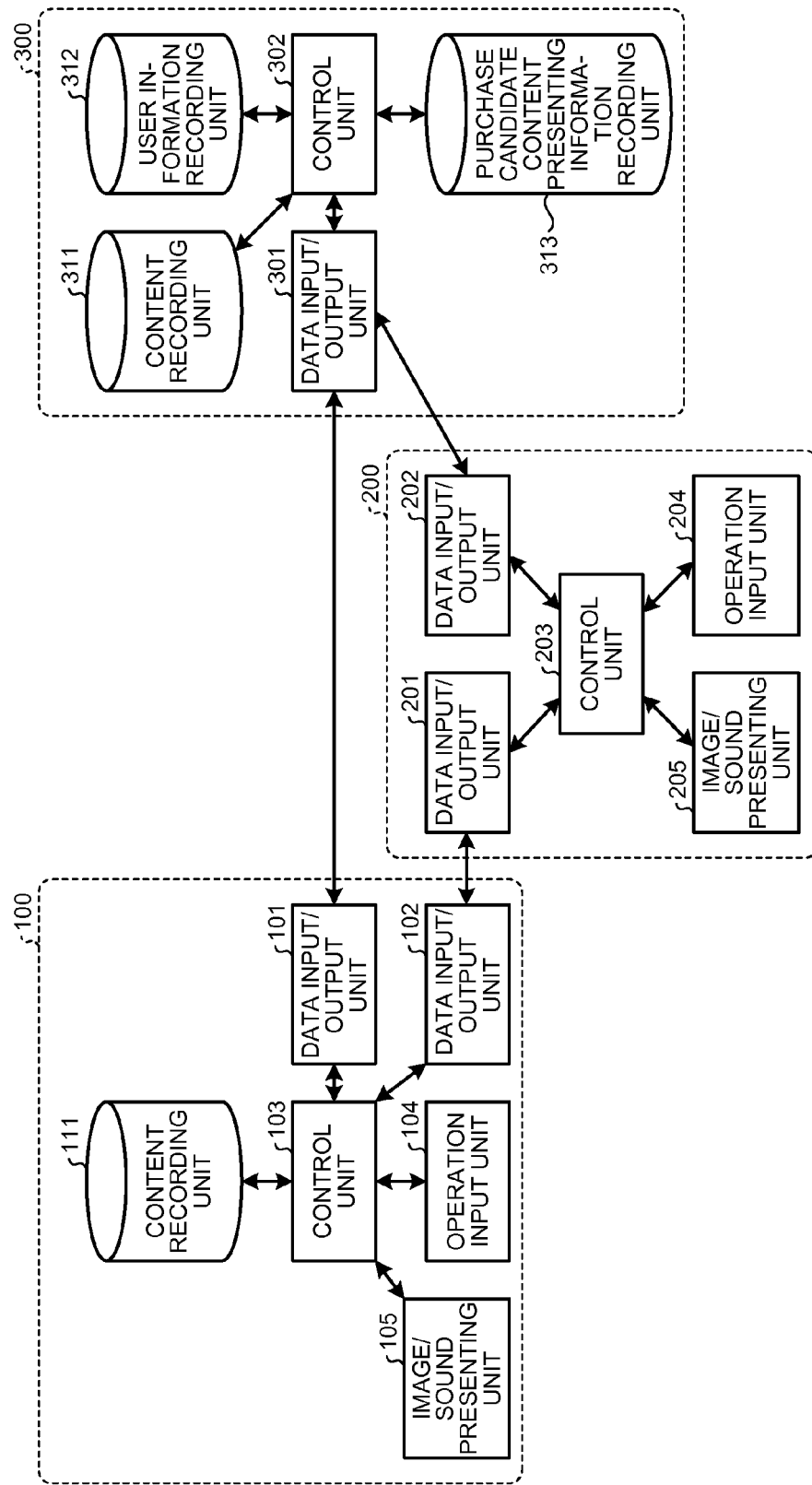

FIG.4

| CONTENT ID INFORMATION | PURCHASE DATE AND TIME INFORMATION | RECORDING AREA INFORMATION |
|---|---|---|
| CID_1 | - | /data/a/01.mp4 |
| CID_2 | 2011/11/03 20:22:30 | /data/a/02.mp4 |
| CID_3 | 2011/12/10 07:35:22 | - |

CONTENT MANAGEMENT INFORMATION FOLLOWS RULE DESCRIBED BELOW.
- CONTENT WHOSE RECORD IS NOT PRESENT=NOT PREVIEWED AND NOT PURCHASED
- PURCHASE DATE AND TIME INFORMATION IS UNSET AND RECORDING AREA INFORMATION IS UNSET=PREVIEWED (DATA IS NOT ACQUIRED)
- PURCHASE DATE AND TIME INFORMATION IS UNSET, AND RECORDING AREA INFORMATION IS ALREADY SET=PREVIEWED (DATA IS ALREADY ACQUIRED)
- PURCHASE DATE AND TIME INFORMATION IS ALREADY SET, AND RECORDING AREA INFORMATION IS UNSET=PURCHASED (DATA IS NOT ACQUIRED)
- PURCHASE DATE AND TIME INFORMATION IS ALREADY SET, AND RECORDING AREA INFORMATION IS ALREADY SET=PURCHASED (DATA IS ALREADY ACQUIRED)

FIG.6

| CONANT ID INFORMATION | PREVIEW DATE AND TIME INFORMATION | PURCHASE DATE AND TIME INFORMATION |
|---|---|---|
| CID_1 | - | - |
| CID_2 | 2011/11/03 19:41:10 | 2011/11/03 20:22:30 |
| CID_3 | - | 2011/12/10 07:35:22 |

THE ABOVE-DESCRIBED USE HISTORY INFORMATION FOLLOWS RULE BELOW.
- CONTENT WHOSE RECORD IS NOT PRESENT = NOT PREVIEWED AND NOT PURCHASED
- CONTENT WHOSE RECORD WITH PURCHASE DATE AND TIME INFORMATION BEING UNSET = PREVIEWED AND NOT PURCHASED
- CONTENT WITH PURCHASE DATE AND TIME INFORMATION BEING ALREADY SET = PURCHASED

FIG.7

| | | |
|---|---|---|
| MAIL ADDRESS INFORMATION | user@user.com | 3301 |
| USER NAME INFORMATION | user | 3302 |
| PASSWORD INFORMATION | passwd | 3303 |
| LOGIN DATE AND TIME INFORMATION | 2011:12/23 09:12:23 | 3304 |
| LOGOUT DATE AND TIME INFORMATION | 2011:12/23 12:12:48 | 3305 |
| LOGIN CONFIRMATION DATE AND TIME INFORMATION | 2011:12/23 12:09:05 | 3306 |
| MAIL TRANSMISSION DATE AND TIME INFORMATION | 2011:12/23 12:20:48 | 3307 |

3300

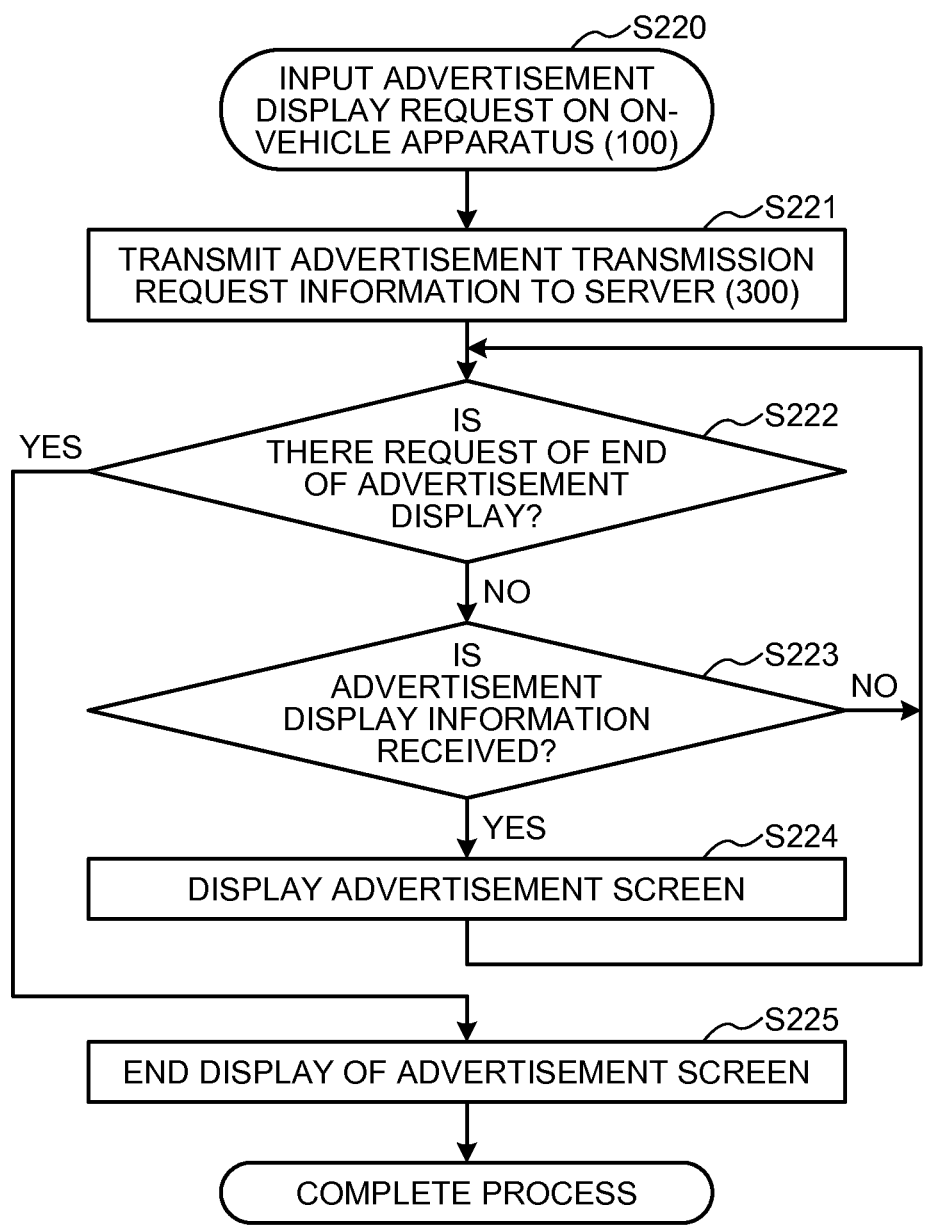

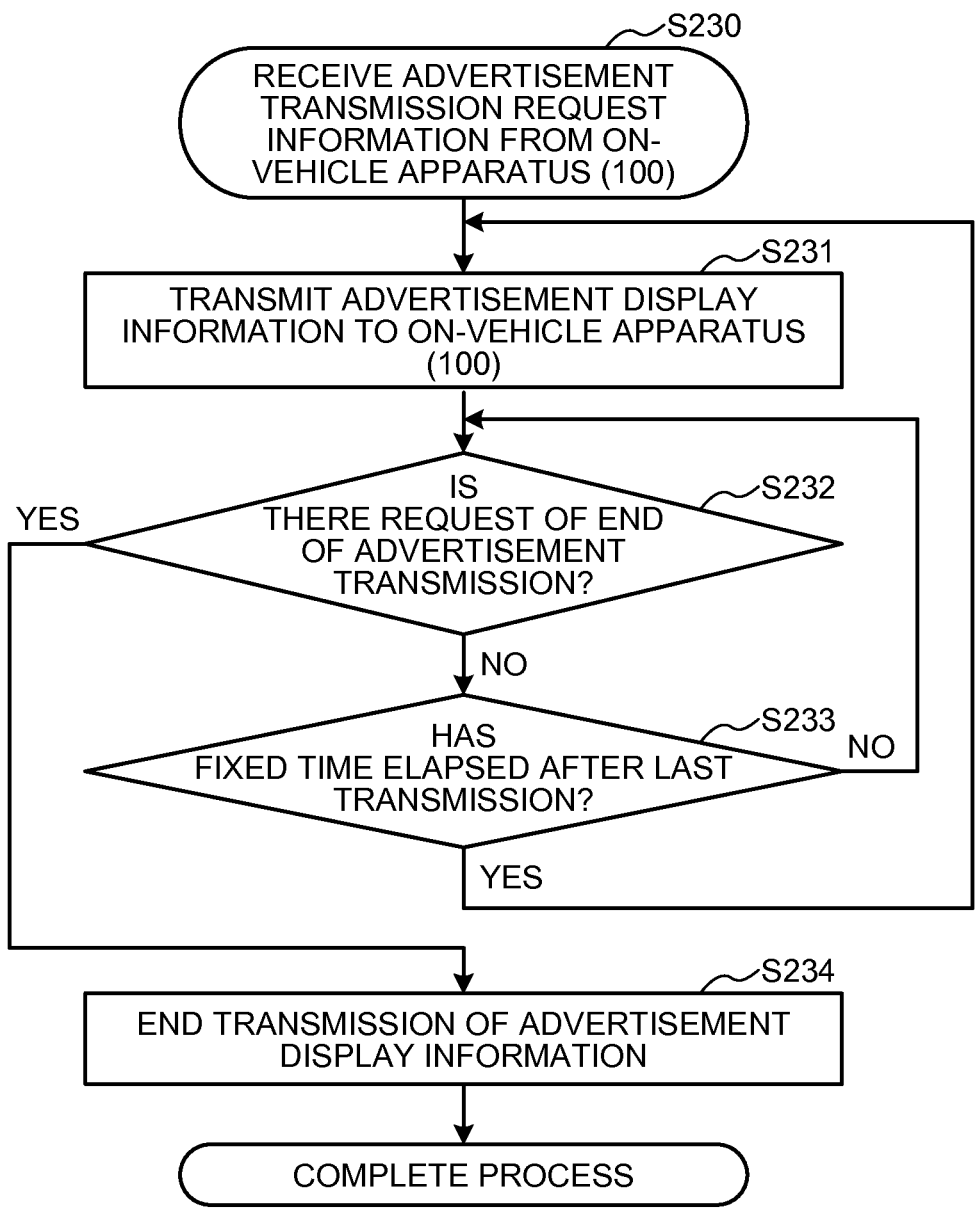

| | REQUEST OF TEMPORARY LICENSE | REQUEST OF FORMAL LICENSE |
|---|---|---|
| 1 | SOUND INPUT | MANUAL OPERATION INPUT |
| 2 | OPERATING TIME (SMALL) | OPERATING TIME (LARGE) |
| 3 | SELECTION OPERATION (TOUCH OPERATION) | CHARACTER INPUT |
| 4 | NUMBER OF INPUT ITEMS (SMALL) | NUMBER OF INPUT ITEMS (LARGE) |

FIG.47

| CONTENT ID INFORMATION | RECORDING AREA INFORMATION (WITH RESTRICTION) | RECORDING AREA INFORMATION (WITH NO RESTRICTION) | ATTRIBUTE INFORMATION | |
|---|---|---|---|---|
| | | | TITLE | ARTIST |
| CID_1 | /data/a/01.mp4 | /data/b/01.mp4 | AAA | ○○○ |
| CID_2 | /data/a/02.mp4 | /data/b/02.mp4 | BBB | ××× |
| CID_3 | /data/a/03.mp4 | /data/b/03.mp4 | CCC | △△△ |
| ... | | | | |

FIG.48

| CONTENT ID INFORMATION | PURCHASE DATE AND TIME INFORMATION | RECORDING AREA INFORMATION | KEY RECORDING AREA INFORMATION |
|---|---|---|---|
| CID_1 | — | /data/a/01.mp4 | /data/b/01.key |
| CID_2 | 2011/11/03 20:22:30 | /data/a/02.mp4 | /data/b/02.key |
| CID_3 | 2011/12/10 07:35:22 | — | — |

FIG.49

| CONTENT ID INFORMATION | RECORDING AREA INFORMATION (WITH RESTRICTION) | KEY RECORDING AREA INFORMATION | ATTRIBUTE INFORMATION | |
|---|---|---|---|---|
| | | | TITLE | ARTIST |
| CID_1 | /data/a/01.mp4 | /data/b/01.key | AAA | ○○○ |
| CID_2 | /data/a/02.mp4 | /data/b/02.key | BBB | ××× |
| CID_3 | /data/a/03.mp4 | /data/b/03.key | CCC | △△△ |
| ... | ... | ... | ... | ... |

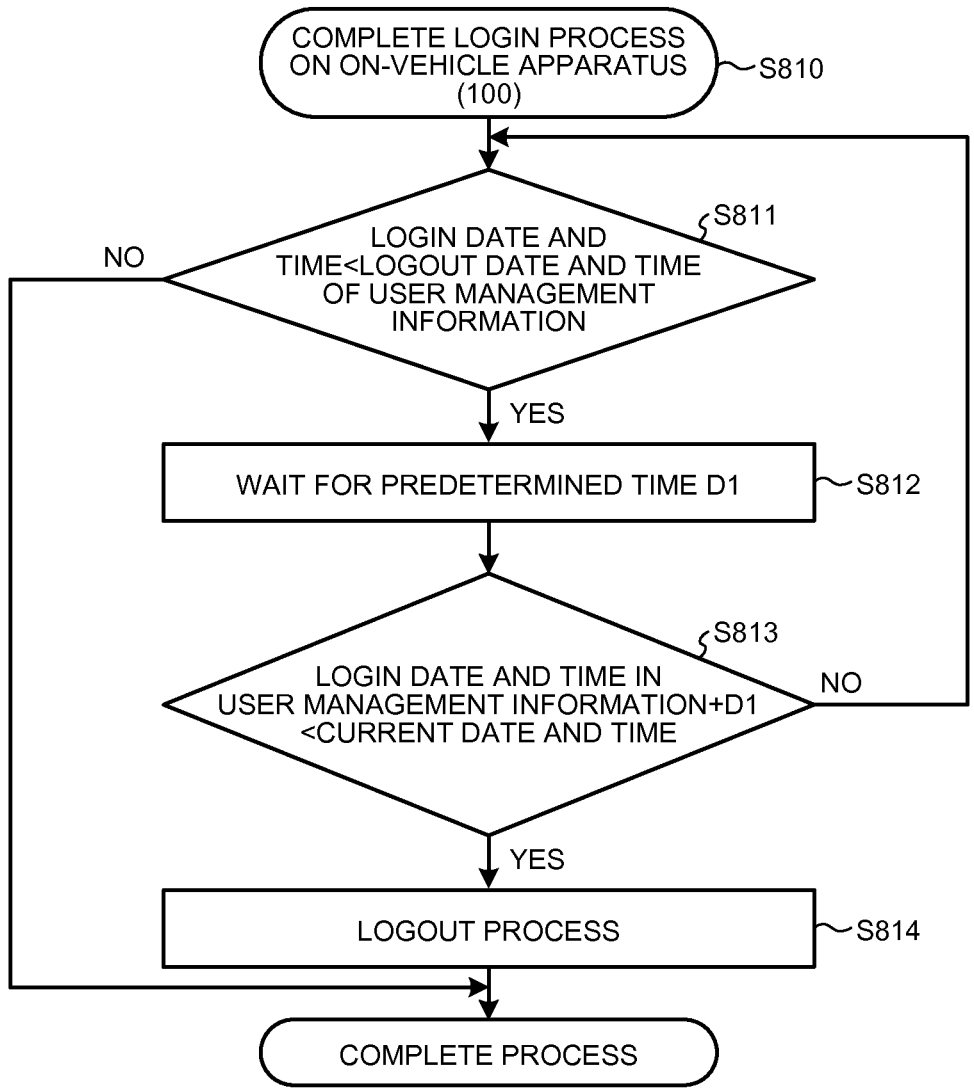

CONTENT DATA DISTRIBUTION SYSTEM, ON-VEHICLE APPARATUS, SERVER, COMMUNICATION TERMINAL, AND LICENSE ISSUING METHOD

CROSS-REFERENCE TO RELATED APPLICATION(S)

This application is a continuation of International Application No. PCT/JP2013/062785, filed on May 2, 2013 which claims the benefit of priority from Japanese Patent Applications No. 2012-117434, No. 2012-117869, No. 2012-117870, No. 2012-117871 and No. 2012-117872, filed on May 23, 2012, the entire contents of all of which are incorporated herein by reference.

BACKGROUND OF THE INVENTION

1. Field of the Invention

The present invention relates to a content data distribution system, an on-vehicle apparatus, a server, a communication terminal, and a license issuing method.

2. Description of the Related Art

In the related art, there is studied a technology in which a user purchases, downloads, and obtains content such as music via the Internet (e.g., Patent Literatures 1 and 2). For example, Patent Literature 2 discloses a music purchasing system including a music providing server that provides music data, and a communication terminal by which music data provided by the music providing server is purchased. When receiving reservation process request data requesting a process relating to a purchase reservation of music data from the communication terminal before a release date and time of the music data, the music providing server transmits the music data to the communication terminal. Furthermore, when receiving reserved music purchase request data requesting the purchase of the music data reserved for purchase from the communication terminal after the release date and time, the music providing server transmits license data for allowing the use of the music data to the communication terminal. This license data has a data amount less than the music data. As a result, the music data can promptly be provided, even if requests of plural communication terminals for the purchase of the music data are concentrated after the release date and time.

Patent Literature 1: JP 2007-524921 A

Patent Literature 2: JP 2008-198109 A

On the other hand, there is a demand of downloading and using content such as music on an on-vehicle apparatus such as a car navigation system and a car audio, even while driving a vehicle.

Here, when content such as music is purchased via the Internet, generally there is a need for complicated input operation such as operation of inputting a name of a user (ID), a password, credit card information including a credit card number and the like, and operation of inputting a response to an inquiry confirming the detail of the purchase. However, when the similar operation is required on the on-vehicle apparatus in the case where the user purchases the content via the Internet, the user has to perform the complicated input operation while driving the vehicle, and this is very dangerous. On the other hand, there is the case where the user wants to download and acquire content such as music data even while driving. An example of such a case includes, for example, the case where the user is listening music on the radio while driving, likes the music and wishes to listen again the music while driving even after the reproduction of this music on the radio is ended.

SUMMARY OF THE INVENTION

It is an object of the present invention to at least partially solve the problems in the conventional technology.

The present invention provides a content data distribution system including an on-vehicle apparatus, a communication terminal, and a server, the on-vehicle apparatus includes: a first license request input unit configured to receive an input of a first license request to content to be purchased; a first license request information generating unit configured to generate first license request information based on the inputted first license request; a first license request information transmission unit configured to transmit the first license request information to the server; and a content data receiving unit configured to receive content data, to which a first license issued by the server based on the transmitted first license request information is added, from the server, and the server includes: a first license request information receiving unit configured to receive the first license request information from the on-vehicle apparatus; a first license issuing unit configured to issue the first license based on the received first license request information; a content data transmission unit configured to transmit content data, to which the issued first license is added, to the on-vehicle apparatus; a driving end notification information receiving/generating unit configured to receive or generate driving end notification information indicating that driving of a vehicle having the on-vehicle apparatus mounted thereon is ended; a second license request urging information generating unit configured to generate second license request urging information for urging a second license request based on the driving end notification information; a second license request urging information transmission unit configured to transmit the generated second license request urging information to the communication terminal; a second license request information receiving unit configured to receive second license request information; and a second license issuing unit configured to issue a second license to the content data based on the received second license request information, wherein any one of the on-vehicle apparatus and the communication terminal includes: a second license request urging information receiving unit configured to receive the second license request urging information from the server; a second license request input unit configured to receive an input of a second license request based on presentation according to the received second license request urging information; a second license request information generating unit configured to generate second license request information based on the inputted second license request; a second license request information transmission unit configured to transmit the generated second license request information to the server; a driving end notification information generating unit configured to generate the driving end notification information based on determination that the driving of the vehicle having the on-vehicle apparatus mounted thereon is ended; and a driving end notification information transmission unit configured to transmit the generated driving end notification information to the server, and wherein the input of the first license request is easier than the input of the second license request.

The present invention also provides an on-vehicle apparatus mounted on a vehicle, the on-vehicle apparatus comprising: a first license request input unit configured to receive an input of a first license request to content to be purchased; a first license request information generating unit configured to generate first license request information based on the inputted first license request; a first license request information transmission unit configured to transmit the first license request information to outside; a content data receiving unit configured to receive content data, to which a first license issued based on the transmitted first license request information is added, from the outside; a driving end notification information generating unit configured to generate driving end notification information based on determination that driving of the vehicle is ended; a driving end notification information transmission unit configured to transmit the generated driving end notification information to the outside; a second license request urging information receiving unit configured to receive second license request urging information, which is generated based on the transmitted driving end notification information and is for urging a second license request, from the outside; a second license request input unit configured to receive an input of a second license request based on presentation according to the received second license request urging information; a second license request information generating unit configured to generate second license request information based on the inputted second license request; and a second license request information transmission unit configured to transmit the generated second license request information to the outside, wherein the input of the first license request is easier than the input of the second license request.

The present invention further provides a server comprising: a first license request information receiving unit configured to receive, from an on-vehicle apparatus, first license request information to content to be purchased; a first license issuing unit configured to issue a first license based on the received first license request information; a content data transmission unit configured to transmit content data, to which the issued first license is added, to the on-vehicle apparatus; a driving end notification information receiving unit configured to receive driving end notification information, which is generated based on determination that driving of a vehicle having the on-vehicle apparatus mounted thereon is ended, from the on-vehicle apparatus; a second license request urging information generating unit configured to generate second license request urging information for urging a second license request based on the received driving end notification information; a second license request urging information transmission unit configured to transmit the generated second license request urging information to a communication terminal; a second license request information receiving unit configured to receive, from the communication terminal, second license request information that is generated according to the transmitted second license request urging information; and a second license issuing unit configured to issue a second license to the content data based on the received second license request information.

The present invention also provides a communication terminal comprising: a driving end notification information generating unit configured to generate driving end notification information based on determination that driving of a vehicle having an on-vehicle apparatus mounted thereon is ended; a driving end notification information transmission unit configured to transmit the generated driving end notification information to a server; a second license request urging information receiving unit configured to receive second license request urging information, which is information generated by the server based on the transmitted driving end notification information, and which is for content data to which a first license is issued according to a request from the on-vehicle apparatus, from the server; a second license request input unit configured to receive an input of a second license request based on presentation according to the received second license request urging information; a second license request information generating unit configured to generate second license request information based on the inputted second license request; and a second license request information transmission unit configured to transmit the generated second license request information to the server.

The present invention further provides a license issuing method comprising: a first license request information receiving step of receiving first license request information to content to be purchased, from an on-vehicle apparatus; a first license issuing step of issuing a first license based on the received first license request information; a content data transmission step of transmitting content data, to which the issued first license is added, to the on-vehicle apparatus; a driving end notification information receiving step of receiving driving end notification information generated based on determination that driving of a vehicle having the on-vehicle apparatus mounted thereon is ended; a second license request urging information generating step of generating second license request urging information for urging a second license request based on the received driving end notification information; a second license request urging information transmission step of transmitting the generated second license request urging information; a second license request information receiving step of receiving second license request information generated according to the transmitted second license request urging information; and a second license issuing step of issuing a second license to the content data based on the received second license request information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a process flow illustrating a schematic process of the content data distribution system according to the embodiment of the present invention;

FIG. 3 is a block diagram illustrating an example of the configuration of the content data distribution system according to the embodiment of the present invention;

FIG. 4 is a diagram illustrating one example of content management information stored in a content recording unit of an on-vehicle apparatus according to the embodiment of the present invention;

FIG. 6 is a diagram illustrating one example of use history information stored in the content recording unit of the server according to the embodiment of the present invention;

FIG. 7 is a diagram illustrating one example of user management information stored in a user information recording unit of the server according to the embodiment of the present invention;

FIG. 18 is a process flow illustrating a process of the on-vehicle apparatus upon an advertisement display request according to the embodiment of the present invention;

FIG. 19 is a process flow illustrating a process of the server upon receiving an advertisement display request according to the embodiment of the present invention;

FIG. 47 is a diagram illustrating content management information of the server in the case of executing the management method by means of re-issuance of formal content data;

FIG. 48 is a diagram illustrating content management information of the on-vehicle apparatus in the case of executing a management method by means of a key;

FIG. 49 is a diagram illustrating content management information of the server in the case of executing the management method by means of a key;

FIG. 60 is a process flow illustrating an automatic logout process of the server according to the modification of the embodiment of the present invention.

DETAILED DESCRIPTION OF THE PREFERRED EMBODIMENTS

1. Schematic Configuration of Content Data Distribution System 1

Figure 1:
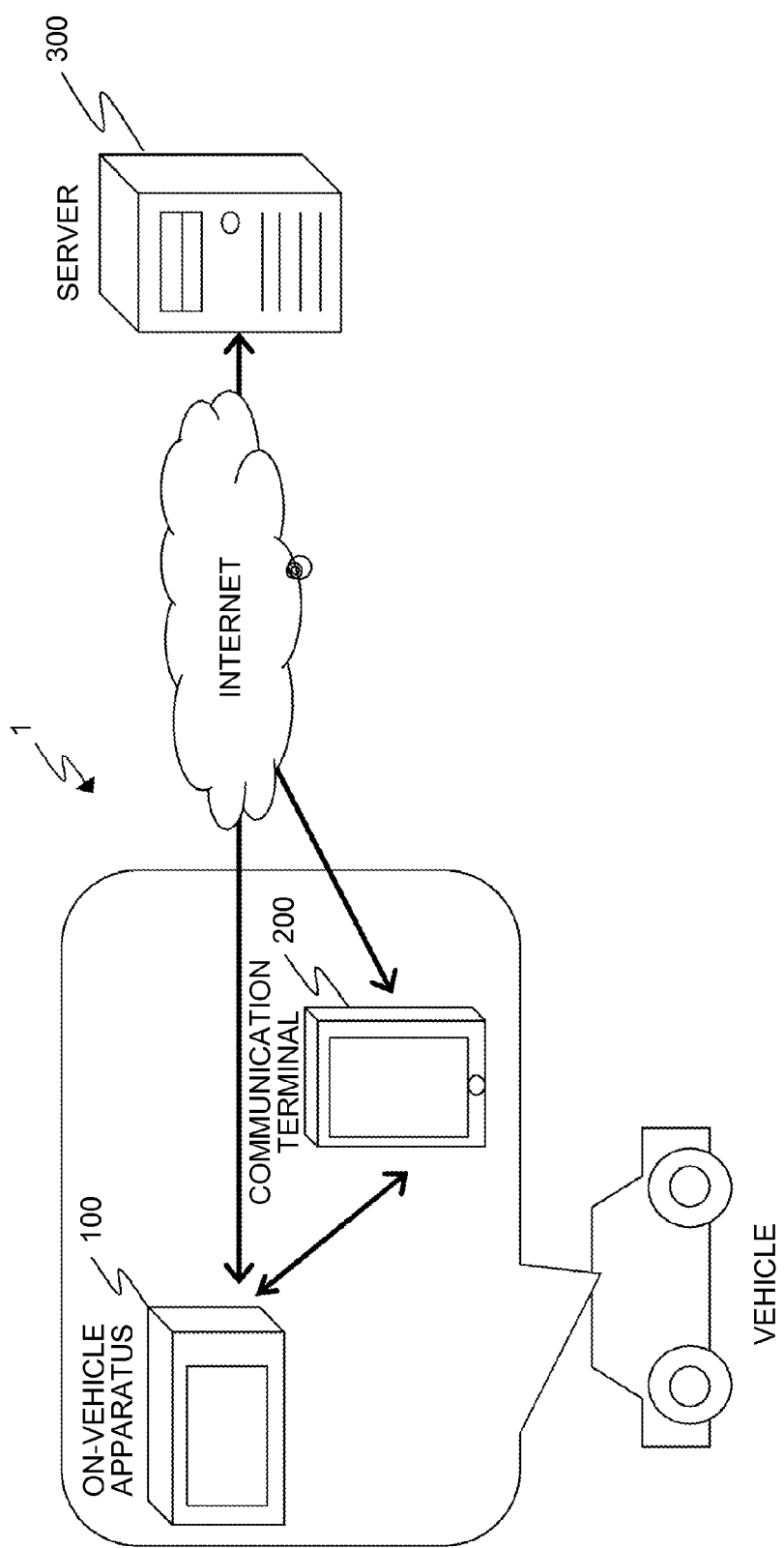
FIG. 1 is a block diagram illustrating an example of a schematic configuration of a content data distribution system according to an embodiment of the present invention.

Firstly, a schematic configuration of a content data distribution system 1 according to an embodiment of the present invention will be described with reference to FIG. 1. FIG. 1 is a block diagram illustrating an example of a schematic configuration of the content data distribution system 1 according to the embodiment of the present invention.

The content data distribution system 1 includes an on-vehicle apparatus 100, a communication terminal 200, and a content providing apparatus (server) 300. The on-vehicle apparatus 100 is mounted on a vehicle. The communication terminal 200 is a communication terminal such as a mobile telephone carried by a user driving the vehicle.

The on-vehicle apparatus 100, the communication terminal 200, and the server 300 transmit and receive any information to and from one another via the Internet. More specifically, the on-vehicle apparatus 100 and the communication terminal 200 are connected to the Internet via a mobile telephone network. Specifically, the on-vehicle apparatus 100 and the communication terminal 200 transmit and receive information to and from each other through wireless communication using a wireless communication standard for a mobile telephone. Any wireless communication standard for a cellular phone, such as 3G, 3.5G, and 4G, can be used for the wireless communication standard. Furthermore, the server 300 transmits and receives information to and from the on-vehicle apparatus 100 or the communication terminal 200 by using any communication standard for the connection to the Internet, through wired communication or wireless communication. Note that it is obvious that the information transmitted and received in this case is transmitted and received via a mobile phone base station and a gateway or the like connecting a mobile phone network and the Internet, so that the illustration and description thereof will be omitted.

The on-vehicle apparatus 100 and the communication terminal 200 can also directly transmit and receive any information to and from each other through wireless communication. Any wireless communication standard such as Bluetooth (registered trademark) and Wi-Fi (registered trademark) can be used for this wireless communication. The on-vehicle apparatus 100 and the communication terminal 200 can also transmit and receive any information through wired communication. For example, wired communication is made possible by connecting the on-vehicle apparatus 100 and the communication terminal 200 with any wired connection standard including a USB (Universal Serial Bus).

The on-vehicle apparatus 100 is, for example, an AV-integrated car navigation system or a car audio system. The on-vehicle apparatus 100 can reproduce various kinds of content. Here, the content includes sound content indicating sound, and moving image content indicating a moving image. The moving image content includes moving image content with sound having both a moving image and sound added thereto, and moving image content without sound having only a moving image and having no sound added thereto. In other words, the sound content includes sound information indicating sound as this content, the moving image content with sound includes sound information and image information respectively indicating sound and an image as this content, and the moving image content without sound includes image information indicating an image as the content. Examples of the sound content include music, a lecture, an audio drama, and a radio program. Examples of the moving image content include a movie, a drama, an animation, a music video, and a television program.

The on-vehicle apparatus 100 downloads content data indicating content a user intends to purchase from the server 300, and reproduces the content based on the downloaded content data. The on-vehicle apparatus 100 also presents, to a user, content that becomes a candidate for purchase (hereinafter merely referred to as "purchase candidate content") in order to enable the user to utilize content with simple operation while driving a vehicle. The on-vehicle apparatus 100 receives purchase candidate content presenting information involved with a presentation detail of the purchase candidate content from the server 300, and, for example, displays the purchase candidate content on a liquid crystal monitor based on the received purchase candidate content presenting information, thereby presenting the purchase candidate content to the user.

The user performs a predetermined simple input with respect to the purchase candidate content presented by the on-vehicle apparatus 100 and requests download of the content data. Then, when plural pieces of purchase candidate content are presented, the content data involved with the content selected by the user's simple input is downloaded, and when only one piece of purchase candidate content is presented, the content data with a predetermined restriction involved with this content is downloaded from the server. Hereinafter, the download of the content data with the predetermined restriction is referred to as download of content data with a temporary license. Note that the predetermined simple input will be described later in detail.

The download of content data with a temporary license enables the user to use the content in the on-vehicle apparatus 100 without any complicated procedure for purchasing the content. The on-vehicle apparatus 100 transmits to the server 300 temporary license request information requesting of the server issuance of a temporary license for the content to which a predetermined simple procedure is executed, thereby acquiring the content data with a temporary license from the server 300.

In such a way, the user can download and use content data without performing a troublesome procedure for purchasing content, and the user can more easily or safely use content even while driving (traveling or on board a vehicle).

The communication terminal 200 is an information processing apparatus having a communication function such as a cellular phone, a PHS (Personal Handyphone System), a tablet PC (Personal Computer), and a notebook-type PC. The cellular phone includes a so-called smartphone.

The on-vehicle apparatus 100 or the communication terminal 200 receives from the server 300 a notification mail (hereinafter referred to as a "purchasing procedure mail") urging the user to perform a procedure for purchasing the content, when the user is not driving the vehicle. The purchasing procedure mail also includes predetermined URL information, and the user can access to a web page for performing the procedure for purchasing the content and performs the procedure for purchasing the content. In such a way, the content data distribution system 1 can encourage the user to perform an input for the complicated procedure for purchasing the content after the driving is ended and a safe state is achieved.

The server 300 generates the purchase candidate content presenting information, and transmits the purchase candidate content presenting information to the on-vehicle apparatus 100. Furthermore, when receiving the temporary license request information from the on-vehicle apparatus 100, the server 300 issues a temporary license, transmits the content data with the temporary license to the on-vehicle apparatus 100, and issues an formal license without restriction to the content data that is a subject for the above-described purchasing procedure. Then, when the user is not driving the vehicle, the server 300 transmits the purchasing procedure mail to the on-vehicle apparatus 100 or the communication terminal 200, and after the complicated procedure for purchasing the content described above is performed, the server 300 issues a formal license, in which the restriction applied in the temporary license is canceled, to the content data that is a subject for the purchasing procedure.

2. Schematic Process of Content Data Distribution System 1

Subsequently, a schematic process of the content data distribution system 1 according to the embodiment of the present invention will be described with reference to FIG. 2. FIG. 2 is a process flow illustrating the schematic process of the content data distribution system 1 according to the embodiment of the present invention.

The on-vehicle apparatus 100 logs in to the server 300 according to a user's operation of logging in to the server 300 (S1). The on-vehicle apparatus 100 presents the purchase candidate content based on the purchase candidate content presenting information transmitted from the server 300 (S2).

The on-vehicle apparatus 100 requests of the server 300 a temporary license of the content according to user's input operation of requesting the temporary license of the content (S3). Specifically, the on-vehicle apparatus 100 transmits to the server 300 the temporary license request information requesting the temporary license of the designated content according to the user's input operation on the presentation of the purchase candidate content which designates the content the user intends to purchase. The server 300 issues the temporary license of the content according to the request of the on-vehicle apparatus 100 for the temporary license (S4). Specifically, the server 300 transmits the content data with a predetermined restriction of the content, to which the temporary license is requested in the temporary license request information transmitted from the on-vehicle apparatus 100, to the on-vehicle apparatus 100.

The on-vehicle apparatus 100 outputs the content indicated by the content data in a manner according to the predetermined restriction based on the content data with the predetermined restriction transmitted from the server 300. As described above, before the procedure for purchasing the content is completed, the temporary license is issued, and a prescribed restriction corresponding to the temporary license is added to the content the user intends to purchase, and thereby illegal use without performing the content purchasing procedure is prevented. Hereinafter, the download of content data and the use of content with restriction on the on-vehicle apparatus 100 as described above will be also referred to as "preview".

When the user is not driving the vehicle, the server 300 requests a formal license (hereinafter merely referred to as a "formal license") that allows the use of the content in which the predetermined restriction added to the content in the temporary license is canceled, i.e., the server 300 urges a request for the purchasing procedure (S5). In other words, the server 300 urges the user to perform the procedure of purchasing the content without restriction. Specifically, the server 300 transmits the purchasing procedure mail to the on-vehicle apparatus 100 or the communication terminal 200.

The on-vehicle apparatus 100 or the communication terminal 200 requests of the server 300 the formal license of the content according to the user's input operation of requesting the formal license of the content (S6). In other words, the on-vehicle apparatus 100 or the communication terminal 200 performs the procedure for purchasing the content on the server 300 according to the user's input operation of performing the procedure for purchasing the content. The server 300 issues the formal license of the content to which the purchasing procedure is completed (S7). Specifically, the server 300 cancels the restriction during the reproduction of the content, to which the purchasing procedure is completed, on the on-vehicle apparatus 100.

3. Detailed Configuration of Content Data Distribution System 1

Subsequently, the configuration of the content data distribution system 1 according to the embodiment of the present invention will be described with reference to FIG. 3. FIG. 3 is a block diagram illustrating an example of the configuration of the content data distribution system 1 according to the embodiment of the present invention.

Firstly, a configuration of the on-vehicle apparatus 100 will be described. The on-vehicle apparatus 100 includes data input/output units 101 and 102, a control unit 103, an operation input unit 104, an image/sound presenting unit 105, and a content recording unit 111.

The data input/output unit 101 transmits various kinds of information generated and outputted by the control unit 103, to the server 300. The data input/output unit 101 receives various kinds of information transmitted from the server 300, and outputs the various kinds of information to the control unit 103. The data input/output unit 101 transmits and receives these various kinds of information through the above-described wireless communication.

The data input/output unit 102 transmits the various kinds of information generated and outputted by the control unit 103, to the communication terminal 200. The data input/output unit 102 receives information transmitted from the communication terminal 200, and outputs the information to the control unit 103. The data input/output unit 102 transmits and receives these various kinds of information through the above-described wireless communication or wired communication.

The control unit 103 executes a process for realizing various kinds of functions of the on-vehicle apparatus 100. Specifically, a CPU (Central Processing Unit) included in the on-vehicle apparatus 100 functions as the control unit 103 by executing a program that causes a process for realizing various kinds of functions as the on-vehicle apparatus 100 to be executed. The control unit 103 executes a process according to an output of information from the operation input unit 104 and an output of information from the data input/output units 101 and 102.

The operation input unit 104 receives an operation input from the user by depression of a button not illustrated, touch of a touch panel not illustrated and superimposed on a liquid crystal monitor of the image/sound presenting unit 105, and sound. The operation input unit 104 receives a manual operation input from the user such as depression of a button, and outputs input information indicating the input detail to the control unit 103. The operation input unit 104 also receives a sound input from the user, and outputs sound information indicating the sound to the control unit 103. For example, the operation input unit 104 includes a physical cross key and an operation button, a touch panel superimposed on the liquid crystal monitor of the image/sound presenting unit 105, and a microphone receiving a user's sound input.

The image/sound presenting unit 105 includes, for example, a liquid crystal monitor and a speaker, and outputs various kinds of images and sound. The image/sound presenting unit 105 displays an image indicated by image information outputted from the control unit 103 on the liquid crystal monitor. The image/sound presenting unit 105 also causes the speaker to output sound indicated by sound information outputted from the control unit 103. Here, the monitor displaying an image is not limited to the liquid crystal monitor, and for example any display devices such as an organic EL monitor and a plasma display monitor can be used.

The content recording unit 111 stores content data and content management information. The content management information will be described later with reference to FIG. 4. The content recording unit 111 includes any recording device for storing content data and content management information. The recording device is, for example, a memory and a hard disk.

Subsequently, a configuration of the communication terminal 200 will be described. The communication terminal 200 includes data input/output units 201 and 202, a control unit 203, an operation input unit 204, and an image/sound presenting unit 205.

The data input/output unit 201 transmits various kinds of information generated and outputted by the control unit 203, to the on-vehicle apparatus 100. The data input/output unit 201 receives various kinds of information transmitted from the on-vehicle apparatus 100, and outputs the various kinds of information to the control unit 203. The data input/output unit 201 transmits and receives these various kinds of information through the above-described wireless communication or wired communication.

The data input/output unit 202 transmits the various kinds of information generated and outputted by the control unit 203, to the server 300. The data input/output unit 202 receives various kinds of information transmitted from the server 300, and outputs the various kinds of information to the control unit 203. The data input/output unit 202 transmits and receives these various kinds of information through the above-described wireless communication.

The control unit 203 executes a process for realizing various kinds of functions of the communication terminal 200. Specifically, a CPU included in the communication terminal 200 functions as the control unit 203 by executing a program that causes a process for realizing various kinds of functions as the communication terminal 200 to be executed. The control unit 203 executes a process according to an output of information from the operation input unit 204 and an output of information from the data input/output units 201 and 202.

The operation input unit 204 receives an operation input from the user by depression of a button not illustrated, a touch of a touch panel not illustrated and superimposed on a liquid crystal monitor of the image/sound presenting unit 205, and sound. The operation input unit 204 receives a manual operation input from the user such as depression of a button, and outputs input information indicating the input detail to the control unit 203. The operation input unit 204 also receives a sound input from the user, and outputs sound information indicating the sound to the control unit 203. For example, the operation input unit 204 includes a physical cross key and an operation button, a touch panel superimposed on a liquid crystal monitor of the image/sound presenting unit 205, and a microphone receiving a user's sound input.

The image/sound presenting unit 205 includes, for example, a liquid crystal monitor and a speaker, and outputs various kinds of images and sound. The image/sound presenting unit 205 displays an image indicated by image information outputted from the control unit 203 on the liquid crystal monitor. The image/sound presenting unit 205 also causes the speaker to output sound indicated by sound information outputted from the control unit 203. Here, the monitor displaying an image is not limited to the liquid crystal monitor, and any display devices such as an organic EL monitor and a plasma display monitor can be used.

Subsequently, a configuration of the server 300 will be described. The server 300 includes a data input/output unit 301, a control unit 302, a content recording unit 311, a user information recording unit 312, and a purchase candidate content presenting information recording unit 313.

The data input/output unit 301 transmits various kinds of information generated and outputted by the control unit 302, to the on-vehicle apparatus 100 or the communication terminal 200. The data input/output unit 301 receives information transmitted from the on-vehicle apparatus 100 or the communication terminal 200, and outputs the information to the control unit 302. The data input/output unit 301 transmits and receives these various kinds of information through the above-described wired communication or wireless communication.

The control unit 302 executes a process for realizing various kinds of functions as the server 300. Specifically, a CPU included in the server 300 functions as the control unit 302 by executing a program that causes a process for realizing various kinds of functions as the server 300 to be executed. The control unit 302 executes a process according to an output of information from the data input/output unit 301.

The content recording unit 311 stores content data and content management information. The content management information will be described later with reference to FIG. 5. The content recording unit 311 includes any recording device for storing content data and content management information.

The user information recording unit 312 stores user management information and use history information. The user information and the use history information will be described later. The user information recording unit 312 includes any recording device for storing the user management information and the use history information.

The purchase candidate content presenting information recording unit 313 stores plural pieces of purchase candidate content presenting information. The purchase candidate content presenting information recording unit 313 includes any recording device for storing the purchase candidate content presenting information.

Subsequently, one example of the content management information 1100 stored in the content recording unit 111 of the on-vehicle apparatus 100 will be described with reference to FIG. 4. FIG. 4 is a diagram illustrating one example of the content management information 1100 stored in the content recording unit 111 of the on-vehicle apparatus 100.

The content management information 1100 does not include a record in an initial state; however, the content management information is updated so as to include one or more records according to the use of content by the user. One record includes content ID information 1101, purchase date and time information 1102, and recording area information 1103. Each record indicates information relating to content of a content ID indicated by the content ID information 1101 included in the record.

The content ID information 1101 is information indicating a content ID. A content ID uniquely determines beforehand predetermined content as an identifier for identifying this content. The purchase date and time information 1102 is information indicating a date and time of purchasing content. The recording area information 1103 is information indicating a recording area where content data is recorded in the content recording unit 111. As illustrated in FIG. 4, a path where content data is stored is indicated as the recording area.

The content management information 1100 has a detail following a rule described below.

Content whose record is not present=Not previewed and not purchased

Purchase date and time information is unset and recording area information is unset=Previewed (data is not acquired)

Purchase date and time information is unset, and recording area information is already set=Previewed (data is already acquired)

Purchase date and time information is already set, and recording area information is unset=Purchased (data is not acquired)

Purchase date and time information is already set, and recording area information is already set=Purchased (data is already acquired)

In other words, the case where a record indicating a certain content ID is not present in the content management information 1100 indicates that content data of this content data ID is not downloaded to the on-vehicle apparatus 100, and that the procedure for purchasing this content data is not performed.

A case where a record indicating a certain content ID is present in the content management information 1100, and the purchase date and time information 1102 is unset and the recording area information 1103 is unset in this record indicates that content data of this content ID is previewed on the on-vehicle apparatus 100, but the procedure for purchasing this content data is not performed. This case also indicates that this content data is not stored in the content recording unit 111.

A case where a record indicating a certain content ID is present in the content management information 1100, and the purchase date and time information 1102 is unset and the recording area information 1103 is already set in this record indicates that content data of this content ID is previewed on the on-vehicle apparatus 100, but the procedure for purchasing this content data is not performed. This case also indicates that this content data is stored in the content recording unit 111.

A case where a record indicating a certain content ID is present in the content management information 1100, and the purchase date and time information 1102 is already set but the recording area information 1103 is unset in this record indicates that content data of this content ID is not previewed on the on-vehicle apparatus 100, but the procedure for purchasing this content data is performed. This case also indicates that this content data is not stored in the content recording unit 111.

A case where a record indicating a certain content ID is present in the content management information 1100, and the purchase date and time information 1102 is already set and the recording area information 1103 is also already set in this record indicates that content data of this content ID is previewed on the on-vehicle apparatus 100, and that the procedure for purchasing this content data is performed. This case also indicates that this content data is stored in the content recording unit 111.

Figure 5:
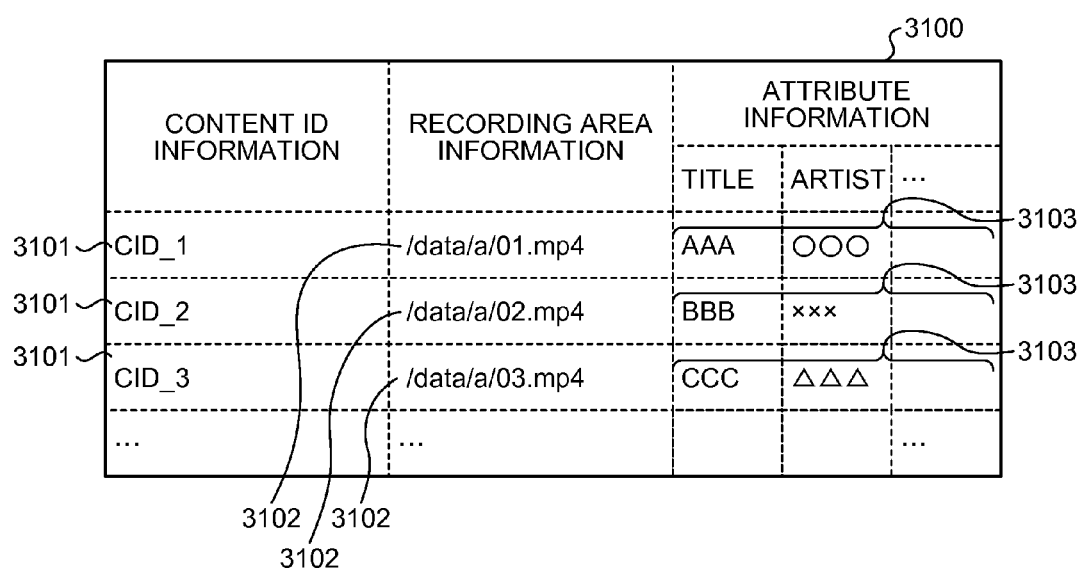
FIG. 5 is a diagram illustrating one example of content management information stored in a content recording unit of a server according to the embodiment of the present invention.

Subsequently, one example of content management information 3100 stored in the content recording unit 311 of the server 300 will be described with reference to FIG. 5. FIG. 5 is a diagram illustrating one example of the content management information 3100 stored in the content recording unit 311 of the server 300.

The content management information 3100 includes plural records beforehand. One record includes content ID information 3101, recording area information 3102, and attribute information 3103. Each record indicates information relating to content involved with a content ID indicated by the content ID information 3101 included in the record.

The content ID information 3101 is similar to that described above, so that the description will be omitted. The recording area information 3102 is information indicating a recording area where content data is recorded in the content recording unit 311. As illustrated in FIG. 5, a path where content data is stored is indicated as the recording area. The attribute information 3103 is information indicating a detail relating to content. For example, when content is music, the attribute information 3103 becomes information indicating at least one or more of a price of the content, a title, an artist name, an album name, a release date and time, a category, time, a lyric writer, a composer and the like. Furthermore, for example, when content is a movie, the attribute information 3103 becomes information indicating at least one or more of a title, a release year and month, a movie director, a scenario, a performer and the like.

Subsequently, one example of use history information 3200 stored in the content recording unit 311 of the server 300 will be described with reference to FIG. 6. FIG. 6 is a diagram illustrating one example of the use history information 3200 stored in the content recording unit 311 of the server 300.

The content recording unit 311 stores the use history information 3200 for each user. The use history information 3200 does not include a record in an initial state; however, the use history information is updated so as to include one or more records according to the use of content by the user. One record includes content ID information 3201, preview date and time information 3202, and purchase date and time information 3203. Each record indicates information relating to content of a content ID indicated by the content ID information included in the record.

The content ID information 3201 and the purchase date and time information 3203 are similar to those described above, so that the description will be omitted. The preview date and time information 3202 is information indicating a preview date and time of content.

The use history information 3200 has a detail following a rule described below.

Content whose record is not present=Not previewed and not purchased

Content with the purchase date and time information being unset=Previewed and not purchased Content with the purchase date and time information being already set=Purchased Specifically, a case where a record indicating a certain content ID is not present in the use history information 3200 indicates that content data of this content ID is not previewed on the on-vehicle apparatus 100, and that the procedure for purchasing this content data is not performed.

A case where a record indicating a certain content ID is present in the use history information 3200, and the purchase date and time information 3203 is unset in this record indicates that content data of this content ID is previewed on the on-vehicle apparatus 100, but the procedure for purchasing this content data is not performed.

A case where a record indicating a certain content ID is present in the use history information 3200, and the purchase date and time information 3203 is already set in this record indicates that the procedure for purchasing the content data of the content ID is performed.

Each piece of the use history information 3200 is managed such that the use history information 3200 involved with a user using content can be specified and updated. Specifically, this can be attained by linking user management information 3300, which is described later with reference to FIG. 7, to the use history information 3200 related to the user same as a user of the user management information 3300. When the user logs in to the server 300 from the on-vehicle apparatus 100, login authentication is performed with the user management information 3300 involved with the user, and a session involved with this login is established between the on-vehicle apparatus 100 and the server 300. According to the above, when content is used in a certain session, the control unit 302 of the server 300 specifies the use history information 3200, which is linked to the user management information 3300 used for the login authentication upon the establishment of this session, as a subject to be updated, and thus, the use history information 3200 involved with the user who uses the content can be updated.

Note that the user management information 3300 is linked to the use history information 3200, for example, in such a manner that information, which can specify one piece of information by the other piece of information, is preliminarily stored in the content recording unit 311 or the user information recording unit 312. For example, when each piece of the user management information 3300 and the use history information 3200 is prepared as a file, each piece of the information may be information indicating the corresponding path where each file is stored in association with the corresponding information. Then, the control unit 302 specifies the use history information 3200 linked to the user management information 3300 based on this information as described above. Further, when establishing a session, the control unit 302 stores information indicating the user management information 3300 used for the establishment of this session and the use history information 3200 linked to the user management information 3300 in the content recording unit 311 or the user information recording unit 312, and thus when content is used in a certain session, the control unit 302 can specify the use history information 3200, which is linked to a session ID of this session in this information, as the use history information 3200 involved with the user using the content.

Subsequently, one example of the user management information 3300 stored in the user information recording unit 312 of the server 300 will be described with reference to FIG. 7. FIG. 7 is a diagram illustrating one example of the user management information 3300 stored in the user information recording unit 312 of the server 300.

The content recording unit 311 stores the user management information 3300 for each user. The user management information 3300 includes mail address information 3301, user name information 3302, password information 3303, login date and time information 3304, logout date and time information 3305, login confirmation date and time information 3306, and mail transmission date and time information 3307.

The mail address information 3301 is information indicating a mail address of the communication terminal 200. The user name information 3302 is information indicating a user name when the user of the on-vehicle apparatus 100 logs in to the server 300. The password information 3303 is information indicating a password when the user of the on-vehicle apparatus 100 logs in to the server 300. The login date and time information 3304 is information indicating the last date and time when the user logs in to the server 300 from the on-vehicle apparatus 100. The logout date and time information 3305 is information indicating the last date and time when the user logs out of the server 300. The login confirmation date and time information 3306 is information indicating the last date and time when the login of the user to the server 300 from the on-vehicle apparatus 100 is confirmed. The mail transmission date and time information 3307 is information indicating the last date and time when the server 300 transmits the purchasing procedure mail to the communication terminal 200.

Figure 8:
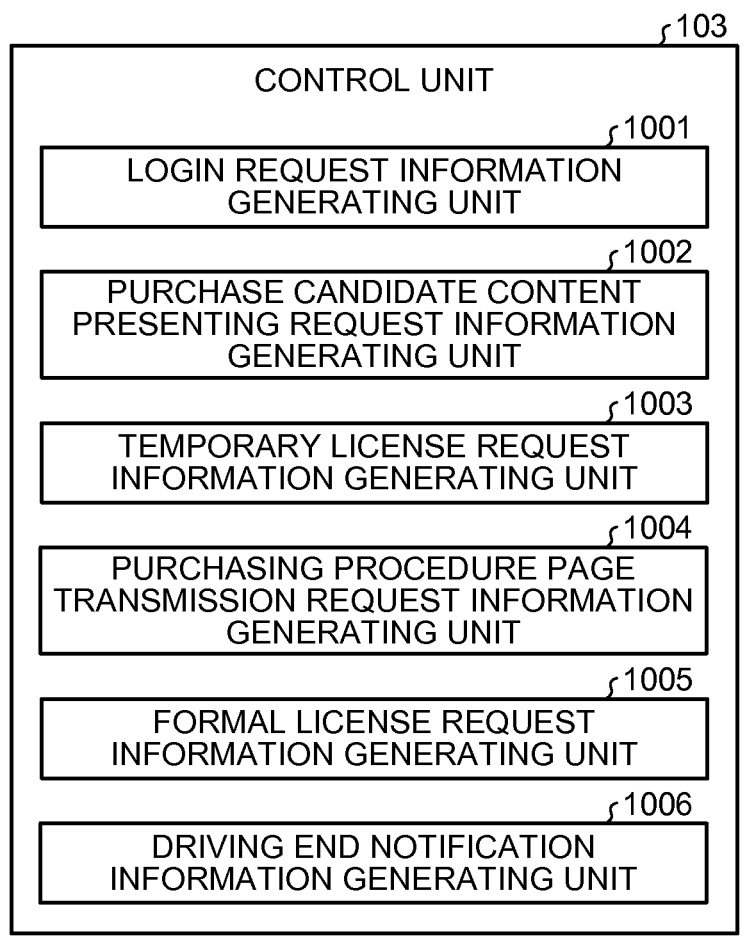
FIG. 8 is a block diagram illustrating a functional block relating to generation of information of a control unit of the on-vehicle apparatus according to the embodiment of the present invention.

Subsequently, a functional block relating to generation of information of the control unit 103 of the on-vehicle apparatus 100 according to the embodiment of the present invention will be described with reference to FIG. 8. FIG. 8 is a block diagram illustrating a functional block relating to the generation of information of the control unit 103 of the on-vehicle apparatus 100 according to the embodiment of the present invention.

The control unit 103 of the on-vehicle apparatus 100 also functions as a login request information generating unit 1001, a purchase candidate content presenting request information generating unit 1002, a temporary license request information generating unit 1003, a purchasing procedure page transmission request information generating unit 1004, a formal license request information generating unit 1005, and a driving end notification information generating unit 1006.

The login request information generating unit 1001 generates login request information requesting login upon a login process (S1). The purchase candidate content presenting request information generating unit 1002 generates purchase candidate content presenting request information requesting presentation of content of a purchase candidate during a purchase candidate content presenting process (S2). The temporary license request information generating unit 1003 generates temporary license request information requesting issuance of a temporary license for content data during the temporary license requesting process (S3). The purchasing procedure page transmission request information generating unit 1004 generates purchasing procedure page transmission request information requesting a purchasing procedure page of the previewed content during a content purchasing procedure process (S6). The formal license request information generating unit 1005 generates formal license request information requesting issuance of a formal license for the content data during the content purchasing procedure process (S6). The driving end notification information generating unit 1006 generates driving end notification information notifying of the driving end of the vehicle during a formal license request urging process (S5).

Figure 9:
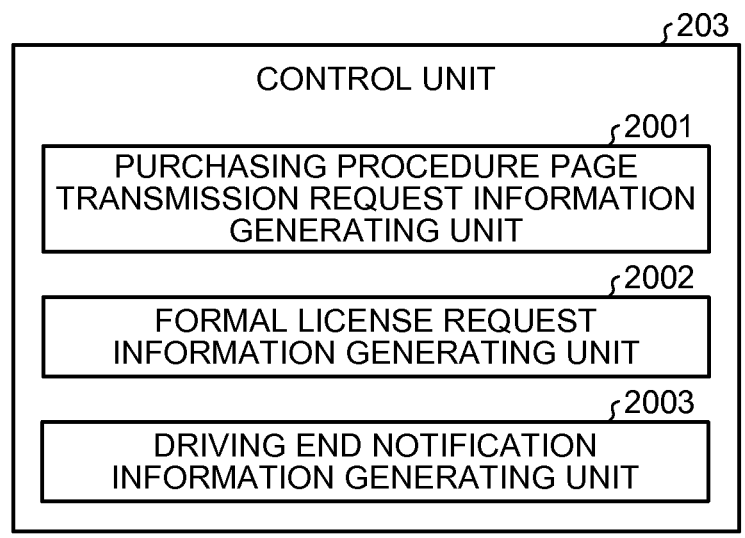
FIG. 9 is a block diagram illustrating a functional block relating to generation of information of a control unit of a communication terminal according to the embodiment of the present invention.

Subsequently, a functional block relating to generation of information of the control unit 203 of the communication terminal 200 according to the embodiment of the present invention will be described with reference to FIG. 9. FIG. 9 is a block diagram illustrating the functional block relating to the generation of information of the control unit 203 of the communication terminal 200 according to the embodiment of the present invention.

The control unit 203 of the communication terminal 200 also functions as a purchasing procedure page transmission request information generating unit 2001, a formal license request information generating unit 2002, and a driving end notification information generating unit 2003.

The purchasing procedure page transmission request information generating unit 2001 generates purchasing procedure page transmission request information requesting a purchasing procedure page of the previewed content during the content purchasing procedure process (S6). The formal license request information generating unit 2002 generates formal license request information requesting issuance of a formal license for the content data during the content purchasing procedure process (S6). The driving end notification information generating unit 2003 generates driving end notification information notifying of the driving end of the vehicle during the formal license request urging process (S5).

Figure 10:
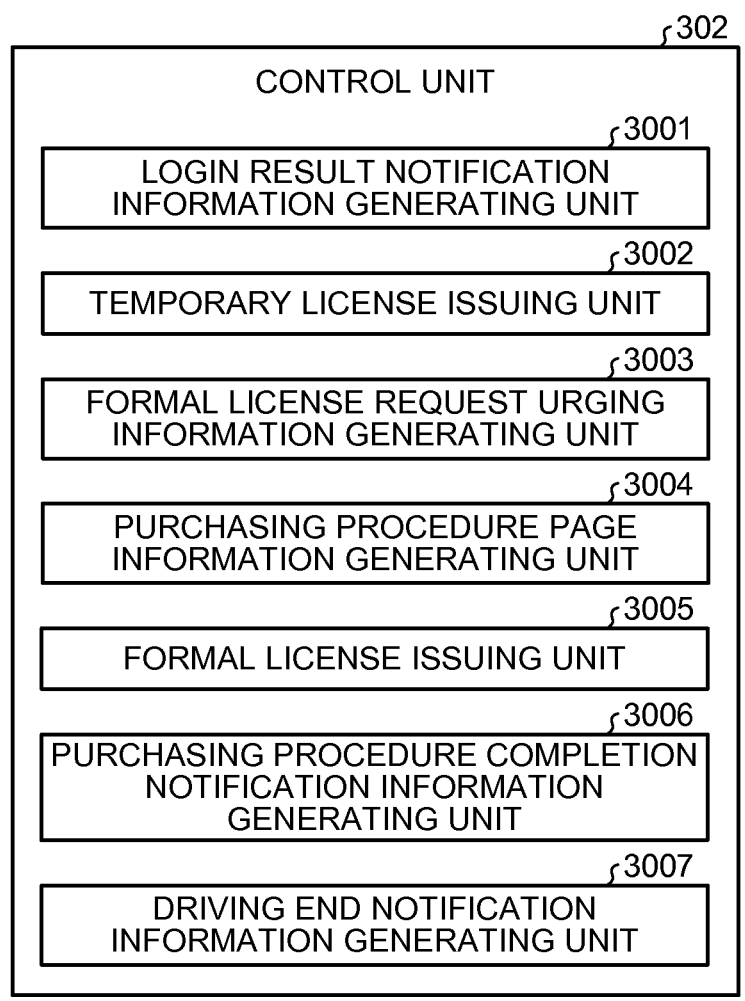
FIG. 10 is a block diagram illustrating a functional block relating to generation of information of a control unit of the server according to the embodiment of the present invention.

Subsequently, a functional block relating to generation of information of the control unit 302 of the server 300 according to the embodiment of the present invention will be described with reference to FIG. 10. FIG. 10 is a block diagram illustrating the functional block relating to the generation of information of the control unit 302 of the server 300 according to the embodiment of the present invention.

The control unit 302 of the server 300 also functions as a login result notification information generating unit 3001, a temporary license issuing unit 3002, a formal license request urging information generating unit 3003, a purchasing procedure page information generating unit 3004, a formal license issuing unit 3005, a purchasing procedure completion notification information generating unit 3006, and a driving end notification information generating unit 3007.

The login result notification information generating unit 3001 generates login result notification information notifying of a determination result as to whether the login is possible or not upon the login process (S1). The temporary license issuing unit 3002 issues a temporary license to the purchase candidate content data designated by the user, based on the received temporary license request information. The formal license request urging information generating unit 3003 generates the purchasing procedure mail urging the purchasing procedure for the previewed content, as the formal license request urging information upon the formal license request urging process (S5). The purchasing procedure page information generating unit 3004 generates purchasing procedure page information indicating a purchasing procedure page upon the content purchasing procedure process (S6). The formal license issuing unit 3005 issues a formal license in which the predetermined restriction added in the temporary license is canceled, to the content data to which the user has performed the predetermined purchasing procedure, based on the received formal license request information. The purchasing procedure completion notification information generating unit 3006 generates purchasing procedure completion notification information notifying of the completion of the purchasing procedure for the content upon a formal license issuing process (S7). The driving end notification information generating unit 3007 generates driving end notification information notifying of the driving end of the vehicle upon the formal license request urging process (S5).

4. Process of Content Data Distribution System 1

Figure 11:
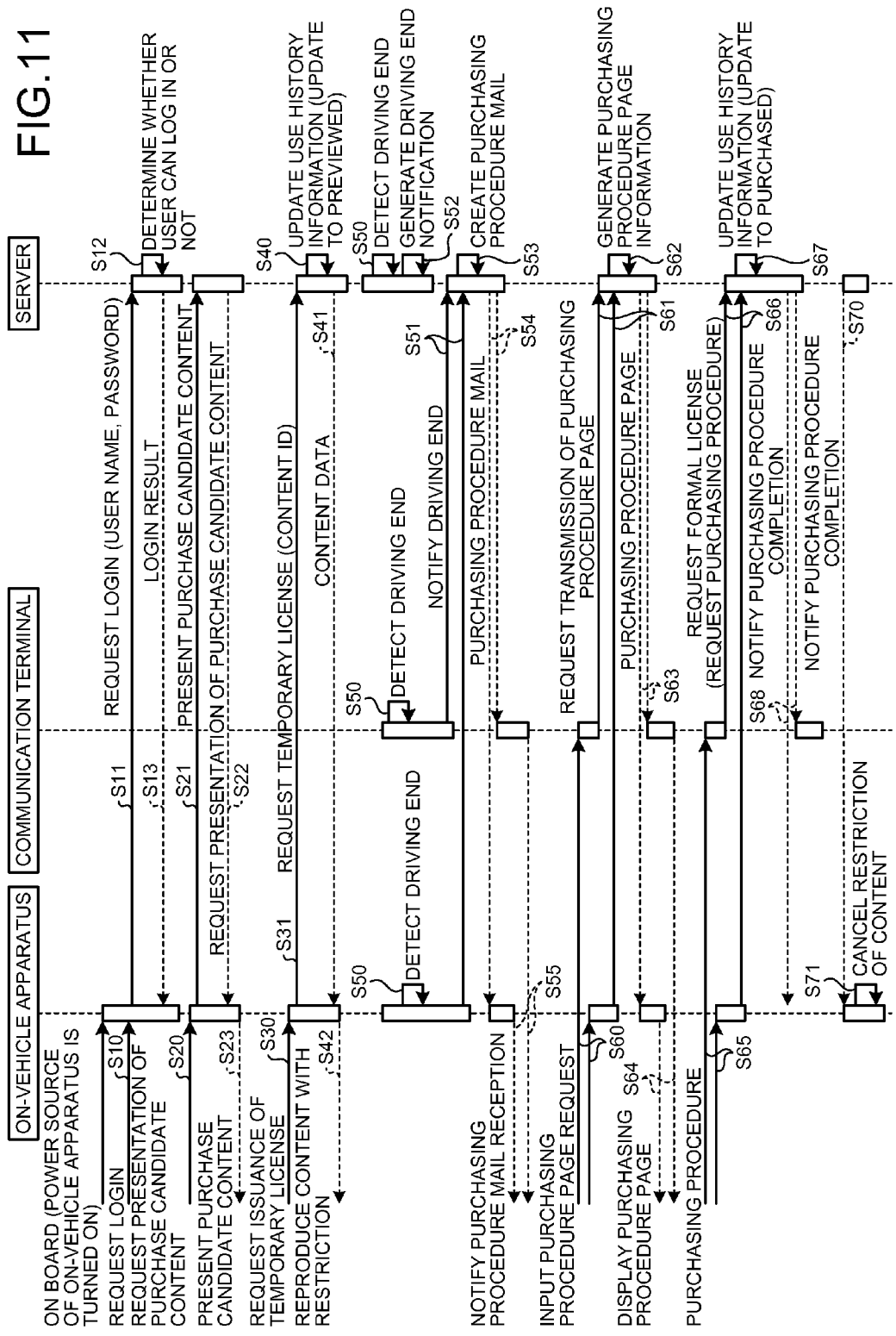
FIG. 11 is a process sequence illustrating a process of the content data distribution system according to the embodiment of the present invention.

Subsequently, a process of the content data distribution system 1 according to the embodiment of the present invention will be described with reference to FIG. 11. FIG. 11 is a process sequence illustrating the process of the content data distribution system 1 according to the embodiment of the present invention. Hereinafter, the processes in the above-described steps S1 to S8 will more specifically be described.

Step S1

An ACC (accessory) power source of the on-vehicle apparatus 100 is turned on by the user, and accordingly the on-vehicle apparatus 100 is turned on and starts up. After starting up, the on-vehicle apparatus 100 is connected to the Internet in order to enable communication with the server 300. The operation input unit 104 of the on-vehicle apparatus 100 receives from the user an input requesting login to the server 300 (S10). This input includes an input of a detail (user name and password) necessary for the authentication upon the login. The operation input unit 104 generates input information indicating the input detail from the user, and outputs the information to the control unit 103.

The login request information generating unit 1001 generates the login request information requesting login according to the output of the input information indicating the input requesting the login from the operation input unit 104. The login request information is generated so as to indicate the user's input detail (user name and password) indicated by the input information. The login request information generating unit 1001 outputs the generated login request information to the data input/output unit 101. The data input/output unit 101 transmits the login request information outputted from the login request information generating unit 1001, to the server 300 (S11).

The data input/output unit 301 of the server 300 receives the login request information transmitted from the on-vehicle apparatus 100. The data input/output unit 301 outputs the received login request information to the control unit 302. The control unit 302 determines whether the user can log in or not based on the login request information, according to the output of the login request information from the data input/output unit 301 (S12). Specifically, the control unit 302 determines whether the user can log in or not by comparing the user's input detail indicated by the login request information and an expectation value of the user's input detail indicated by the user management information 3300 stored in the user information recording unit 312.

Then, the login result notification information generating unit 3001 generates the login result notification information notifying of the determination result as to whether the user can log in or not. The login result notification information generating unit 3001 outputs the generated login result notification information to the data input/output unit 301. The data input/output unit 301 transmits the login result notification information outputted from the login result notification information generating unit 3001, to the on-vehicle apparatus 100 (S13).

The data input/output unit 101 of the on-vehicle apparatus 100 receives the login result notification information transmitted from the server 300. The data input/output unit 101 outputs the received login result notification information to the control unit 103. The control unit 103 recognizes that the login is allowed by the server 300 from the login result notification information from the data input/output unit 101. As a result, a session in this login is established between the on-vehicle apparatus 100 and the server 300. Afterward, various kinds of information are transmitted and received to and from the on-vehicle apparatus 100 and the server 300 by this established session.

Step S2

The operation input unit 104 of the on-vehicle apparatus 100 receives from the user an input requesting presentation of purchase candidate content (S20). The operation input unit 104 generates input information indicating the input detail inputted from the user, and outputs the input information to the control unit 103.

The purchase candidate content presenting request information generating unit 1002 generates the purchase candidate content presenting request information requesting presentation of purchase candidate content, according to the input of the input information indicating the input requesting the presentation of the purchase candidate content from the operation input unit 104. The purchase candidate content presenting request information generating unit 1002 outputs the generated purchase candidate content presenting request information to the data input/output unit 101. The data input/output unit 101 transmits the purchase candidate content presenting request information outputted from the purchase candidate content presenting request information generating unit 1002, to the server 300 (S21).

The data input/output unit 301 of the server 300 receives the purchase candidate content presenting request information transmitted from the on-vehicle apparatus 100. The data input/output unit 301 outputs the received purchase candidate content presenting request information to the control unit 302. The control unit 302 of the server 300 acquires the corresponding purchase candidate content presenting information from the purchase candidate content presenting information recording unit 313 according to the output of the purchase candidate content presenting request information from the data input/output unit 301, and outputs the resultant to the data input/output unit 301. The data input/output unit 301 transmits the purchase candidate content presenting information outputted from the control unit 302, to the on-vehicle apparatus 100 (S22).

The data input/output unit 101 of the on-vehicle apparatus 100 receives the purchase candidate content presenting information transmitted from the server 300. The data input/output unit 101 outputs the received purchase candidate content presenting information to the control unit 103. The control unit 103 generates image information, which presents purchase candidate content, based on the purchase candidate content presenting information. The control unit 103 outputs the generated image information, which presents the purchase candidate content, to the image/sound presenting unit 105. The image/sound presenting unit 105 outputs an image, which presents the purchase candidate content based on the image information, according to the output of the image information presenting the purchase candidate content from the control unit 103 (S23). Note that the purchase candidate content can be presented not only by an image, but also by sound as described later.

Step S3

The operation input unit 104 of the on-vehicle apparatus 100 receives from the user an input to the presentation of the purchase candidate content, which requests issuance of a temporary license to the content (S30). This input is simpler than the input in the content purchasing procedure (a request for issuance of a formal license). The operation input unit 104 generates input information indicating the input detail from the user, and outputs the resultant to the control unit 103.

The temporary license request information generating unit 1003 generates the temporary license request information, which requests issuance of a temporary license for content data of the content to which the issuance of the temporary license is requested by the user, according to the output of the input information indicating the input requesting the issuance of the temporary license for the content from the operation input unit 104. The temporary license request information is generated so as to indicate the content ID of the content to which the issuance of the temporary license is requested by the user. The temporary license request information generating unit 1003 outputs the generated temporary license request information to the data input/output unit 101. The data input/output unit 101 transmits the temporary license request information outputted from the temporary license request information generating unit 1003, to the server 300 (S31).

Step S4

The data input/output unit 301 of the server 300 receives the temporary license request information transmitted from the on-vehicle apparatus 100. The data input/output unit 301 outputs the received temporary license request information to the control unit 302. According to the output of the temporary license request information from the data input/output unit 301, the control unit 302 updates the use history information 3200 as for the content to which the issuance of the temporary license is requested in the temporary license request information, to the "previewed", also acquires the content data from the content recording unit 311, adds the predetermined restriction to the content data, and outputs the content data to the data input/output unit 301 (S40). The data input/output unit 301 transmits the content data, which is outputted from the control unit 302 and to which the predetermined restriction is added, to the on-vehicle apparatus 100 (S41).

The data input/output unit 101 of the on-vehicle apparatus 100 receives the content data which is transmitted from the server 300 and to which the predetermined restriction is added, and outputs the content data to the control unit 103. The control unit 103 stores this content data in the content recording unit 111 according to the output of the content data with the predetermined restriction added thereto from the data input/output unit 101, and also reproduces content with restriction based on the content data stored in the content recording unit 111 (S42).

Step S5

When it is determined that the driving of the vehicle is ended (S50), driving end notification information is generated. The driving end notification information may be generated by any of the driving end notification information generating unit 1006 of the on-vehicle apparatus 100, the driving end notification information generating unit 2003 of the communication terminal 200, and the driving end notification information generating unit 3007 of the server 300.

When it is determined that the driving of the vehicle by the user is ended (S50), the driving end notification information generating unit 1006 of the on-vehicle apparatus 100 outputs driving end notification information notifying of the driving end, to the data input/output unit 101. The data input/output unit 101 transmits the driving end notification information outputted from the driving end notification information generating unit 1006, to the server 300 (S51).

Alternatively, when it is determined that the driving of the vehicle by the user is ended (S50), the driving end notification information generating unit 2003 of the communication terminal 200 outputs driving end notification information notifying of the driving end, to the data input/output unit 201. The data input/output unit 201 transmits the driving end notification information outputted from the driving end notification information generating unit 2003, to the server 300 (S51).

Alternatively, when it is determined that the driving of the vehicle by the user is ended (S50), the driving end notification information generating unit 3007 of the server 300 may generate driving end notification information notifying of the driving end (S52).

When the driving end notification information is received or generated as described above, the formal license request urging information generating unit 3003 generates a purchasing procedure mail, which urges the user to perform the purchasing procedure for the previewed content, as the formal license request urging information (S53). The formal license request urging information generating unit 3003 outputs the generated purchasing procedure mail to the data input/output unit 301. The data input/output unit 301 transmits the purchasing procedure mail outputted from the formal license request urging information generating unit 3003, to the on-vehicle apparatus 100 or the communication terminal 200 (S54).

The data input/output unit 102 of the on-vehicle apparatus 100 or the data input/output unit 202 of the communication terminal 200 receives the purchasing procedure mail transmitted from the server 300. The received purchasing procedure mail is outputted to the control unit 103 or the control unit 203. The control unit 103 or the control unit 203 notifies the user of the reception of the purchasing procedure mail according to the output of the purchasing procedure mail (S55). Specifically, the control unit 103 or the control unit 203 generates image information indicating a screen that notifies of the reception of the purchasing procedure mail. The control unit 103 or the control unit 203 outputs the generated image information indicating the screen that notifies of the reception of the purchasing procedure mail to the image/sound presenting unit 105 or the image/sound presenting unit 205. The image/sound presenting unit 105 or the image/sound presenting unit 205 displays the screen, which is indicated by the image information and which notifies of the reception of the purchasing procedure mail, according to the output of the image information indicating the screen that notifies of the reception of the purchasing procedure mail from the control unit 103 or the control unit 203.

Step S6

The operation input unit 104 of the on-vehicle apparatus 100 or the operation input unit 204 of the communication terminal 200 receives from the user an input that is based on the purchasing procedure mail and that requests a web page for performing the purchasing procedure for the previewed content (S60). Hereinafter, this web page will be referred to as a "purchasing procedure page". The operation input unit 104 or the operation input unit 204 generates input information indicating the input detail from the user, and outputs the resultant to the control unit 103 or the control unit 203.

The purchasing procedure page transmission request information generating unit 1004 of the on-vehicle apparatus 100 or the purchasing procedure page transmission request information generating unit 2001 of the communication terminal 200 generates purchasing procedure page transmission request information, which requests the purchasing procedure page of the previewed content, according to the output of the input information indicating the input requesting the purchasing procedure page from the operation input unit 104 or the operation input unit 204. The purchasing procedure page transmission request information generating unit 1004 or the purchasing procedure page transmission request information generating unit 2001 outputs the generated purchasing procedure page transmission request information to the data input/output unit 102 or the data input/output unit 202. The data input/output unit 102 or the data input/output unit 202 transmits the purchasing procedure page transmission request information transmitted from the purchasing procedure page transmission request information generating unit 1004 or the purchasing procedure page transmission request information generating unit 2001, to the server 300 (S61).

The data input/output unit 301 of the server 300 receives the purchasing procedure page transmission request information transmitted from the on-vehicle apparatus 100 or the communication terminal 200. The data input/output unit 301 outputs the received purchasing procedure page transmission request information to the control unit 302. The control unit 302 generates purchasing procedure page information indicating the purchasing procedure page, according to the output of the purchasing procedure page transmission request information from the data input/output unit 301 (S62). The control unit 302 outputs the generated purchasing procedure page information to the data input/output unit 301. The data input/output unit 301 transmits the purchasing procedure page information outputted from the control unit 302, to the on-vehicle apparatus 100 or the communication terminal 200 (S63).

The data input/output unit 102 of the on-vehicle apparatus 100 or the data input/output unit 202 of the communication terminal 200 receives the purchasing procedure page information transmitted from the server 300. The data input/output unit 102 or the data input/output unit 202 outputs the received purchasing procedure page information to the control unit 103 or the control unit 203. The control unit 103 or the control unit 203 generates image information indicating the purchasing procedure page based on the purchasing procedure page information, according to the output of the purchasing procedure page information from the data input/output unit 102 or the data input/output unit 202. The control unit 103 or the control unit 203 outputs the generated image information to the image/sound presenting unit 105 or the image/sound presenting unit 205. The image/sound presenting unit 105 or the image/sound presenting unit 205 displays the purchasing procedure page indicated by the image information, according to the output of the image information from the control unit 103 or the control unit 203 (S64).

The operation input unit 104 of the on-vehicle apparatus 100 or the operation input unit 204 of the communication terminal 200 receives from the user an input to the purchasing procedure page that performs the purchasing procedure for the content (S65). This input includes, for example, an input selecting the content to which the purchasing procedure is performed, and an input of information necessary for the payment such as a credit-card number, and becomes more complicated than the simple input performed by the user upon the request for the temporary license. The operation input unit 104 or the operation input unit 204 generates input information indicating the input detail from the user, and outputs the resultant to the control unit 103 or the control unit 203.

The formal license request information generating unit 1005 of the on-vehicle apparatus 100 or the formal license request information generating unit 2002 of the communication terminal 200 generates purchasing procedure request information requesting the purchasing procedure for the content, i.e., formal license request information requesting issuance of the formal license, according to the output from the operation input unit 104 or the operation input unit 204 of the input information indicating the input performing the purchasing procedure for the content. The formal license request information is generated so as to indicate the content ID of the content (to which the issuance of the formal license is requested) selected as a subject for the purchasing procedure, and the input detail of the user (information necessary for the payment) indicated by the input information. The formal license request information generating unit 1005 of the on-vehicle apparatus 100 or the formal license request information generating unit 2002 of the communication terminal 200 outputs the generated formal license request information to the data input/output unit 102 or the data input/output unit 202. The data input/output unit 102 or the data input/output unit 202 transmits the formal license request information outputted from the control unit 103 or the control unit 203, to the server 300 (S66).

The data input/output unit 301 of the server 300 receives the formal license request information transmitted from the on-vehicle apparatus 100 or the communication terminal 200. The data input/output unit 301 outputs the received formal license request information to the control unit 302. The control unit 302 updates the use history information 3200 such that the content requested in the formal license request information becomes purchased content, according to the output of the formal license request information from the data input/output unit 301 (S67). The control unit 302 generates purchasing procedure completion notification information notifying the on-vehicle apparatus 100 or the communication terminal 200 of the completion of the purchasing procedure for the content. The control unit 302 outputs the generated purchasing procedure completion notification information to the data input/output unit 301. The data input/output unit 301 transmits the purchasing procedure completion notification information outputted from the control unit 302, to the on-vehicle apparatus 100 or the communication terminal 200 (S68).

Step S7

The control unit 302 of the server 300 generates purchasing procedure completion notification information (for the on-vehicle apparatus) also notifying the on-vehicle apparatus 100 of the completion of the purchasing procedure for the content, after the completion of the purchasing procedure for the content by the user. The control unit 302 outputs the generated purchasing procedure completion notification information (for the on-vehicle apparatus) to the data input/output unit 301. The data input/output unit 301 transmits the purchasing procedure completion notification information outputted from the control unit 302, to the on-vehicle apparatus 100 (S70).

The data input/output unit 101 of the on-vehicle apparatus 100 receives the purchasing procedure completion notification information (for the on-vehicle apparatus) transmitted from the server 300. The data input/output unit 101 outputs the received purchasing procedure completion notification information (for the on-vehicle apparatus) to the control unit 103. The control unit 103 cancels the restriction upon the reproduction of the content to which the purchasing procedure is completed, according to the output of the purchasing procedure completion notification information (for the on-vehicle apparatus) from the data input/output unit 101 (S71).

5. Login (S1)

Subsequently, the login process in step S1 described above will be described in more detail.

Figure 12:
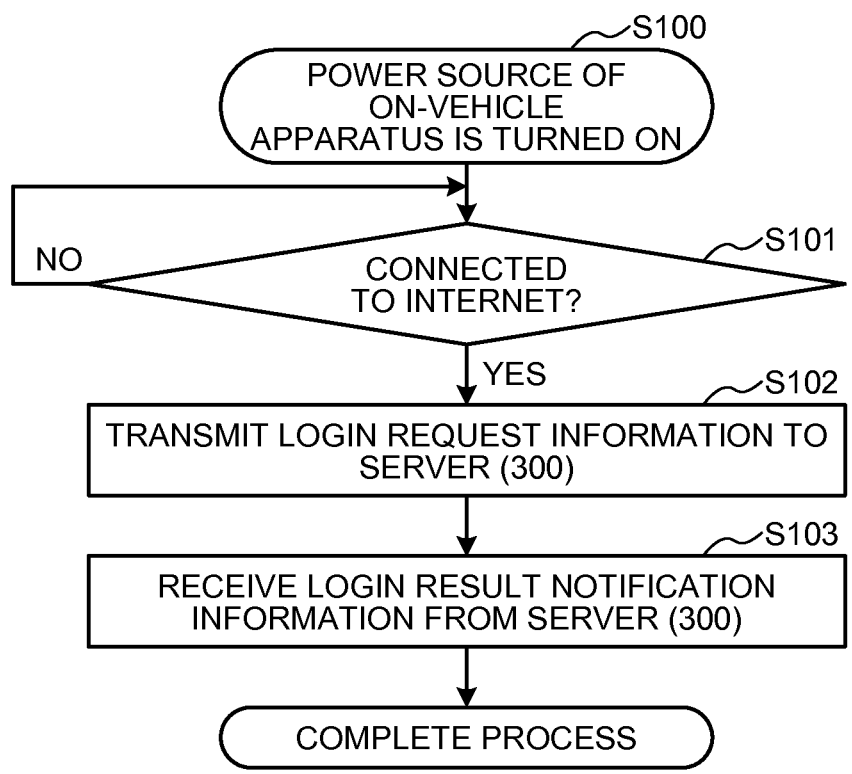
FIG. 12 is a process flow illustrating a process of the on-vehicle apparatus upon a login request according to the embodiment of the present invention.

Firstly, a process of the on-vehicle apparatus 100 upon the login request will be described with reference to FIG. 12. FIG. 12 is a process flow illustrating the process of the on-vehicle apparatus 100 upon the login request.

When the ACC power source of the on-vehicle apparatus 100 is turned on by the user, the on-vehicle apparatus 100 starts up (S100). The control unit 103 of the on-vehicle apparatus 100 establishes connection to the Internet after the start-up of the on-vehicle apparatus 100 (S101). After the connection to the Internet (S101: Yes), the operation input unit 104 transmits the login request information to the server 300 according to the login request of the user to the server 300 (S102). This input includes an input of a user name and a password. The operation input unit 104 generates input information indicating the input detail according to the input from the user, and outputs the resultant to the control unit 103. Step S102 corresponds to step S10.

The control unit 103 generates the login request information requesting the login, according to the output from the operation input unit 104 of the input information indicating the input requesting the login. The login request information is generated so as to indicate the input detail (user name and password) indicated in the input information. The control unit 103 transmits the generated login request information to the server 300 via the data input/output unit 101 (S103). Step S103 corresponds to step S11.

The control unit 103 receives the login result notification information transmitted from the server 300, via the data input/output unit 101 (S103). When the login result notification information indicates successful login, a session is established between the on-vehicle apparatus 100 and the server 300. Afterward, the on-vehicle apparatus 100 can transmit and receive information to and from the server 300 by utilizing the session. When the login result notification information indicates a login error, a session is not established between the on-vehicle apparatus 100 and the server 300.

Figure 13:
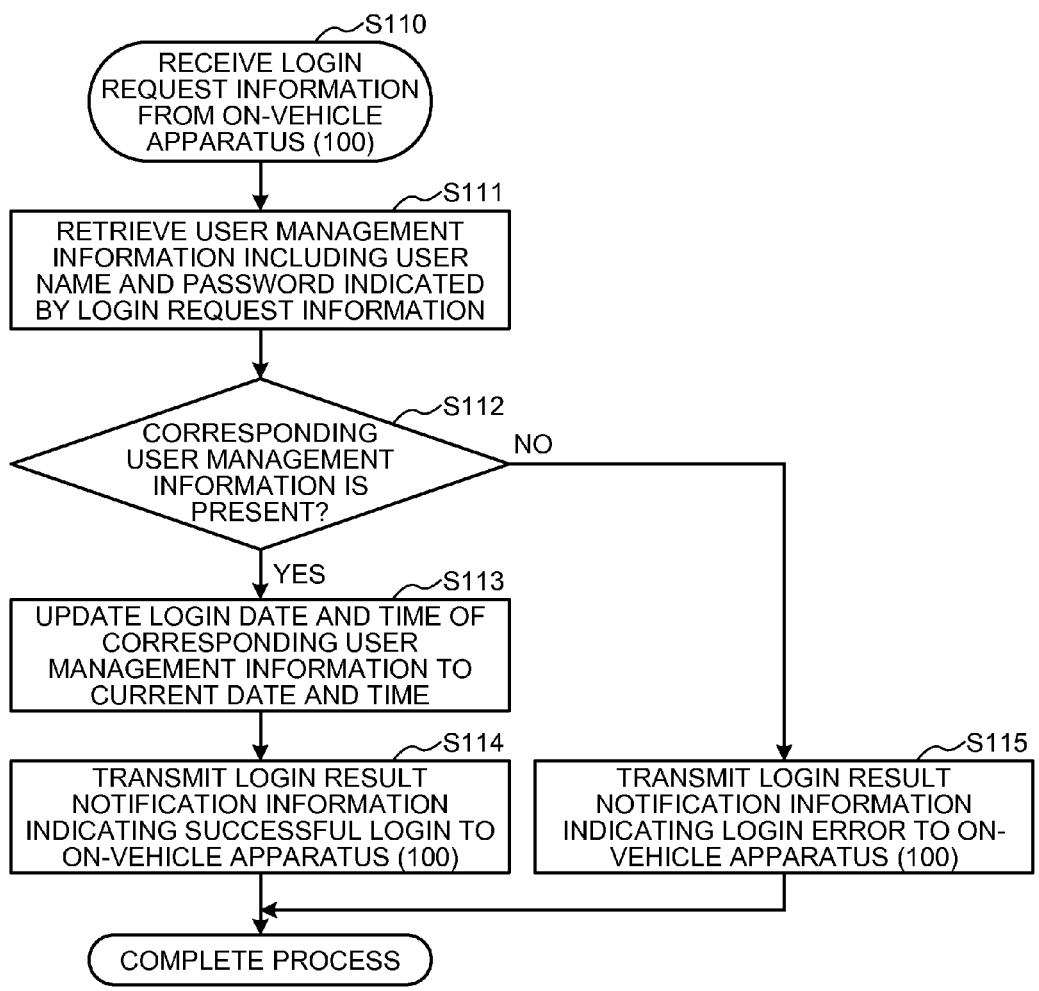
FIG. 13 is a process flow illustrating a process of the server upon receiving a login request according to the embodiment of the present invention.

Subsequently, a process of the server 300 upon receiving the login request will be described with reference to FIG. 13. FIG. 13 is a process flow illustrating the process of the server 300 upon receiving the login request.

The control unit 302 receives the login request information transmitted from the on-vehicle apparatus 100, via the data input/output unit 301 (S110). According to the reception of the login request information, the control unit 302 retrieves the user management information 3300, which indicates the user name and the password indicated by the login request information, from the user management information 3300 stored in the user information recording unit 312 (S111). Specifically, the control unit 302 retrieves the user management information 3300 including the user name information 3302 and the password information 3303 indicating the user name and the password indicated by the login request information. Step S111 corresponds to step S12.

When the retrieved user management information 3300 is present (S112: Yes), the control unit 302 updates the login date and time information 3304 of the user management information 3300 so as to indicate the current date and time (S113). In this case, the control unit 302 generates the login result notification information indicating the successful login. The control unit 302 transmits the generated login result notification information to the on-vehicle apparatus 100 via the data input/output unit 301 (S114).

When the retrieved user management information 3300 is not present (S112: No), the control unit 302 generates the login result information indicating the login error. The control unit 302 transmits the generated login result notification information to the on-vehicle apparatus 100 via the data input/output unit 301 (S115). Steps S114 and S115 correspond to step S13.

6. Presentation of Purchase Candidate Content (S2)

Subsequently, the purchase candidate content presenting process in step S2 described above will be described in more detail.

Here, two providing methods will be described below as a method of presenting the purchase candidate content.

Figure 14:
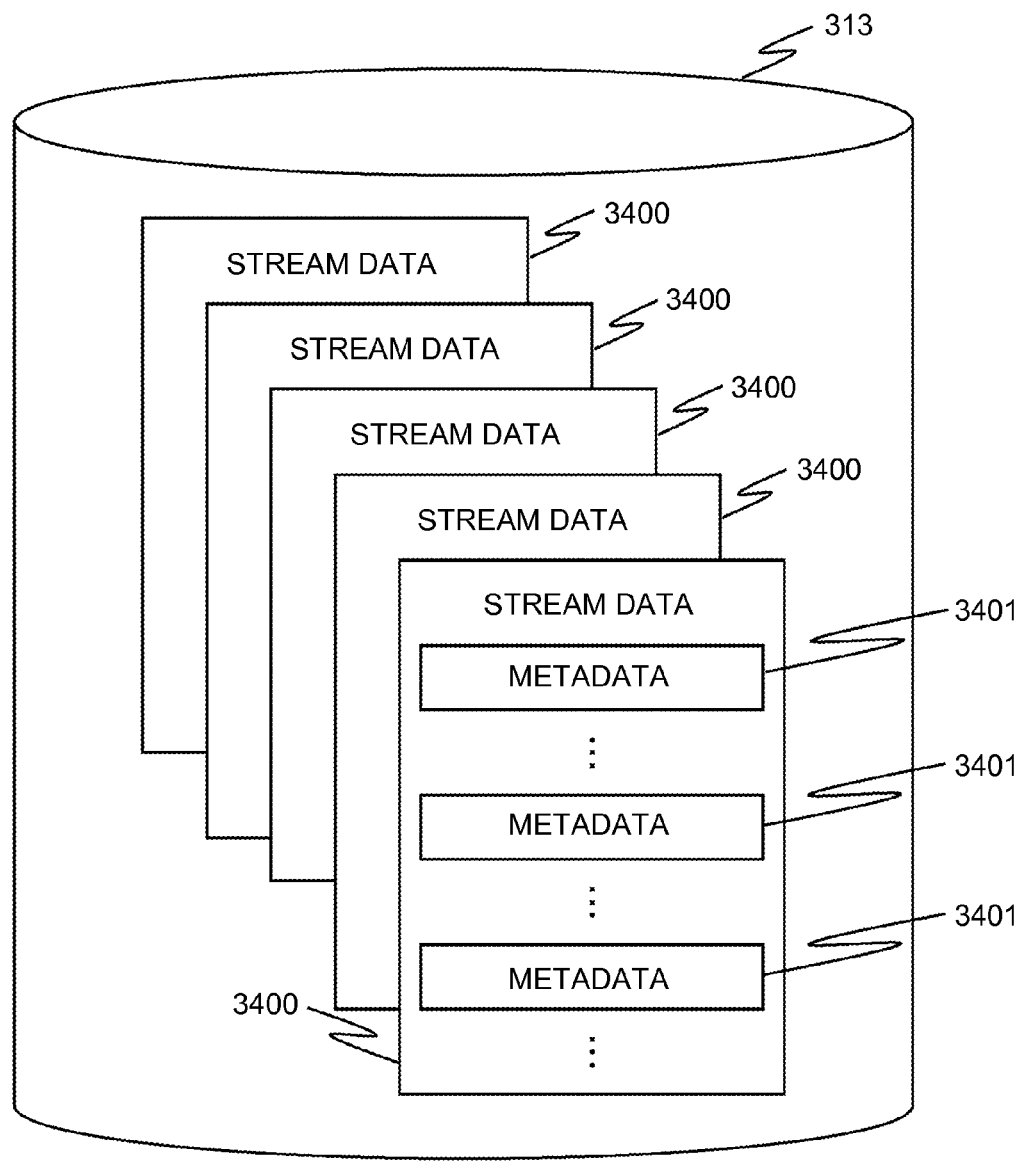
FIG. 14 is a diagram illustrating information stored in a purchase candidate content presenting information recording unit of the server in the case of executing a presentation method by air.

(1) Presentation by Air (2) Presentation by Advertisement Display (1) Presentation by Air Firstly, a presentation method of presenting the purchase candidate content by air will be described. Information stored in the purchase candidate content presenting information recording unit 313 of the server 300 in the case of executing the presentation method by air will be described with reference to FIG. 14. FIG. 14 is a diagram illustrating the information stored in the purchase candidate content presenting information recording unit 313 of the server 300 in the case of executing the presentation method by air.

The purchase candidate content presenting information recording unit 313 stores plural pieces of stream data 3400. One piece of stream data 3400 also includes plural pieces of metadata 3401.

The stream data 3400 is data indicating content to be broadcasted to the on-vehicle apparatus 100. Each of the plural pieces of stream data 3400 becomes information indicating broadcast content corresponding to each of plural channels. The stream data 3400 is, for example, information indicating TV broadcast content or radio broadcast content. Specifically, when indicating the TV broadcast content, the stream data 3400 includes sound information indicating sound in a TV broadcast, and image information indicating an image in the TV broadcast. Furthermore, when indicating the radio broadcast content, the stream data 3400 includes sound information indicating sound in a radio broadcast. The stream data 3400 becomes data expressing the TV broadcast content and the radio broadcast content in a streaming format. Specifically, the server 300 becomes a device that realizes a server-type broadcast.

Here, the stream data 3400 includes content. For example, the stream data 3400 includes sound content as the radio broadcast content. Furthermore, the TV broadcast content includes sound content or moving image content. For example, when certain music is played as the broadcast content reproduced by the stream data 3400, this stream data 3400 includes the sound content of this music.

Then, the metadata 3401 included in the stream data 3400 is information indicating a display detail of a screen that presents the content relating to the broadcast content reproduced based on the stream data 3400 as the purchase candidate. Specifically, the metadata 3401 corresponds to the purchase candidate content presenting information. More specifically, the stream data 3400 includes the information, which indicates the display detail of the screen presenting the content as the purchase candidate, as the metadata 3401 so as to correspond to the reproduced content data. As a result, for example, in the on-vehicle apparatus 100, when certain content is being reproduced as the broadcast content or has been reproduced, display presenting this content as the purchase candidate becomes possible. Furthermore, in the on-vehicle apparatus 100, when the content itself is not reproduced, but the broadcast content relating to this content is being reproduced (for example, certain music is introduced on a TV program), various manners of presenting the purchase candidate content data as the metadata 3401 can be considered such as presenting this content as the purchase candidate based on the metadata 3401.

Figure 15:
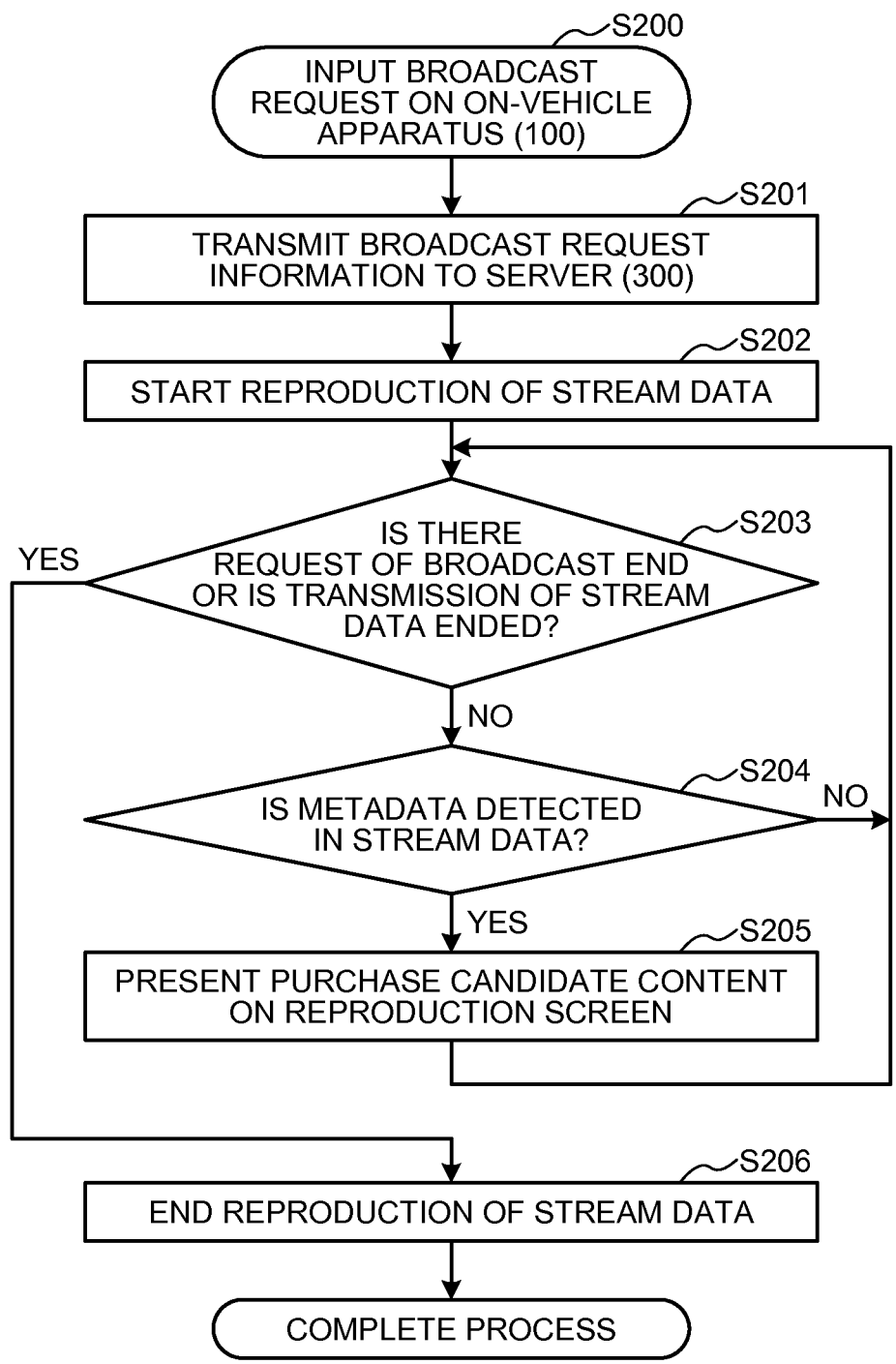
FIG. 15 is a process flow illustrating a process of the on-vehicle apparatus upon a broadcast request according to the embodiment of the present invention.

Subsequently, a process of the on-vehicle apparatus 100 upon a broadcast request will be described with reference to FIG. 15. FIG. 15 is a process flow illustrating the process of the on-vehicle apparatus 100 upon the broadcast request.

The operation input unit 104 receives from the user an input requesting the reproduction of a broadcast (S200). This input includes an input designating a channel of the broadcast of which reproduction is requested. The operation input unit 104 generates input information indicating the input detail according to the input from the user, and outputs the resultant to the control unit 103. Step S200 corresponds to step S20.

The control unit 103 generates broadcast request information requesting a broadcast, according to the output from the operation input unit 104 of the input information indicating the input that requests the reproduction of the broadcast. The broadcast request information is generated so as to indicate the channel indicated as the input detail in the input information. The control unit 103 transmits the generated broadcast request information to the server 300 via the data input/output unit 101 (S201). Step S201 corresponds to step S21. Specifically, the broadcast request information corresponds to the purchase candidate content presenting request information. Accordingly, the server 300 starts transmitting the stream data 3400, which indicates the broadcast content of the channel indicated by the broadcast request information, to the on-vehicle apparatus 100.

The control unit 103 starts reproducing the stream data 3400 transmitted from the server 300 (S202). Specifically, the control unit 103 receives the stream data 3400 transmitted from the server 300, via the data input/output unit 101, and reproduces the received stream data 3400. Specifically, when the stream data 3400 is stream data of the radio broadcast, the control unit 103 outputs the sound information of the radio broadcast included in the stream data 3400 to the speaker of the image/sound presenting unit 105. When the stream data 3400 is stream data of the TV broadcast, the control unit 103 outputs the sound information and image information of the TV broadcast included in the stream data 3400 to the liquid crystal monitor and the speaker of the image/sound presenting unit 105. The speaker of the image/sound presenting unit 105 outputs sound indicated by the sound information according to the output of the sound information from the control unit 103. The liquid crystal monitor of the image/sound presenting unit 105 displays an image indicated by the image information according to the output of the image information from the control unit 103. The reproduction of the stream data 3400 is continued until the user requests to the reproduction end of the broadcast or until the transmission of all the stream data 3400 from the server 300 ends (S203: No).

When detecting the metadata 3401 in the stream data 3400 transmitted from the server 300 during the reproduction of the stream data 3400 (S204: Yes), the control unit 103 displays an image, which presents the content relating to the current broadcast content as the purchase candidate content, on a reproduction screen displaying the broadcast content, based on the detected metadata 3401 (S205). Specifically, the control unit 103 generates image information indicating an image, which presents the purchase candidate content on the reproduction screen of the broadcast content, based on the metadata 3401, and outputs the resultant to the image/sound presenting unit 105. Here, in order that content can be presented as the purchase candidate on the reproduction screen in a period of reproducing broadcast content relating to the content, the metadata 3401 is inserted in the stream data 3400 at a start position of the data indicating the broadcast content in the period. As a result, every time the metadata 3401 is transmitted, the reproduction screen on which the content presented as the purchase candidate is changed is displayed for the user.

When the user requests the reproduction end of the broadcast, or when the transmission of all the stream data 3400 from the server 300 ends (S203: Yes), the control unit 103 ends the reproduction of the stream data 3400 (S206). Here, the case where the user requests the reproduction end of the broadcast will specifically be described. When receiving from the user an input requesting the reproduction end of the broadcast, the operation input unit 104 generates input information indicating the input detail, and outputs the resultant to the control unit 103. The control unit 103 ends the reproduction of the stream data 3400 according to the output from the operation input unit 104 of the input information indicating the input requesting the reproduction end of the broadcast. The control unit 103 also generates broadcast end request information requesting the end of the broadcast, and transmits the broadcast end request information to the server 300 via the data input/output unit 101. Steps S202 to S206 correspond to step S23.

Figure 16:
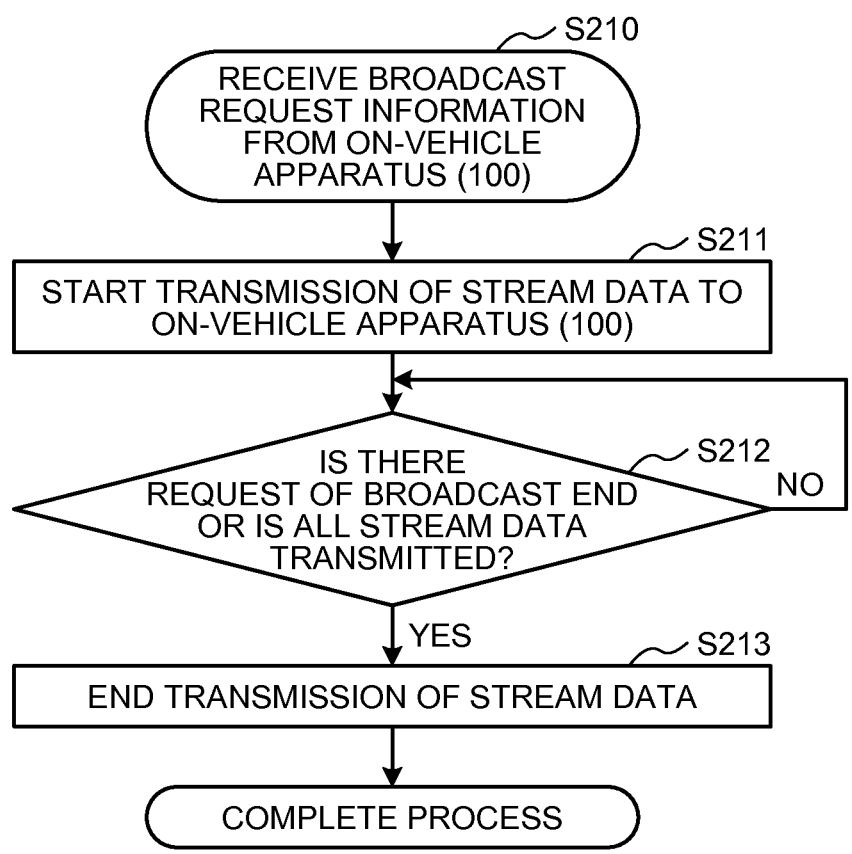
FIG. 16 is a process flow illustrating a process of the server upon receiving a broadcast request according to the embodiment of the present invention.

Subsequently, a process of the server 300 upon receiving a broadcast request will be described with reference to FIG. 16. FIG. 16 is a process flow illustrating the process of the server 300 upon receiving the broadcast request.

The control unit 302 receives the broadcast request information transmitted from the on-vehicle apparatus 100, via the data input/output unit 301 (S210). According to the reception of the broadcast request information, the control unit 302 starts transmitting the stream data 3400, which indicates the broadcast content of the channel indicated by the broadcast request information, to the on-vehicle apparatus 100 (S211). Specifically, the control unit 302 acquires the stream data 3400 of the channel indicated by the broadcast request information from the purchase candidate content presenting information recording unit 313, and transmits the stream data to the on-vehicle apparatus 100 via the data input/output unit 301. The transmission of the stream data 3400 is continued until the end of the broadcast is requested by the on-vehicle apparatus 100 or until all the stream data 3400 is transmitted (S212: No).

When the end of the broadcast is requested by the on-vehicle apparatus 100, or when all the stream data 3400 is transmitted (S212: Yes), the control unit 302 ends the transmission of the stream data 3400 to the on-vehicle apparatus 100 (S213). Here, the case where the end of the broadcast is requested by the on-vehicle apparatus 100 will specifically be described. The control unit 302 receives the broadcast end request information transmitted from the on-vehicle apparatus 100, via the data input/output unit 301. According to the reception of the broadcast end request information, the control unit 302 ends the transmission of the stream data 3400 to the on-vehicle apparatus 100. Steps S210 to S213 correspond to step S22.

Figure 17A:
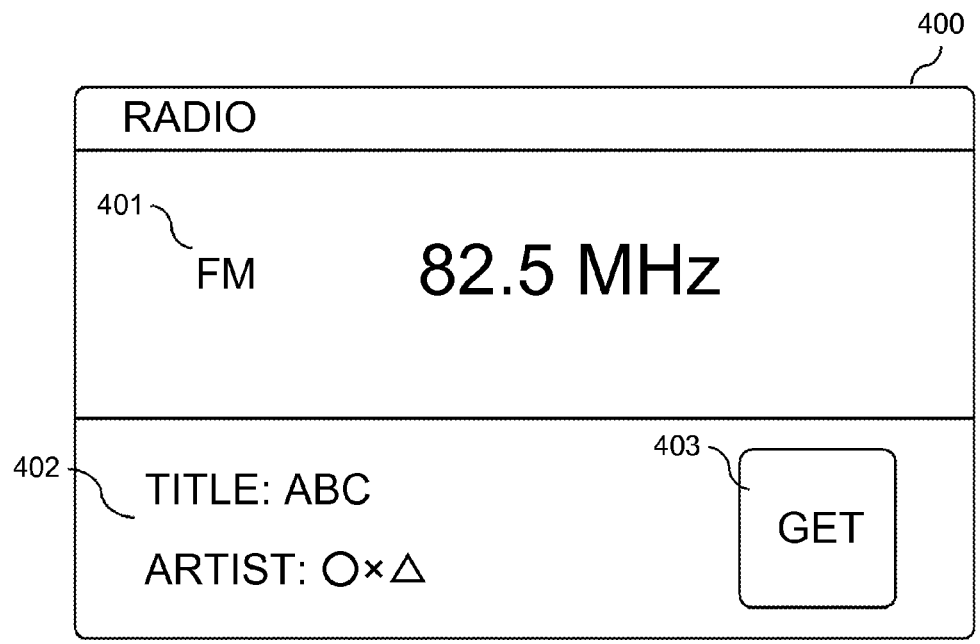
FIG. 17A is a diagram illustrating one example of a reproduction screen according to the embodiment of the present invention.
Figure 17B:
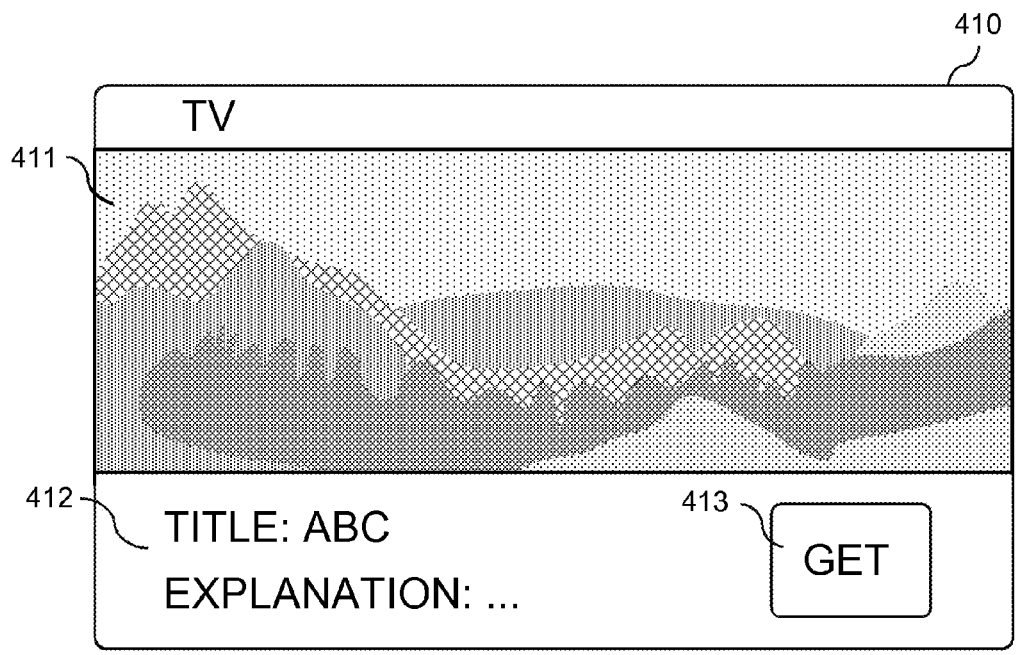
FIG. 17B is a diagram illustrating one example of a reproduction screen according to the embodiment of the present invention.

Here, reproduction screens 400 and 410 will be described with reference to FIGS. 17A and 17B. FIGS. 17A and 17B are diagrams illustrating one example of the reproduction screen. FIG. 17A illustrates one example of the reproduction screen 400 for the radio broadcast, while FIG. 17B illustrates one example of the reproduction screen 410 for the TV broadcast.

Firstly, one example of the reproduction screen 400 for the radio broadcast will be described with reference to FIG. 17A. As illustrated in FIG. 17A, the reproduction screen for the radio broadcast includes display 401 of a channel (frequency) that is currently broadcasted, content presenting display 402 presenting content relating to the current broadcast content, a get button 403 requesting issuance of a temporary license for this content, and the like. Specifically, the metadata 3401 includes information indicating a display detail that presents the content relating to the broadcast content as the purchase candidate content presenting information. FIG. 17A illustrates as an example the case where a title and an artist name are displayed as the content presenting display 402. Therefore, the metadata 3401 used for displaying this reproduction screen 400 includes the information indicating the title and the artist name.

As a result, the user can download and use the content presented as the purchase candidate only by depressing the get button 403 as described later. For example, when certain music (sound content) is being reproduced as the radio broadcast, the display detail presenting this music is displayed, and then the user can easily request the temporary license only by depressing the get button 403 once. Furthermore, for example, when certain music is introduced in a radio program reproduced as the radio broadcast, the display detail presenting this music is displayed, and then the user can easily request the temporary license only by depressing the get button 403 once. The same applies to the case where a certain movie (moving image content) is introduced in a radio program reproduced as the ratio broadcast.

Here, any details relating to the content may be displayed as the "content presenting display 402". For example, when the content is music, one or more of a title, an artist name, an album name, a release date, a category, time, a lyric writer, a composer, an explanation, a jacket image, and the like may be displayed. For example, when the content is a movie, at least one or more of a title, a release year and month, a movie director, a scenario, a performer, an explanation, a jacket image and the like may be displayed as the attribute information.

Subsequently, one example of the reproduction screen 410 for the TV broadcast will be descried with reference to FIG. 17B. As illustrated in FIG. 17B, the reproduction screen 410 for the TV broadcast includes display 411 of an image of the TV broadcast that is currently broadcasted, content presenting display 412 presenting content relating to the current broadcast content, a get button 413 requesting issuance of a temporary license for this content, and the like. FIG. 17B illustrates as an example the case where a title and an explanation are displayed as the content presenting display 412. Therefore, the metadata 3401 used for displaying this reproduction screen 410 includes information indicating the title and the explanation.

As a result, the user can download and use the presented content only by depressing the get button 413 as described later. As described above, for example, when a certain movie (moving image content) is being reproduced as the TV broadcast, the display detail presenting this movie is displayed, and then the user can easily request the temporary license only by depressing the get button 413 once. Furthermore, for example, when a certain movie is introduced in a TV program reproduced as the TV broadcast, the display detail presenting this movie is displayed, and then the user can easily request the temporary license only by depressing the get button 413 once. The same applies to the case where certain music (sound content) is introduced in a TV program reproduced as the TV broadcast.

Here, as one aspect of a modification of the above-described presentation method of presenting the purchase candidate content by air, the get button 403 and the get button 413 may be displayed, but the "content presenting display 402 and the content presenting display 412 relating to the current broadcast content" may not be displayed. Then, in the case where the get button 403 or the get button 413 is depressed when certain content is being reproduced as the broadcast content, the reproduced content can be downloaded and used. For example, in the case where the get button 403 or the get button 413 is depressed when certain music is played as the broadcast content reproduced by the stream data 3400, this music can be downloaded and used. In other words, in this case, the stream data 3400 itself (a part indicating the broadcast content) functions as the purchase candidate content presenting information.

(2) Presentation by Advertisement Display

Subsequently, a presentation method of presenting the purchase candidate content by advertisement display will be described. In this presentation method, the purchase candidate content presenting information recording unit 313 stores plural pieces of advertisement display information. The advertisement display information is information indicating the display detail of a screen presenting content, which the user is recommended to purchase, as the purchase candidate in an advertisement format. In other words, the advertisement display information corresponds to the purchase candidate content presenting information.

Subsequently, a process of the on-vehicle apparatus 100 upon an advertisement display request will be described with reference to FIG. 18. FIG. 18 is a process flow illustrating the process of the on-vehicle apparatus 100 upon the advertisement display request.

The operation input unit 104 of the on-vehicle apparatus 100 receives from the user an input requesting display of an advertisement (S220). The operation input unit 104 generates input information indicating the input detail according to the input from the user, and outputs the resultant to the control unit 103. Step S220 corresponds to step S20.

The control unit 103 generates advertisement transmission request information, which requests a transmission of the advertisement, according to the output from the operation input unit 104 of the input information indicating the input that requests the display of the advertisement. The control unit 103 transmits the generated advertisement transmission request information to the server 300 via the data input/output unit 101 (S221). Step S221 corresponds to step S21. In other words, the advertisement transmission request information corresponds to the purchase candidate content presenting request information. Accordingly, the server 300 starts transmitting the advertisement display information to the on-vehicle apparatus 100.

When the end of the display of the advertisement is not requested by the user (S222: No), the control unit 103 waits for the advertisement display information from the server 300 (S223). The control unit 103 receives the advertisement display information transmitted from the server 300, via the data input/output unit 101. When receiving the advertisement display information (S223: Yes), the control unit 103 displays an advertisement screen that recommends the user to purchase the content, based on the advertisement display information (S224). Specifically, the control unit 103 generates image information indicating the advertisement screen based on the advertisement display information, and outputs the resultant to the image/sound presenting unit 105. The image/sound presenting unit 105 displays the advertisement screen indicated by the image information according to the output of the image information from the control unit 103. As a result, every time the advertisement display information is transmitted, the advertisement screen on which the content presented as the purchase candidate is changed is displayed for the user.

When the end of the display of the advertisement is requested by the user (S222: Yes), the control unit 103 ends the display of the advertisement (S225). Specifically, when receiving from the user an input of an input detail requesting the end of the display of the advertisement, the operation input unit 104 generates input information indicating the input detail, and outputs the resultant to the control unit 103. The control unit 103 ends the output of the image information indicating the advertisement screen to the image/sound presenting unit 105, according to the output from the operation input unit 104 of the input information indicating the input detail that requests the end of the display of the advertisement. The control unit 103 also generates advertisement transmission end request information, which requests the end of the transmission of the advertisement, and transmits the information to the server 300 via the data input/output unit 101. Steps S223 to S225 correspond to step S23.

Subsequently, a process of the server 300 upon receiving the advertisement display request will be descried with reference to FIG. 19. FIG. 19 is a process flow illustrating the process of the server 300 upon receiving the advertisement display request.

The control unit 302 receives the advertisement transmission request information transmitted from the on-vehicle apparatus 100, via the data input/output unit 301 (S230). According to the reception of the advertisement transmission request information, the control unit 302 acquires the advertisement display information from the purchase candidate content presenting information recording unit 313, and transmits the advertisement display information to the on-vehicle apparatus 100 via the data input/output unit 301 (S231).

When the end of the transmission of the advertisement is not requested by the on-vehicle apparatus 100 (S232: No), the control unit 302 determines whether or not a fixed time elapses after the last transmission of the advertisement display information (S233). When the fixed time does not elapse (S233: No), the control unit 302 continues to wait until the fixed time elapses. When the fixed time elapses (S223: Yes), the control unit 302 acquires next advertisement display information from the purchase candidate content presenting information recording unit 313, and transmits the next advertisement display information to the on-vehicle apparatus 100 via the data input/output unit 301 (S231). Then, the control unit 302 waits for the fixed time again (S233). As a result, every time the fixed time elapses, the purchase candidate content presenting screen on which the content presented as the purchase candidate is changed is displayed for the user on the on-vehicle apparatus 100.

When the end of the transmission of the advertisement is requested by the on-vehicle apparatus 100 (S232: Yes), the control unit 302 ends the transmission of the advertisement display information to the on-vehicle apparatus 100 (S234). Specifically, the control unit 302 receives advertisement transmission end request information transmitted from the on-vehicle apparatus 100, via the data input/output unit 301. According to the reception of the advertisement transmission end request information, the control unit 302 ends the transmission of the advertisement display information to the on-vehicle apparatus 100. Steps S230 to S233 correspond to step S22.

Note that the description is made as an example here about the case where the server 300 transmits the advertisement display information to the on-vehicle apparatus 100, according to the reception of the advertisement transmission request information from the on-vehicle apparatus 100, but the server 300 is not limited thereto. For example, the server 300 may transmit the advertisement display information to the on-vehicle apparatus 100 according to the login completion of the on-vehicle apparatus 100.

Figure 20A:
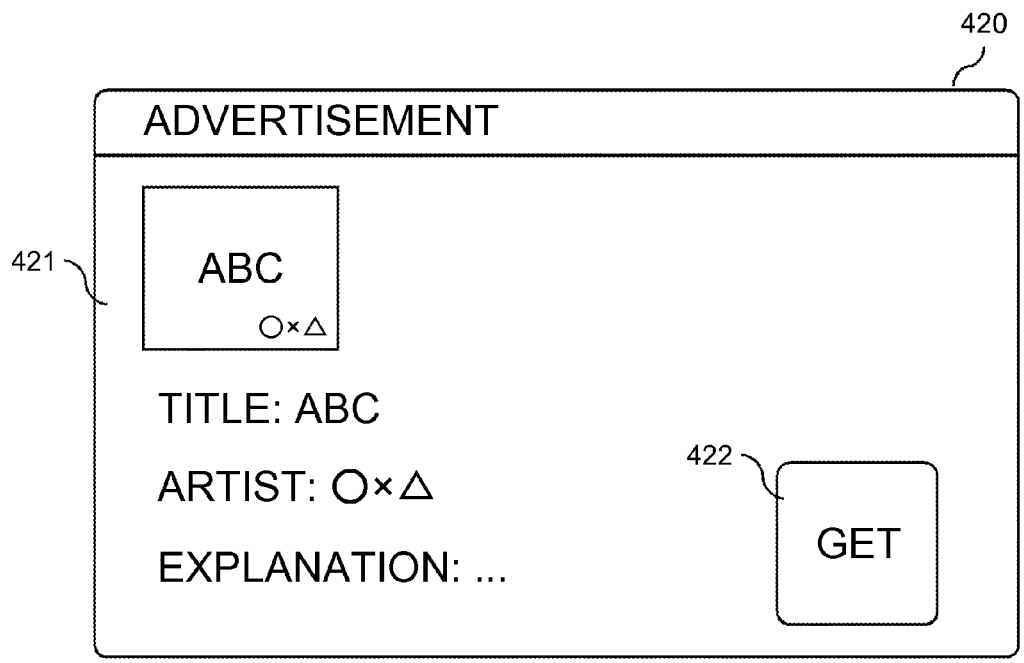
FIG. 20A is a diagram illustrating one example of an advertisement screen according to the embodiment of the present invention.
Figure 20B:
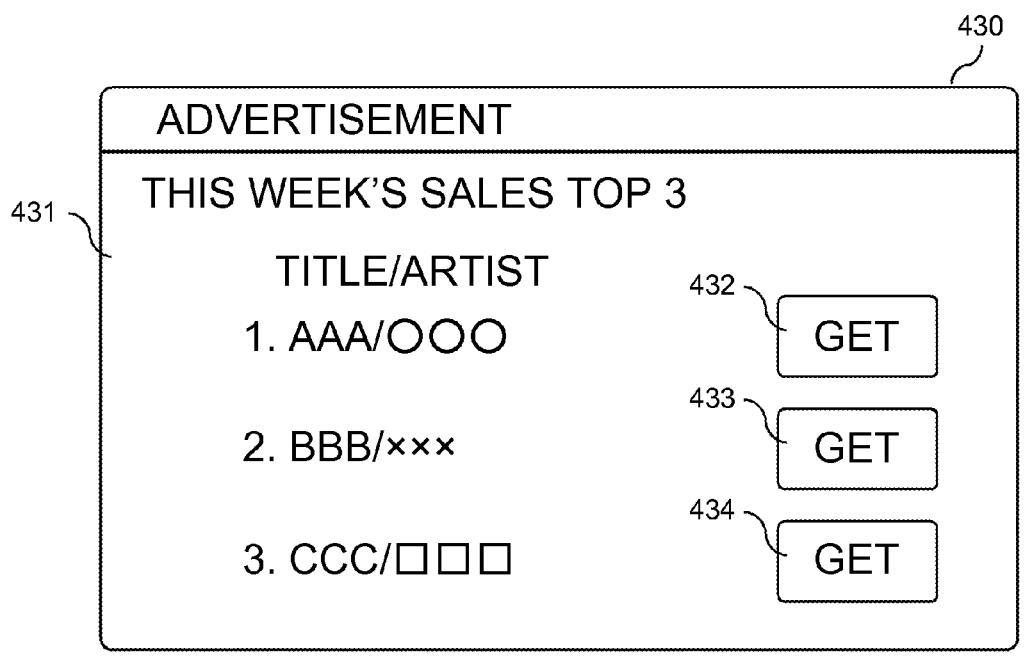
FIG. 20B is a diagram illustrating one example of an advertisement screen according to the embodiment of the present invention.

Here, advertisement screens 420 and 430 will be described with reference to FIGS. 20A and 20B. FIGS. 20A and 20B are diagrams illustrating one example of the advertisement screen.

As illustrated in FIG. 20A, the advertisement screen 420 includes content presenting display 421 presenting content that the user is recommended to purchase, a get button 422 requesting issuance of a temporary license for the content, and the like. Here, FIG. 20A illustrates as an example the case where a jacket image, a title, an artist name, and an explanation are displayed as the content presenting display 421. Therefore, the advertisement display information used for displaying the advertisement screen 420 includes information indicating the jacket image, the title, the artist name, and the explanation.

Furthermore, as illustrated in FIG. 20B, the advertisement screen 430 may present plural pieces of content. In this case, for example, a get button 432, a get button 433, and a get button 434 are displayed so as to correspond to each of the plural pieces of content as illustrated in FIG. 20B. As a result, when any of the get button 432, the get button 433, and the get button 434 is depressed, issuance of a temporary license for the content corresponding to the depressed get button may be requested. Here, FIG. 20B illustrates as an example the case where a title and an artist name are displayed as the content presenting display 431. Therefore, the advertisement display information used for displaying the advertisement screen 430 includes information indicating the title and the artist name.

7. Request of Temporary License (S3)

Subsequently, the temporary license requesting process in step S3 described above will be described in more detail.

Figure 21:
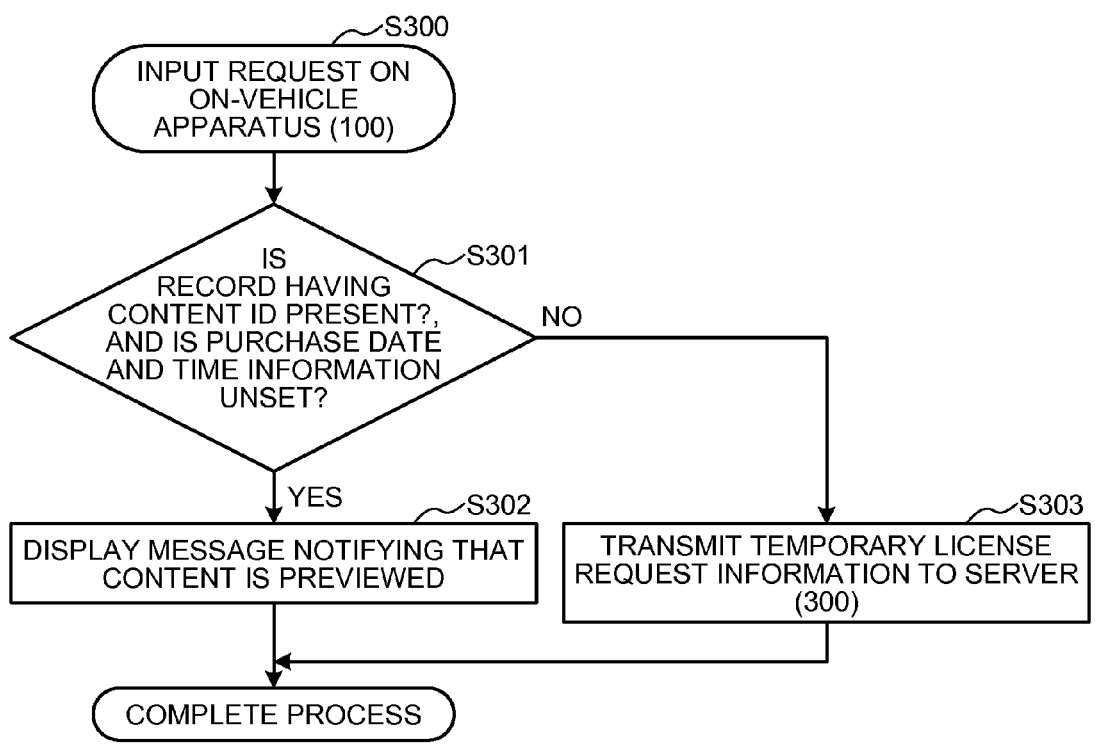
FIG. 21 is a process flow illustrating a temporary license requesting process of the on-vehicle apparatus according to the embodiment of the present invention.

The temporary license requesting process of the on-vehicle apparatus 100 will be described with reference to FIG. 21. FIG. 21 is a process flow illustrating the temporary license requesting process of the on-vehicle apparatus 100. Hereinafter, the above-described reproduction screens 400 and 410 and the advertisement screens 420 and 430 will be referred to as a "purchase candidate content presenting screen".

When the purchase candidate content is presented on the purchase candidate content presenting screen, the operation input unit 104 receives from the user an input requesting the issuance of the temporary license for the presented content (S300). The operation input unit 104 generates input information indicating the input detail according to the input from the user, and outputs the resultant to the control unit 103. Step S300 corresponds to step S30.

The control unit 103 determines whether or not a record, which indicates the content ID of the content presented on the purchase candidate content presenting screen, is present in the content management information 1100 stored in the content recording unit 111, and whether or not the purchase date and time information 1102 of this record is unset, according to the output from the operation input unit 104 of the input information indicating the input that requests the issuance of the temporary license for the content (S301). Specifically, the control unit 103 determines whether or not the content to which purchase is offered is previewed. When the record indicating the content ID of the content is present, and the purchase date and time information 1102 of this record is unset, the content is not purchased and is previewed.

Here, the content ID of the content presented on the purchase candidate content presenting screen is generated such that the content ID information of the content presented by the purchase candidate content presenting information is included in the purchase candidate content presenting information, and while the control unit 103 presents the content, this content ID information is stored in any storage device included in the on-vehicle apparatus 100. Then, the content ID of the content presented on the purchase candidate content presenting screen can be recognized by referring to the content ID information.

When the record indicating the content ID of the content to which the issuance of the temporary license is requested is present, and the purchase date and time information 1102 of this record is unset (S301: Yes), the control unit 103 displays a message notifying that the content is previewed (S302). Specifically, the control unit 103 generates image information indicating an image including the message that notifies that the content is previewed. The control unit 103 outputs the generated image information to the image/sound presenting unit 105. The image/sound presenting unit 105 displays an image indicated by the image information according to the output of the image information from the control unit 103.

When the record indicating the content ID of the content to which the issuance of the temporary license is requested is not present, or when the record indicating the content ID of the content to which the issuance of the temporary license is requested is present, and the purchase date and time information 1102 of this record is not unset (S301: No), the temporary license request information generating unit 1003 generates temporary license request information. The temporary license request information is generated so as to indicate the content ID of the content to which the issuance of the temporary license is requested. The temporary license request information generating unit 1003 transmits the generated temporary license request information to the server 300 via the data input/output unit 101 (S303). Step S303 corresponds to step S31 described above. Accordingly, content data with the temporary license is transmitted from the server 300.

Note that, as described later, the content data of the content whose purchasing procedure is done is acquired by another process. Therefore, in step S301, it may only be determined whether or not the record indicating the content ID of the content to which the issuance of the temporary license is requested is present. Specifically, the determination condition is not limited to the above-described determination condition, so long as it can be determined whether or not the content to which the issuance of the temporary license is requested is previewed.

Here, as a method in which the user requests the issuance of the temporary license for the content, following three request input methods will be described.

(1) Request input method by button operation
(2) Request input method by sound
(3) Automatic request input method of content at the driving end (1) Request Input Method by Button Operation In this request input method, it is supposed that an input from the user that manually depresses the get button displayed on the purchase candidate content presenting screen is the input requesting the issuance of the temporary license for the content presented on the purchase candidate content presenting screen. Note that since FIGS. 17A, 17B, 20A, and 20B illustrate the case where the get button is displayed on the touch panel, in the present example, the input depressing the get button becomes the input touching the get button.

Specifically, the operation input unit 104 receives an input from the user that depresses the get button on the purchase candidate content presenting screen. The operation input unit 104 generates input information indicating the input detail according to the input from the user, and outputs the resultant to the control unit 103. When the input information outputted from the operation input unit 104 indicates the input depressing the get button, the control unit 103 determines that there is the input requesting the temporary license for the content. According to the above, the issuance of the temporary license for the content can be requested only by touching the get button on the touch panel once.

Here, the get button on the purchase candidate content presenting screen may not be displayed. In this case, any touch on the purchase candidate content presenting screen (touch panel) is recognized as the input requesting the issuance of the temporary license for the content. The input requesting the issuance of the temporary license for the content is not limited to the case of touching on the touch panel, but may be an input depressing a physical operation button assigned for the get button. According to the above, the issuance of the temporary license for the content can also be requested only by depressing the operation button once.

Furthermore, when the content is presented as the purchase candidate by reproducing the content as the broadcast content as described above, the above-described image presenting the content may not be displayed. In this case, the touch of the touch panel or the depression of the operation button during the reproduction of the content is recognized as the input requesting the issuance of the temporary license for the content.

(2) Request Input Method by Sound

In this request input method, it is supposed that an input from the user of sound indicating that the issuance of the temporary license for the content is requested is the input requesting the temporary license for the content.

Specifically, the operation input unit 104 receives from the user an input of sound indicating that the issuance of the temporary license for the content is requested, during the presentation of the purchase candidate content. The operation input unit 104 generates sound information indicating sound inputted from the user, and outputs the resultant to the control unit 103.

Here, as the sound indicating that the issuance of the temporary license for the content is requested, a predetermined keyword, any password preliminarily set by the user, or the like are used. For example, when the user pronounces a predetermined keyword such as "get" or "download" as sound, this sound is inputted as the sound indicating that the issuance of the temporary license for the content is requested. When the sound information outputted from the operation input unit 104 indicates the sound indicating that the temporary license for the content is requested, the control unit 103 determines that there is the input requesting the temporary license for the content.

(3) Automatic Request Input Method of Content at the Driving End

In addition to the above-described request input methods (1) and (2), the issuance of the temporary license for the presented content may automatically be requested at the driving end. According to the above, even when the content presentation is started just before the driving end, the issuance of the temporary license for the content can be requested without omission.

Specifically, when determination of the driving end is made, the control unit 103 executes the processes after step S301 described above. Here, the detail of the determination of the driving end will be described in "9. Urging of formal license request (S5)" described later.

8. Issuance of Temporary License (S4)

Subsequently, the provision of the content data with the temporary license, i.e., the temporary license issuing process, in step S4 will be described in more detail.

Figure 22:
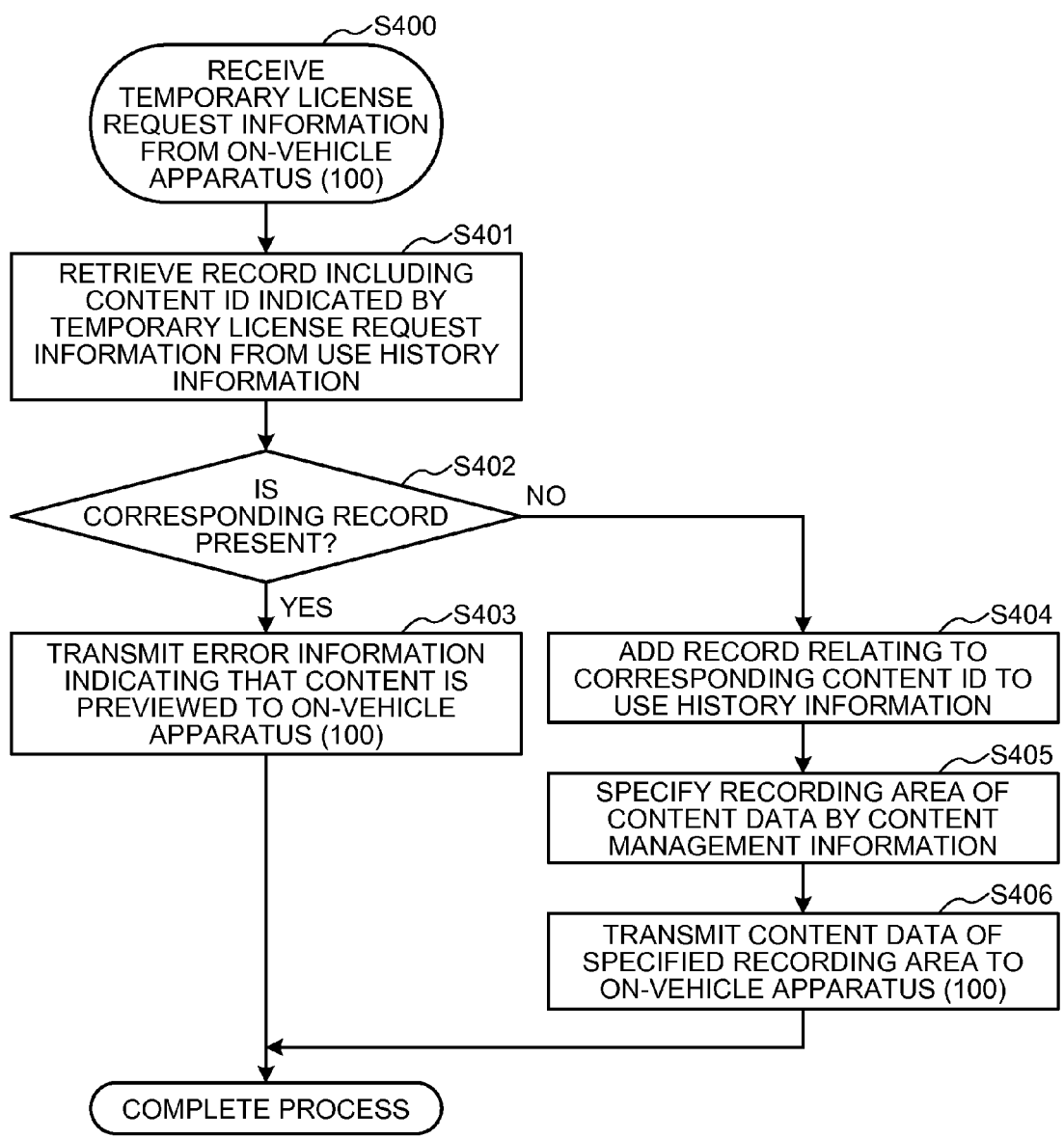
FIG. 22 is a process flow illustrating a process of the server upon receiving temporary license request information according to the embodiment of the present invention.

A process of the server 300 upon receiving the temporary license request information will be described with reference to FIG. 22. FIG. 22 is a process flow illustrating the process of the server 300 upon receiving the temporary license request information.

The control unit 302 receives the temporary license request information transmitted from the on-vehicle apparatus 100, via the data input/output unit 301 (S400). According to the reception of the temporary license request information, the control unit 302 retrieves a record, which includes the content ID information indicating the content ID indicated by the temporary license request information, from the use history information 3200 stored in the user information recording unit 312 (S401). Specifically, the control unit 302 determines whether or not the content of which a transmission is requested by the on-vehicle apparatus 100 is previewed.

When the retrieved record is present (S402: Yes), the control unit 302 generates error notification information notifying that the content is previewed, and transmits the error notification information to the on-vehicle apparatus 100 via the data input/output unit 301 (S403).

When the retrieved record is not present (S402: No), the control unit 302 adds a record relating to the content ID indicated by the temporary license request information to the use history information 3200 stored in the user information recording unit 312 (S404). Specifically, the control unit 302 adds a record that includes the content ID information 3201 indicating the content ID indicated by the temporary license request information. The control unit 302 sets the preview date and time information 3202 in the added record so as to indicate a date and time when the record is added. Steps S400 to S404 correspond to step S40.

The control unit 302 specifies a recording area of the content data of the content ID indicated by the temporary license request information based on the content management information 3100 stored in the content recording unit 311 (S405). Specifically, the control unit 302 specifies a recording area indicated by the recording area information 3102 in the record, which includes the content ID information 3101 indicating the content ID indicated by the temporary license request information, as the recording area of the content data.

The control unit 302 acquires the content data stored in the specified recording area from the content recording unit 311, adds a predetermined restriction, i.e., a temporary license to the content data, and transmits the content data to the on-vehicle apparatus 100 via the data input/output unit 301 (S406). Steps S405 and S406 correspond to step S41.

Figure 23:
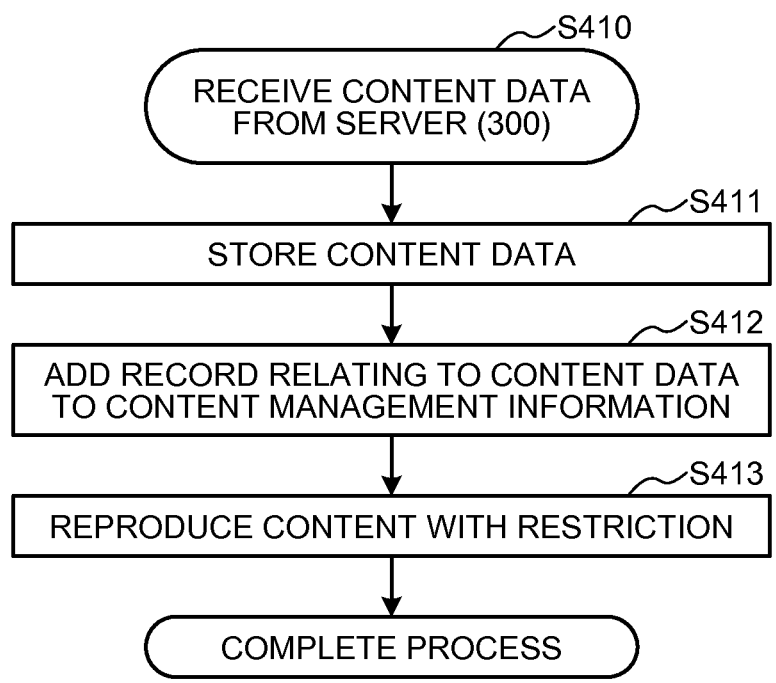
FIG. 23 is a process flow illustrating a process of the on-vehicle apparatus upon receiving content data according to the embodiment of the present invention.

Subsequently, a process of the on-vehicle apparatus 100 upon receiving content data will be described with reference to FIG. 23. FIG. 23 is a process flow illustrating the process of the on-vehicle apparatus 100 upon receiving content data.

The control unit 103 receives the content data with the temporary license transmitted from the server 300, via the data input/output unit 101 (S410). The control unit 103 stores the received content data with the temporary license in the content recording unit 111 (S411). The control unit 103 adds a record, which includes the content ID information 1101 indicating the content ID of the received content data with the temporary license, to the content management information 1100 stored in the content recording unit 111 (S412). The control unit 103 sets the recording area information 1103 in the added record so as to indicate the recording area where the content data is stored.

Here, the control unit 302 of the server 300 transmits the content ID information indicating the content ID of the received content data with the temporary license to the on-vehicle apparatus 100 together with the content data with the temporary license, so that the control unit 103 can recognize the content ID by the received content ID information.

The control unit 103 reproduces the content with the restriction based on the content data with the temporary license recorded in the recording area (S413). As a result, the content with the restriction is reproduced. Specifically, when the content data is content data of sound content, the control unit 103 outputs sound information included in the content data to the image/sound presenting unit 105. Furthermore, when the content data is content data of moving image content with sound, the control unit 103 outputs sound information and image information included in the content data to the image/sound presenting unit 105. Furthermore, when the content data is content data of moving image content without sound, the control unit 103 outputs image information included in the content data to the image/sound presenting unit 105. The image/sound presenting unit 105 outputs the sound indicated by the sound information according to the output of the sound information from the control unit 103. The image/sound presenting unit 105 displays the image indicated by the image information according to the output of the image information from the control unit 103. Steps S410 to S413 correspond to step S42.

Here, the following two providing methods will be described as a method of providing the content with restriction.

(1) Provision in which restriction is added to content itself
(2) Provision in which restriction is added during reproduction of content (1) Provision in which Restriction is Added to Content Itself In this providing method, content data with restriction that indicates content with restriction, and content data without restriction that indicates the same content without restriction are prepared beforehand. Specifically, in this providing method, the content data with restriction and the content data without restriction are stored beforehand in the content recording unit 311. During preview, the server 300 transmits the content data with restriction to the on-vehicle apparatus 100, and the control unit 103 reproduces the content with restriction based on the content data with restriction. Then, after the purchasing procedure after the driving end, the server 300 transmits the content data without restriction to the on-vehicle apparatus 100, and the control unit 103 reproduces the content without restriction based on the content data without restriction.

(2) Provision in which Restriction is Added During Reproduction of Content

In this providing method, the content data used for the reproduction of the content is the same during preview and after the completion of the purchasing procedure. In this providing method, when reproducing content during preview, the control unit 103 reproduces the content with restriction being added. Then, when reproducing the content after the purchasing procedure after the driving end, the control unit 103 reproduces the content without restriction added thereto. Specifically, when the purchase date and time is not set in the record relating to the content to be reproduced in the content management information 1100, the control unit 103 reproduces the content with restriction being added thereto, and when the purchase date and time is set in the record relating to the content to be reproduced, the control unit 103 reproduces the content without restriction being added thereto.

Subsequently, a detail of the restriction of the content will be described. The following four details of the restriction will be described as examples of the detail of the restriction of the content.

(1) Restriction of a display detail in which a part of an image is hidden (moving image content)

(2) Restriction of a display detail in which an entire image is hidden (moving image content)

(3) Restriction of an operation detail during reproduction (sound content, moving image content)

(4) Restriction of quality of content (sound content, moving image content)

(1) Restriction of Display Detail in which Part of Image is Hidden (Moving Image Content)

Figure 24:
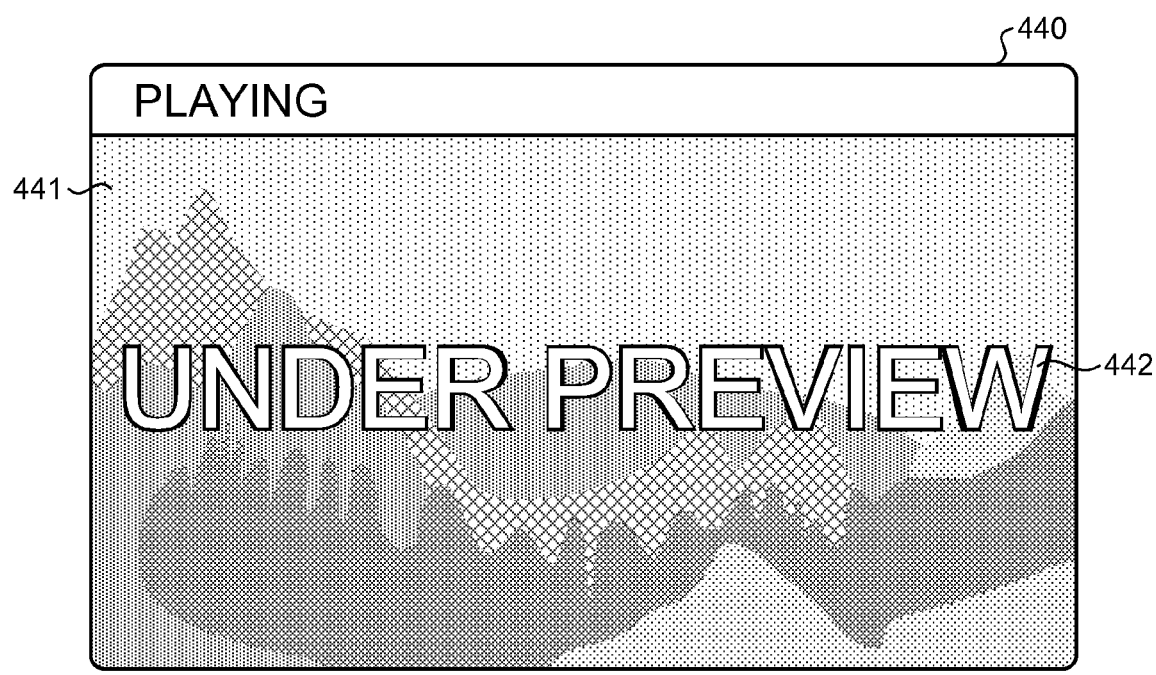
FIG. 24 is a diagram illustrating a display example of content with restriction according to the embodiment of the present invention.

In this detail of the restriction, a display detail of content is restricted by hiding a part of an image of the content during the reproduction of the moving image content. Here, any size, shape and the like of an area where an image is hidden may be determined beforehand. For example, as illustrated in the reproduction screen 440 in FIG. 24, display of a part of an image may be restricted by laying a character 442 indicating that the content is under preview (the purchasing procedure is not completed) over an image 441 and displaying the image.

When content with restriction is provided by adding restriction to the content itself, the content with restriction can be provided by setting image information included in the content data so as to indicate an image, a part of which is hidden beforehand.

When content with restriction is provided by adding restriction during the reproduction of the content, the control unit 103 generates image information indicating an image, a part of which is hidden, indicated by image information based on the image information included in the content data for execution. Then, the control unit 103 can provide the content with restriction by outputting the generated image information to the image/sound presenting unit 105, instead of the image information included in the content data.

(2) Restriction of Display Detail in which Entire Image is Hidden (Moving Image Content)

In this detail of the restriction, a display detail of content is restricted by hiding an entire image of the content during the reproduction of the moving image content. Here, the content may be restricted by any methods so long as it is a method of hiding an entire image of the content. For example, a completely blackened image may be displayed in place of the original image of the content, or an image painted with a color other than black may be displayed in place of the original image of the content, or without limited to an image painted with a single color, any substitute image may be displayed in place of the original image of the content. Specifically, any image may be displayed, so long as it is an image different from the original image of the content. In this case, only sound of the original content is outputted from the image/sound presenting unit 105.

When content with restriction is provided by adding restriction to the content itself, the content with restriction can be provided by setting beforehand image information included in the content data so as to indicate an image different from the original image of the content.

When content with restriction is provided by adding restriction during reproduction of the content, the control unit 103 hides an image of the content by outputting image information, which is different from the original image of the content, to the image/sound presenting unit 105 in place of the image information included in the content data. This is performed, for example, by preliminarily storing image information indicating an image to be displayed in the content recording unit 111 in place of the image information of the content data, and outputting this image information to the image/sound presenting unit 105.

(3) Restriction of Operation Detail During Reproduction (Sound Content, Moving Image Content)

In this detail of the restriction, a detail of operation from the user to the operation input unit 104 during reproduction of content is restricted. For example, in the case where the content is sound content, any one or more kinds of operation of fast-forward, fast-rewind, pause, reverse reproduction, acceleration playback, deceleration playback, and the like are restricted. Furthermore, in the case where the sound content is music, any one or more kinds of operation of a skip of music, random reproduction and the like in addition to the above operation may be restricted. Furthermore, in the case where the content is moving image content, any one or more kinds operation of fast-forward, fast-rewind, pause, reverse reproduction, acceleration playback, deceleration playback, a chapter skip, chapter selection/reproduction and the like may be restricted.

Specifically, the operation input unit 104 receives from the user an input of the above-described operation during the reproduction of content. The operation input unit 104 outputs input information indicating the input detail to the control unit 103 according to the input from the user. The control unit 103 determines whether or not the operation indicated by the input information is restricted operation according to the output from the operation input unit 104 of the input information indicating the input of the operation during the reproduction of the content. When the operation is the restricted operation, the control unit 103 inhibits the control of the content according to this operation. When the operation is not the restricted operation, the control unit 103 controls the content according to this operation. Note that whether or not the operation is the restricted operation is determined, for example, in such a manner that restricted operation information indicating a list of restricted operation is preliminarily stored in any storage device included in the on-vehicle apparatus 100, and the control unit 103 determines whether or not the operation indicated by the input information corresponds to the operation indicated by the restricted operation information.

As described above, in the case where content with restriction is provided, the control unit 103 restricts the above-described operation, when the content data is content data with restriction. Here, whether or not the content data is content data with restriction can be determined in such a manner that identification information identifying whether or not the content data is content data with restriction is preliminarily included in the content data, and the control unit 103 refers to the identification information.

In the case where content with restriction is provided by adding restriction during the reproduction of the content, the control unit 103 restricts the above-described operation when the purchasing procedure for the content to be reproduced is not completed. Specifically, the control unit 103 restricts the above-described operation, when the purchase date and time is not set in the purchase date and time information 1102 in the record indicating the content ID of the content to be reproduced in the content management information 1100.

(4) Restriction of Quality of Content (Sound Content, Moving Image Content)

In this detail of the restriction, quality of content is restricted by reducing quality of the content during the reproduction of the content. Here, content may be restricted by any method so long as it is a method of deteriorating the quality of the content. For example, in sound content or moving image content, a sampling rate of sound may be reduced, or in moving image content, resolution of an image may be reduced. Furthermore, in moving image content, both a sampling rate of sound and resolution of an image may be reduced.

When content with restriction is provided by adding restriction to the content itself, the content with restriction can be provided by preliminarily reducing a sampling rate of sound indicated by sound information included in the content data, or preliminarily reducing resolution of an image indicated by image information included in the content data.

When content with restriction is provided by imposing restriction during the reproduction of the content, the control unit 103 reduces quality of the content by subjecting sound information included in the content data to a sound process of reducing a sampling rate of sound, or by subjecting image information included in the content data to an image process of reducing resolution of an image. Specifically, the control unit 103 performs the above-described restriction of quality, when the purchase date and time is not set in the purchase date and time information 1102 in the record indicating the content ID of the content to be reproduced in the content management information 1100.

9. Urging of Formal License Request (S5)

Subsequently, the formal license request urging process in step S5 will be described in more detail.

Firstly, the determination of the driving end will be described. Here, in the content data distribution system 1, any of the control unit 103 of the on-vehicle apparatus 100, the control unit 203 of the communication terminal 200, and the control unit 302 of the server 300 may determine the driving end of the vehicle by the user.

Determination of the Driving End by Control Unit 103 of On-Vehicle Apparatus 100

Figure 25:
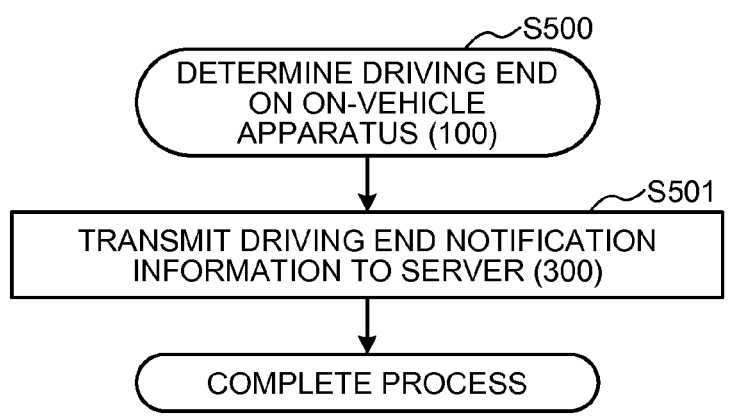
FIG. 25 is a process flow illustrating a process of driving end determination of the on-vehicle apparatus according to the embodiment of the present invention.

Firstly, the determination of the driving end by the on-vehicle apparatus 100 will be described. FIG. 25 is a flowchart illustrating a process of generating and transmitting driving end notification information by the on-vehicle apparatus 100. When the control unit 103 of the on-vehicle apparatus 100 determines the driving end (S500), the driving end notification information generating unit 1006 generates the driving end notification information notifying of the driving end, according to the determination of the driving end, and transmits the driving end notification information to the server 300 via the data input/output unit 101 (S501). Note that the method of determining the driving end that is performed by the control unit 103 will be described later in detail. Step S500 corresponds to step S50. Step S501 corresponds to step S51.

The process of generating and transmitting the driving end notification information by the communication terminal 200 is similar to the process by the on-vehicle apparatus 100. Specifically, when the control unit 203 of the communication terminal 200 determines the driving end, the driving end notification information generating unit 2003 generates driving end notification information notifying of the driving end, according to the determination of the driving end, and transmits the driving end notification information to the server 300 via the data input/output unit 201.

Furthermore, the server 300 can also generate the driving end notification information. In this case, when the control unit 302 of the server 300 determines the driving end, the driving end notification information generating unit 3007 generates the driving end notification information, based on the determination of the driving end.

Note that, as described above, the on-vehicle apparatus 100, the communication terminal 200, and the server 300 can generate the driving end notification information based on the determination of the driving end made on its own, but can also generate the driving end notification information based on the determination of the driving end made by another device by transmitting and receiving the information relating to the determination of the driving end to and from one another.

Specifically, the driving end notification information generating unit 1006 of the on-vehicle apparatus 100 can also generate the driving end notification information based on the determination of the driving end made by the control unit 203 of the communication terminal 200 and the information relating to the driving end generated based on the determination, which are received from the data input/output unit 102, or based on the determination of the driving end made by the control unit 302 of the server 300 and the information relating to the determination of the driving end generated based on the determination, which are received from the data input/output unit 101. Then, similarly, the driving end notification information generating unit 2003 of the communication terminal 200 can generate the driving end notification information based on the determination of the driving end made by the on-vehicle apparatus 100 or the server 300, and the driving end notification information generating unit 3007 of the server 300 can generate the driving end notification information based on the determination of the driving end made by the on-vehicle apparatus 100 or the communication terminal 200.

Figure 26:
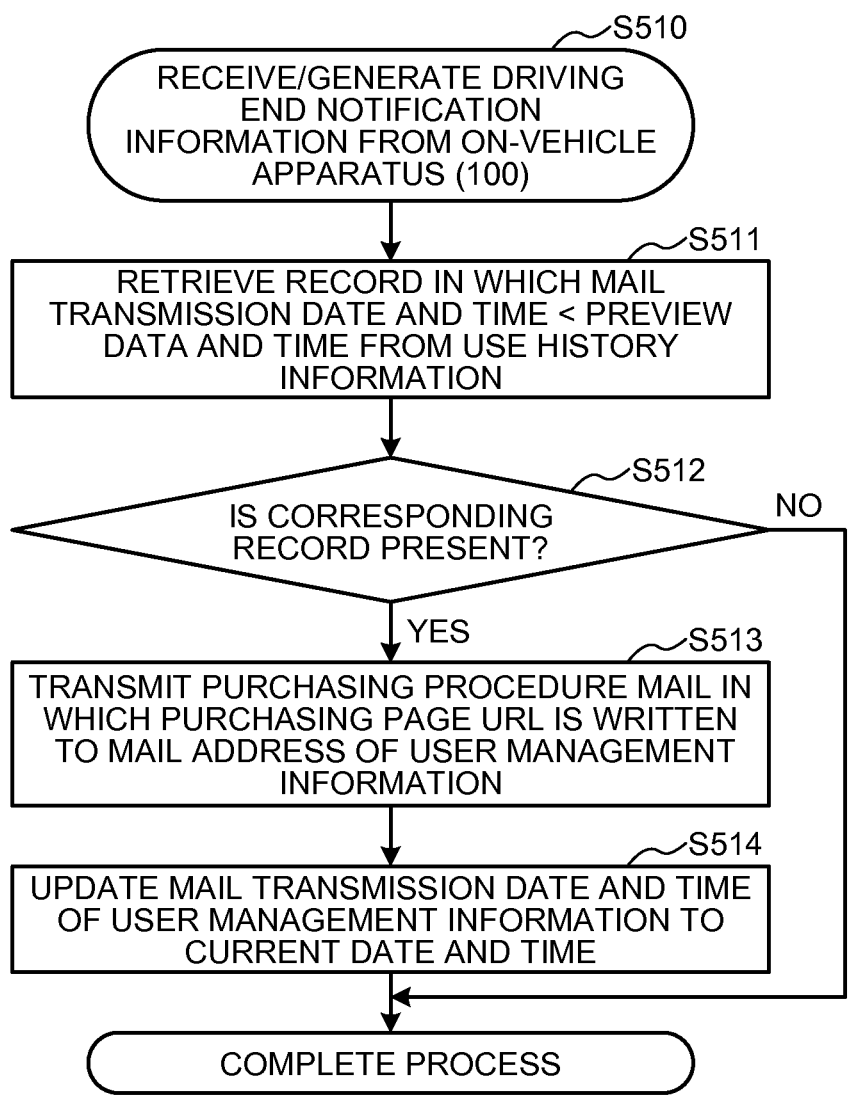
FIG. 26 is a process flow illustrating a process of the server upon generating a purchasing procedure mail according to the embodiment of the present invention.

Subsequently, a purchasing procedure mail generating process of the server 300 will be described with reference to FIG. 26. FIG. 26 is a process flow illustrating a process of the server 300 upon generating a purchasing procedure mail.

The control unit 302 receives the driving end notification information transmitted from the on-vehicle apparatus 100 or the communication terminal 200, via the data input/output unit 301, or generates as the driving end notification information generating unit 3007 the driving end notification information (S510). The control unit 302 retrieves a record, which includes preview data and time information 3202 indicating a preview date and time that is a date and time after a mail transmission date and time indicated by the mail transmission date and time information 3307 included in the user management information 3300 stored in the user information recording unit 312, from the use history information 3200 stored in the user information recording unit 312, according to the received or generated driving end notification information (S511). When the retrieved record is not present (S512: No), the process ends.

When the retrieved record is present (S512: Yes), the control unit 302 generates the purchasing procedure mail in which a URL (Uniform Resource Locator) of a purchasing procedure page is written, and transmits the mail to a mail address indicated by the mail address information 3301 included in the user management information 3300 stored in the user information recording unit 312 (S513). Specifically, the control unit 302 transmits the generated purchasing procedure mail to the communication terminal 200 via the data input/output unit 301. Step S513 corresponds to steps S53 and S54. As described above, when content whose preview date and time is a date and time after the mail transmission date and time of the previous purchasing procedure mail is present, the purchasing procedure mail urging the purchasing procedure for the content is transmitted. With this process, the control unit 302 can urge the user to perform the purchasing procedure, only when there is previewed content which the control unit 302 does not urge the user to perform the purchasing procedure for this content.

Then, the control unit 302 updates the mail transmission date and time information 3307 included in the user management information 3300 stored in the user information recording unit 312 so as to indicate the current date and time (the date and time when the purchasing procedure mail is transmitted) (S514).

Next, the following eleven determination methods will be described as the method of determining the driving end.

(1) Determination by means of map information and a GPS (Global Positioning System)

(2) Determination by means of a distance between the on-vehicle apparatus 100 and the communication terminal 200 (determination by means of communication)

(3) Determination by means of an output from a sensor (4) Determination by means of matching between outputs from sensors of the on-vehicle apparatus 100 and the communication terminal 200

(5) Determination by means of an operating condition of the communication terminal 200

(6) Determination by means of operation of a door of a driver's seat (7) Determination by means of a parking state (8) Determination by means of a charging state (electric vehicle)

(9) Determination by means of an ACC power source state

(10) Determination by means of a distance between the on-vehicle apparatus 100 and the communication terminal 200 (determination by means of a GPS)

(11) Determination by means of logout of the on-vehicle apparatus 100 from the server 300

Determination of the driving end by control unit 103 of on-vehicle apparatus 100

(1) Determination by Means of Map Information and GPS

In this determination method, when the arrival of the vehicle (on-vehicle apparatus 100) to a destination is detected based on a map and a position of the vehicle, it is determined that the driving is ended. This is because, when the vehicle arrives at the destination set by the user, it is considered that the driving does not continue any more in general. Specifically, in this determination method, the case where the on-vehicle apparatus 100 is a car navigation system is described.

Figure 27:
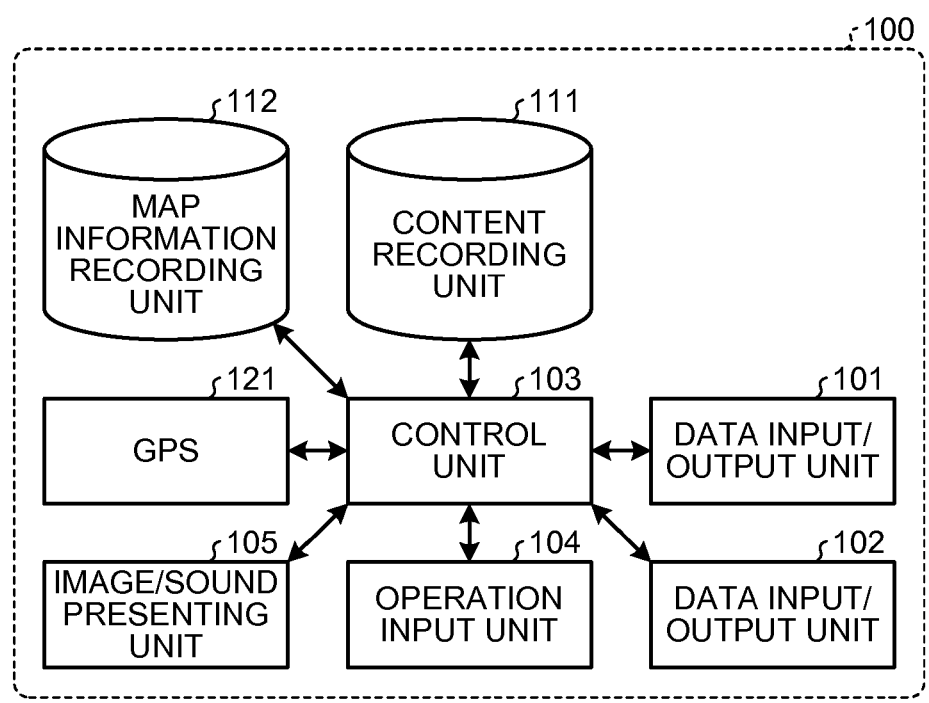
FIG. 27 is a block diagram illustrating an example of a configuration of the on-vehicle apparatus in the case of executing a determination method by means of map information and a GPS.

A configuration of the on-vehicle apparatus 100 in the case of executing the determination method by means of the map information and GPS will be described with reference to FIG. 27. FIG. 27 is a block diagram illustrating an example of the configuration of the on-vehicle apparatus 100 in the case of executing the determination method by means of the map information and GPS.

The on-vehicle apparatus 100 further includes a map information recording unit 112 and a GPS (Global Positioning System) 121, in addition to the data input/output units 101 and 102, the control unit 103, the operation input unit 104, the image/sound presenting unit 105, and the content recording unit 111.

The map information recording unit 112 stores the map information indicating a map. The map information recording unit 112 includes any recording device for storing the map information.

The GPS 121 measures a position of the vehicle (on-vehicle apparatus 100) based on a signal from a GPS satellite. The GPS 121 generates positioning information indicating the measured vehicle position in a coordinate (longitude and latitude). The GPS 121 outputs the generated positioning information to the control unit 103.

It is supposed here that a destination of the vehicle is set by the user on the map indicated by the map information stored in the map information recording unit 112 of the on-vehicle apparatus 100. Specifically, the operation input unit 104 receives an input setting a destination from the user. The operation input unit 104 generates input information indicating the input detail, according to the input from the user, and outputs the input information to the control unit 103. The control unit 103 sets the destination on the map according to the output from the operation input unit 104 of the input information indicating the input setting the destination.

The GPS 121 sequentially generates positioning information, and outputs the resultant to the control unit 103. The control unit 103 determines whether or not the position indicated by the positioning information outputted from the GPS 121 becomes the position of the destination on the map indicated by the map information stored in the map information recording unit 112, according to the output of the positioning information from the GPS 121. When the position indicated by the positioning information becomes the position of the destination on the map indicated by the map information, the control unit 103 determines that the driving is ended. When the position indicated by the positioning information does not become the position of the destination on the map indicated by the map information, the control unit 103 determines that the driving is not ended.

(2) Determination by Means of Distance Between On-Vehicle Apparatus 100 and Communication Terminal 200 (Determination by Means of Communication)

In this determination method, when it is detected that the on-vehicle apparatus 100 and the communication terminal 200 are apart from each other by a predetermined distance based on a communication status between the on-vehicle apparatus 100 and the communication terminal 200, it is determined that the driving is ended. This is because, in this case, it is considered that the user carrying the communication terminal 200 gets out of the vehicle and is apart from the vehicle (on-vehicle apparatus 100).

Specifically, Near field wireless communication that enables communication only within a predetermined distance range is used for wireless communication between the data input/output unit 102 of the on-vehicle apparatus 100 and the data input/output unit 201 of the communication terminal 200. According to the above, the control unit 103 of the on-vehicle apparatus 100 can detect that the on-vehicle apparatus 100 and the communication terminal 200 are apart from each other by a predetermined distance or more by detecting an interruption of the communication with the communication terminal 200 via the data input/output unit 102.

The interruption of the communication between the on-vehicle apparatus 100 and the communication terminal 200 may be detected by any method so long as it can detect the interruption of the communication between the on-vehicle apparatus 100 and the communication terminal 200. For example, the interruption of the communication may be detected in such a manner that the control unit 103 of the on-vehicle apparatus 100 transmits communication confirmation information confirming the communication status, to the communication terminal 200 via the data input/output unit 102 every fixed time, and the control unit 203 of the communication terminal 200 transmits response information, which becomes a response to the communication confirmation information, to the on-vehicle apparatus 100 via the data input/output unit 201 according to the reception of the communication confirmation information. In this case, when the response information is not transmitted from the communication terminal 200 according to the transmission of the communication confirmation information, the control unit 103 of the on-vehicle apparatus 100 determines that the communication between the on-vehicle apparatus 100 and the communication terminal 200 is interrupted.

Other known techniques can be employed so long as it can determine that the distance between the on-vehicle apparatus 100 and the communication terminal 200 becomes a predetermined distance or more, such as a technique of utilizing a change in radio field intensity of the communication between the on-vehicle apparatus 100 and the communication terminal 200.

(3) Determination by Means of Output from Sensor

In this determination method, when a output value from the sensor does not change (when the vehicle is not traveling) during a predetermined time based on the output value from the sensor which changes according to the traveling of the vehicle, it is determined that the driving is ended. This is because, in this case, it is considered that the vehicle is not traveling.

Figure 28:
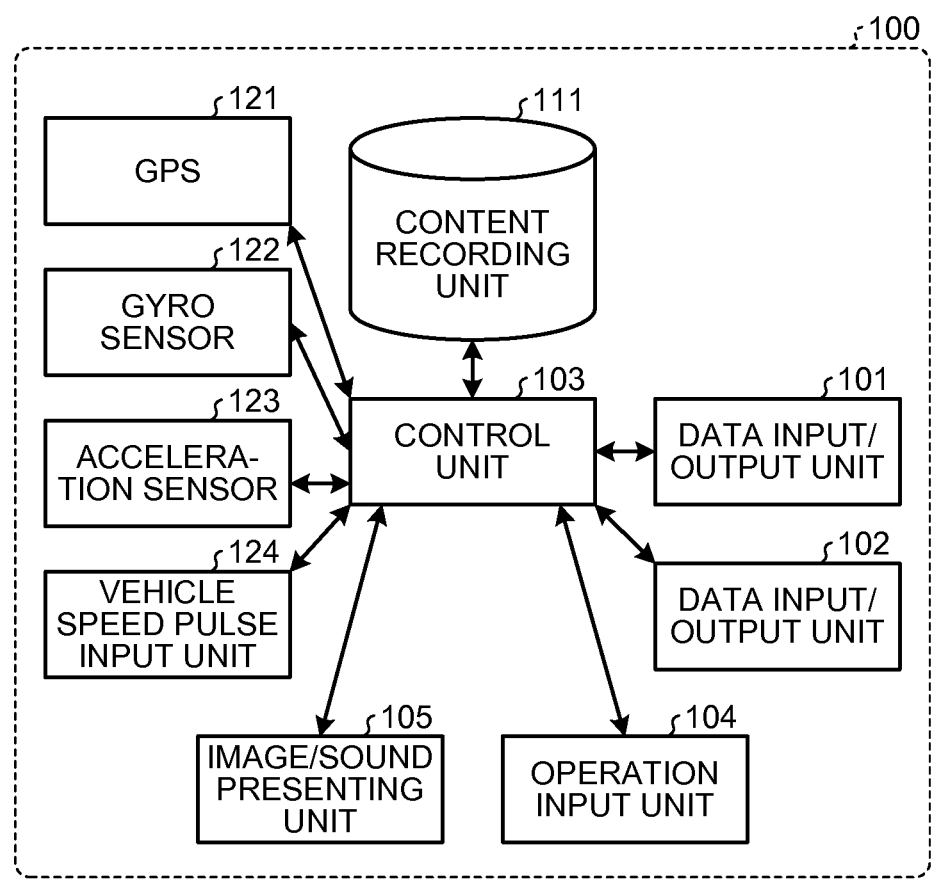
FIG. 28 is a block diagram illustrating an example of a configuration of the on-vehicle apparatus in the case of executing a determination method by means of an output from a sensor.

A configuration of the on-vehicle apparatus 100 in the case of executing the determination method by means of an output from a sensor will be described with reference to FIG. 28. FIG. 28 is a block diagram illustrating an example of the configuration of the on-vehicle apparatus 100 in the case of executing the determination method by means of the output from the sensor.

The on-vehicle apparatus 100 further includes a GPS 121, a gyro sensor 122, an acceleration sensor 123, and a vehicle speed pulse input unit 124, in addition to the data input/output unit 101, the data input/output unit 102, the control unit 103, the operation input unit 104, the image/sound presenting unit 105, and the content recording unit 111. The GPS 121 is as described above, so that the description will be omitted.

The gyro sensor 122 detects an angular speed of the vehicle. For example, the gyro sensor 122 detects an angular speed generated when the user changes the advancing direction of the vehicle by operating a steering wheel of the vehicle during the traveling of the vehicle. The gyro sensor 122 generates angular speed information indicating the detected angular speed, and outputs the information to the control unit 103.

The acceleration sensor 123 detects acceleration of the vehicle. The acceleration sensor 123 detects acceleration of two axes of an axis in the front-back direction (advancing direction) of the vehicle and an axis in the horizontal direction. The acceleration sensor 123 generates acceleration information indicating the detected acceleration in the front-back direction and the detected acceleration in the horizontal direction, and outputs the acceleration information to the control unit 103.

The vehicle speed pulse input unit 124 receives a vehicle speed pulse from the vehicle. The vehicle speed pulse is a signal in which the number of pulses per unit time becomes a number proportional to the vehicle speed. The vehicle speed pulse input unit 124 outputs the inputted vehicle speed pulse to the control unit 103.

Firstly, the case of determining based on the output from the GPS 121 will be described. The GPS 121 sequentially generates positioning information, and outputs the information to the control unit 103. The control unit 103 determines whether there is no change during a fixed period in a position indicated by each of plural pieces of positioning information outputted from the GPS 121. When there is no change in the position, the control unit 103 determines that the driving is ended. This is because, in this case, the position of the vehicle does not change during a fixed time and it is considered that the vehicle is not traveling. When there is a change in the position, the control unit 103 determines that the driving is not ended.

Next, the case of determining based on the output from the gyro sensor 122 will be described. The gyro sensor 122 sequentially generates angular speed information, and outputs the resultant to the control unit 103. The gyro sensor 122 determines whether an angular speed is not detected (there is no angular speed) during a fixed period in each of plural pieces of angular speed information outputted from the gyro sensor 122. When the angular speed is not detected, the control unit 103 determines that the driving is ended. This is because, in this case, the advancing direction during the traveling of the vehicle is not changed during a fixed period, and it is considered that the vehicle is not traveling. When the angular speed is detected, the control unit 103 determines that the driving is not ended.

Next, the case of determining based on the output from the acceleration sensor 123 will be described. The acceleration sensor 123 sequentially generates acceleration information, and outputs the resultant to the control unit 103. The acceleration sensor 123 determines whether neither the acceleration in the front-back direction nor the acceleration in the horizontal direction is detected (there is no acceleration) during a fixed period in each of the plural pieces of acceleration information outputted from the acceleration sensor 123. When the acceleration is not detected, the control unit 103 determines that the driving is ended. This is because, in this case, the acceleration, deceleration, and the advancing direction are not changed during a fixed period, and it is considered that the vehicle is not traveling. When the acceleration is detected, the control unit 103 determines that the driving is not ended.

Note that, here, the case where the acceleration sensor 123 detects acceleration of the two axes; however, the above-described process may be performed by detecting only the acceleration of any one of the axes.

Next, the case of determining based on the output from the vehicle speed pulse input unit 124 will be described. The vehicle speed pulse input unit 124 sequentially outputs a vehicle speed pulse inputted from the vehicle, to the control unit 103. The vehicle speed pulse input unit 124 determines whether the speed is not detected (there is no speed) during a fixed time in each of plural pieces of vehicle speed information outputted from the vehicle speed pulse input unit 124. When the speed is not detected, the control unit 103 determines that the driving is ended. This is because, in this case, it is considered that the vehicle is not traveling. When the speed is detected, the control unit 103 determines that the driving is not ended.

As described above, in this determination method, a physical quantity (position, speed, angular speed, and acceleration) that changes according to the traveling (motion) of the vehicle is detected, and when there is no change in the detected physical quantity, it is determined that the driving is ended. Note that, here, the case where the on-vehicle apparatus 100 includes the GPS 121, the gyro sensor 122, the acceleration sensor 123, and the vehicle speed pulse input unit 124 is described, but the on-vehicle apparatus is not limited thereto. The on-vehicle apparatus 100 may include any one or more of those described above, and the process described above about those included in the on-vehicle apparatus 100 may be executed.

(4) Determination by Means of Matching Between Outputs from Sensors of On-Vehicle Apparatus 100 and Communication Terminal 200

In this determination method, when an output value from the sensor, which changes according to a motion of the on-vehicle apparatus 100, and an output value from the sensor, which changes according to a motion of the communication terminal 200, do not match, it is determined that the driving is ended. This is because, in this case, it is considered that the user carrying the communication terminal 200 ends driving the vehicle, gets out of the vehicle, and is apart from the vehicle (on-vehicle apparatus 100), or operates the communication terminal 200.

Figure 29:
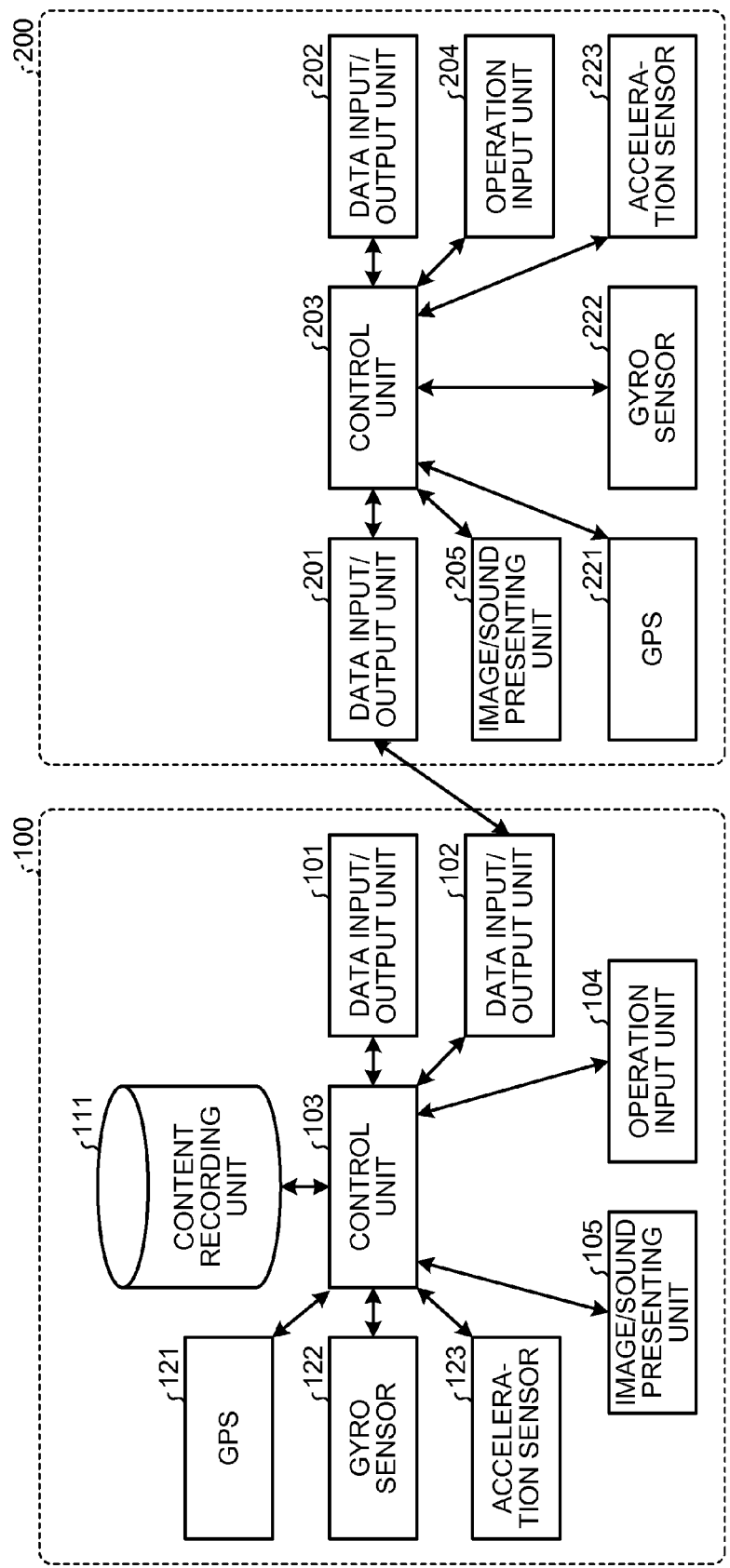
FIG. 29 is a block diagram illustrating an example of configurations of the on-vehicle apparatus and the communication terminal in the case of executing a determination method by means of matching between output from sensors of the on-vehicle apparatus and the communication terminal.

Configurations of the on-vehicle apparatus 100 and the communication terminal 200 in the case of executing the determination method by means of the matching between the output from the sensors of the on-vehicle apparatus 100 and the communication terminal 200 will be described with reference to FIG. 29. FIG. 29 is a block diagram illustrating an example of the configurations of the on-vehicle apparatus 100 and the communication terminal 200 in the case of executing the determination method by means of the matching between the output from the sensors of the on-vehicle apparatus 100 and the communication terminal 200.

The on-vehicle apparatus 100 further includes a GPS 121, a gyro sensor 122, and an acceleration sensor 123, in addition to the data input/output units 101 and 102, the control unit 103, the operation input unit 104, the image/sound presenting unit 105, and the content recording unit 111. The GPS 121, the gyro sensor 122, and the acceleration sensor 123 are as described above, so that the description will be omitted.

The communication terminal 200 further includes a GPS 221, a gyro sensor 222, and an acceleration sensor 223, in addition to the data input/output units 201 and 202, the control unit 203, the operation input unit 204, and the image/sound presenting unit 205.

The GPS 221 measures a position of the communication terminal 200 based on a signal from a GPS satellite. The GPS 221 generates positioning information indicating the measured position of the communication terminal 200 in a coordinate (longitude and latitude). The GPS 221 outputs the generated positioning information to the control unit 203.

The gyro sensor 222 detects an angular speed of the communication terminal 200. For example, the gyro sensor 222 detects an angular speed generated when the user changes an angle of the communication terminal 200. The gyro sensor 222 generates angular speed information indicating the detected angular speed, and outputs the information to the control unit 203.

The acceleration sensor 223 detects acceleration of the communication terminal 200. The acceleration sensor 223 detects acceleration of two axes of the communication terminal 200. The acceleration sensor 223 generates acceleration information indicating the detected acceleration of each of the two axes, and outputs the resultant to the control unit 203.

Firstly, the case of determining based on the output from the GPS 121 and the GPS 221 will be described. The GPS 221 of the communication terminal 200 sequentially generates positioning information, and outputs the resultant to the control unit 203. The control unit 203 transmits the positioning information outputted from the GPS 221, to the on-vehicle apparatus 100 via the data input/output unit 201.

On the other hand, the GPS 121 of the on-vehicle apparatus 100 sequentially generates positioning information, and outputs the resultant to the control unit 103. The control unit 103 receives the positioning information transmitted from the communication terminal 200, via the data input/output unit 102. The control unit 103 compares a position indicated by the positioning information received from the communication terminal 200 and a position indicated by the positioning information outputted from the GPS 121 upon receiving the positioning information from the communication terminal 200. When the positions indicated by the positioning information do not match, the control unit 103 determines that the driving is ended. When the positions indicated by the positioning information match, the control unit 103 determines that the driving is not ended.

Note that the case of determining based on the output from the gyro sensor 122 and the gyro sensor 222 and the case of outputting from the acceleration sensor 123 and the acceleration sensor 223 are similar except that the above-described process is performed on the angular speed information or the acceleration information instead of the positioning information, so that the description will be omitted.

Note that in the case of determining based on the output from the gyro sensor 122 and the gyro sensor 222 and in the case of determining based on the output from the acceleration sensor 123 and the acceleration sensor 223, it is necessary to install the communication terminal 200 in the vehicle such that the axis from which the angular speed and the acceleration are detected matches the on-vehicle apparatus 100. Therefore, a holder for the communication terminal 200 that enables the communication terminal 200 to be installed such that the axis from which the angular speed and the acceleration are detected matches the on-vehicle apparatus 100 may be provided in the on-vehicle apparatus 100.

Furthermore, here, the case where the acceleration sensors 123 and 223 detect acceleration of the two axes is described; however, the above-described process may be performed by detecting only the acceleration of any one of the axes. Furthermore, the case where the on-vehicle apparatus 100 and the communication terminal 200 include the GPSs 121 and 221, the gyro sensors 122 and 222, and the acceleration sensors 123 and 223 is described, but the on-vehicle apparatus and the communication terminal are not limited thereto. The on-vehicle apparatus 100 and the communication terminal 200 may include one or more sets of the sets of the same sensors, and the process described above about those included in the on-vehicle apparatus 100 and the communication terminal 200 may be executed.

(5) Determination by Means of Operating Condition of Communication Terminal 200

In this determination method, when the user performs predetermined operation on the communication terminal 200, it is determined that the driving is ended. This is because, in this case, it is considered that the user ends driving the vehicle and is operating the communication terminal 200.

The operation input unit 204 generates input information indicating the input detail according to the input from the user. The operation input unit 204 outputs the generated input information to the control unit 203.

The control unit 203 determines whether or not the input detail indicated by the input information is a predetermined input detail to be detected, according to the output of the input information from the operation input unit 204. Here, any input detail can be predetermined as the input detail to be detected, so long as it is an input detail considered as the fact that the user ends the driving and is operating the communication terminal 200. For example, it may be detected that the number of touches in a fixed time exceeds a predetermined number, or it may be detected that an input starting up an e-mail function is performed.

When the input information indicates the input detail to be detected, the control unit 203 generates operation notification information notifying that the communication terminal 200 is being operated by the user, and transmits the operation notification information to the on-vehicle apparatus 100 via the data input/output unit 201. The control unit 103 of the on-vehicle apparatus 100 receives the operation notification information transmitted from the communication terminal 200, via the data input/output unit 102. When receiving the operation notification information, the control unit 103 determines that the driving is ended. Note that when the input information does not indicate the input detail to be detected, the control unit 203 does not transmit the operation notification information to the on-vehicle apparatus 100.

(6) Determination by Means of Operation of Door of Driver's Seat

In this determination method, when a door of a driver's seat of the vehicle is opened, it is determined that the driving is ended. This is because, in this case, it is considered that the user ends driving the vehicle and gets out of the vehicle.

Figure 30:
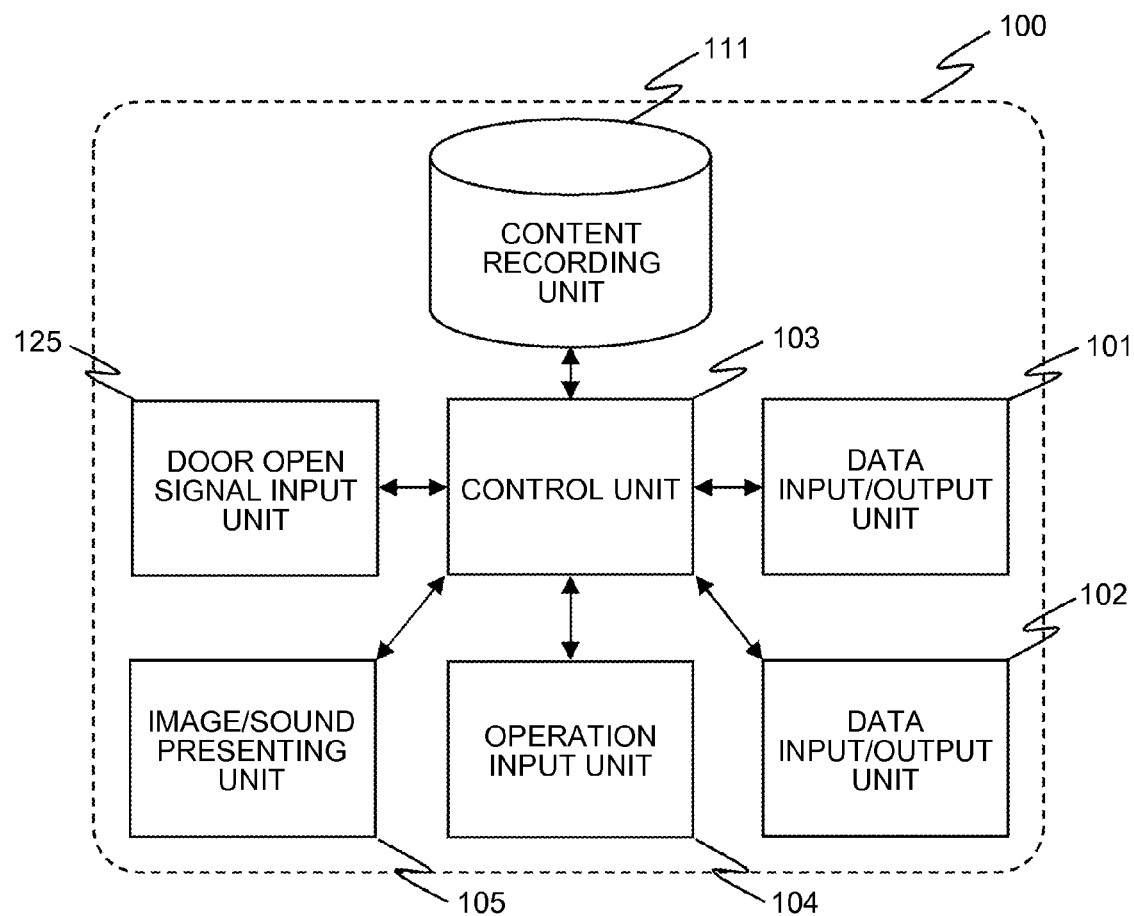
FIG. 30 is a block diagram illustrating an example of configuration of the on-vehicle apparatus in the case of executing a determination method by means of operation of a door of a driver's seat.

A configuration of the on-vehicle apparatus 100 in the case of executing the determination method by means of operation of a door of a driver's seat will be described with reference to FIG. 30. FIG. 30 is a block diagram illustrating an example of the configuration of the on-vehicle apparatus 100 in the case of executing the determination method by means of the operation of the door of the driver's seat.

The on-vehicle apparatus 100 further includes a door open signal input unit 125, in addition to the data input/output units 101 and 102, the control unit 103, the operation input unit 104, the image/sound presenting unit 105, and the content recording unit 111.

The door open signal input unit 125 receives a door open signal indicating that the door of the driver's seat is opened from the vehicle, when the door of the driver's seat is opened. The door open signal input unit 125 outputs the inputted door open signal to the control unit 103.

When the door open signal is outputted form the door open signal input unit 125, the control unit 103 determines that the driving is ended.

(7) Determination by Means of Parking State

In this determination method, when it is detected that a parking brake of the vehicle is put on, it is determined that the driving is ended. This is because, in this case, it is considered that the user ends driving the vehicle and puts on the parking brake. Note that the parking brake described here includes a so-called handbrake and an emergency brake.

Figure 31:
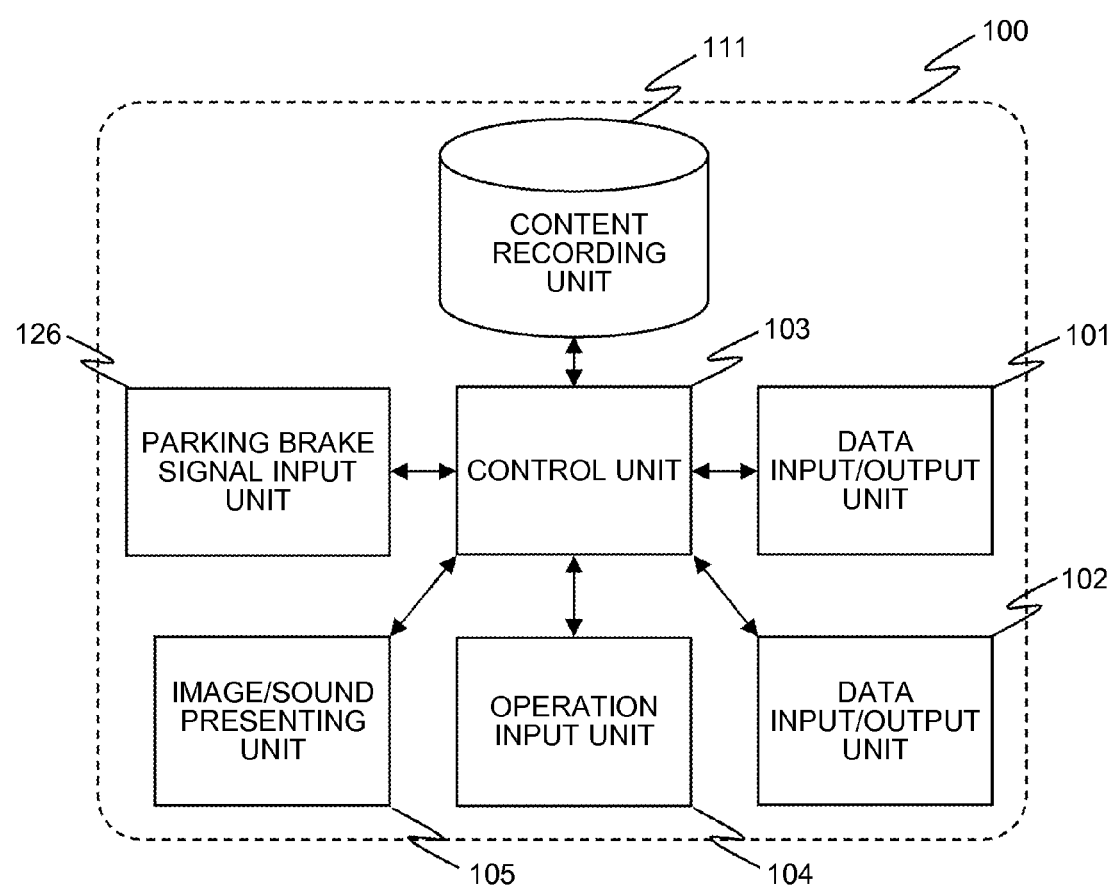
FIG. 31 is a block diagram illustrating an example of a configuration of the on-vehicle apparatus in the case of executing a determination method by means of a parking state.

A configuration of the on-vehicle apparatus 100 in the case of executing the determination method by means of a parking state will be described with reference to FIG. 31. FIG. 31 is a block diagram illustrating an example of the configuration of the on-vehicle apparatus 100 in the case of executing the determination method by means of the parking state.

The on-vehicle apparatus 100 further includes a parking brake signal input unit 126, in addition to the data input/output units 101 and 102, the control unit 103, the operation input unit 104, the image/sound presenting unit 105, and the content recording unit 111.

The parking brake signal input unit 126 receives a parking brake signal indicating that the parking brake is put on from the vehicle, when the parking brake is put on. The parking brake signal input unit 126 outputs the inputted parking brake signal to the control unit 103.

When the parking brake signal is outputted from the parking brake signal input unit 126, the control unit 103 determines that the driving is ended.

(8) Determination by Means of Charging State (Electric Vehicle)

In this determination method, when it is detected that the vehicle is being charged, it is determined that the driving is ended. This is because, in this case, it is considered that the user gets out of the vehicle, and is charging the vehicle. Specifically, the case where the vehicle is an electric vehicle will be described here.

Figure 32:
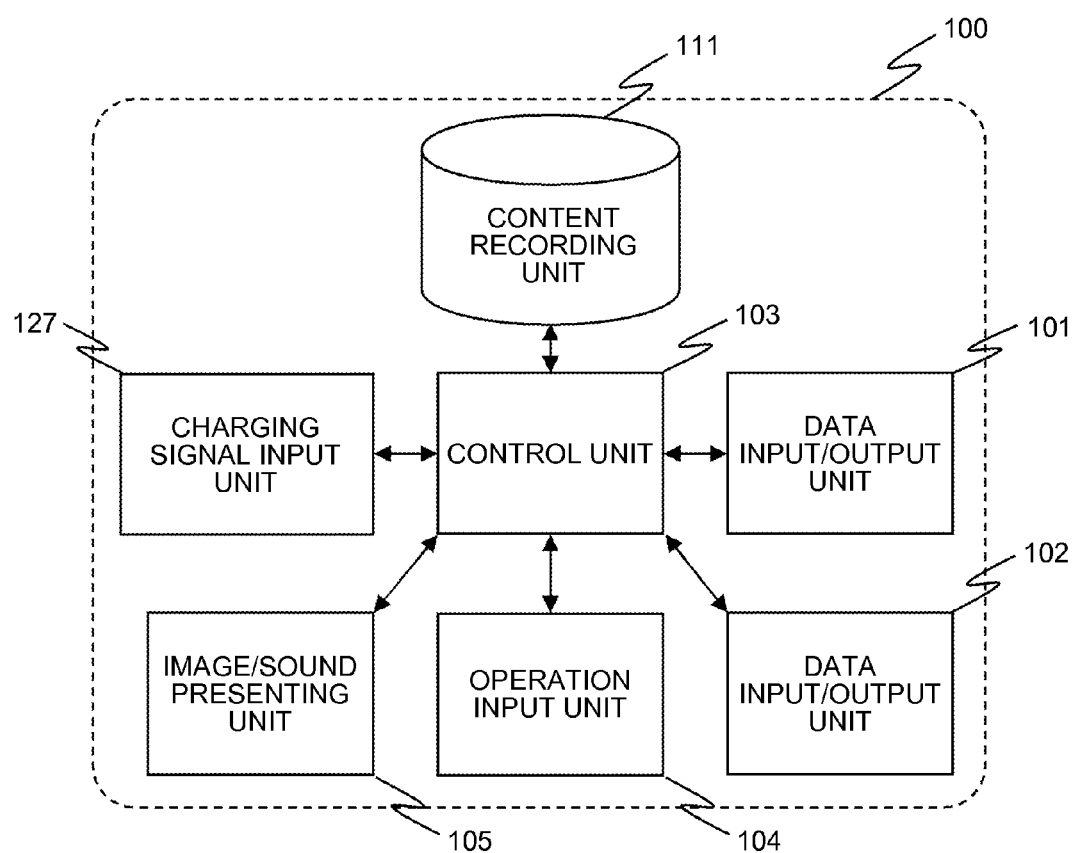
FIG. 32 is a block diagram illustrating an example of a configuration of the on-vehicle apparatus in the case of executing a determination method by means of a charging state.

A configuration of the on-vehicle apparatus 100 in the case of executing the determination method by means of a charging state will be described with reference to FIG. 32. FIG. 32 is a block diagram illustrating an example of the configuration of the on-vehicle apparatus 100 in the case of executing the determination method by means of the charging state.

The on-vehicle apparatus 100 further includes a charging signal input unit 127, in addition to the data input/output units 101 and 102, the control unit 103, the operation input unit 104, the image/sound presenting unit 105, and the content recording unit 111.

The charging signal input unit 127 receives a charging signal indicating that the vehicle is being charged from the vehicle, when the vehicle is being charged. The charging signal input unit 127 outputs the inputted charging signal to the control unit 103.

When the charging signal is outputted from the charging signal input unit 127, the control unit 103 determines that the driving is ended.

(9) Determination by Means of ACC Power Source State

In this determination method, when it is detected that an ACC power source is turned off by the user's key operation of the vehicle, it is determined that the driving is ended. This is because, in this case, it is considered that the traveling of the vehicle is ended and the engine is stopped.

Figure 33:
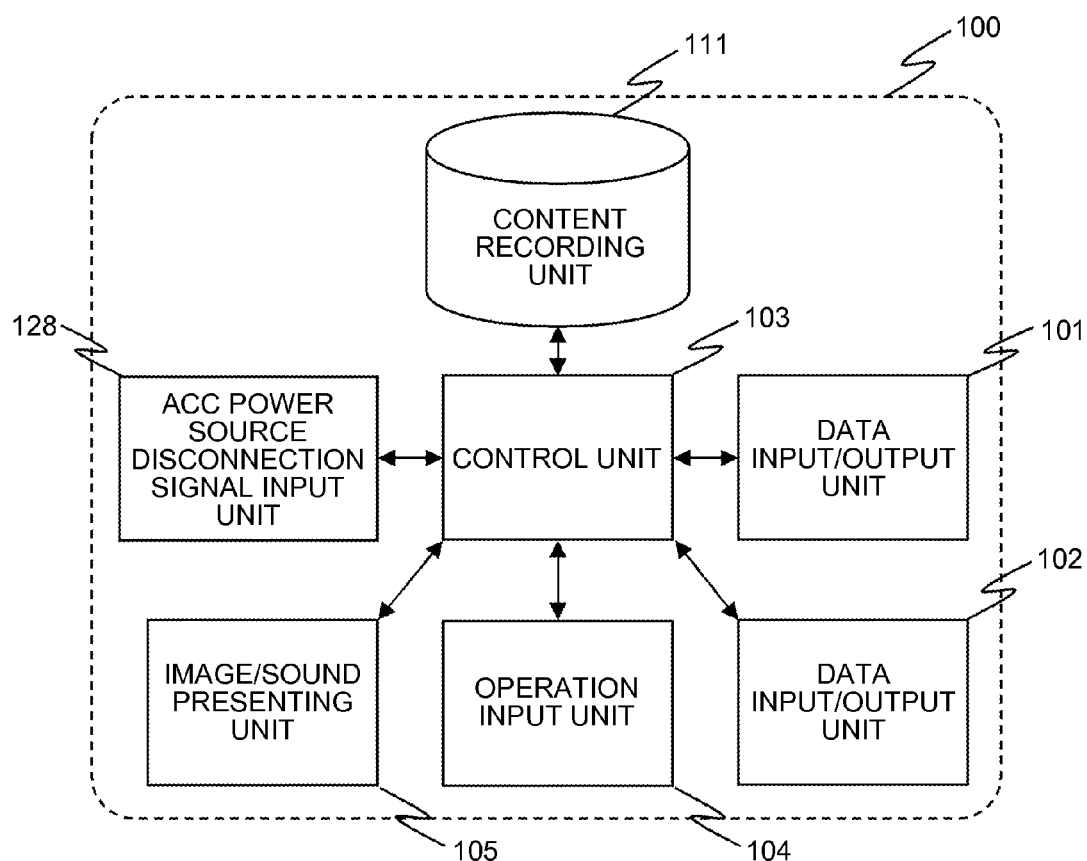
FIG. 33 is a block diagram illustrating an example of a configuration of the on-vehicle apparatus in the case of executing a determination method by means of an ACC power source state.

A configuration of the on-vehicle apparatus 100 in the case of executing the determination method by means of an ACC power source state will be described with reference to FIG. 33. FIG. 33 is a block diagram illustrating an example of the configuration of the on-vehicle apparatus 100 in the case of executing the determination method by means of the ACC power source state.

The on-vehicle apparatus 100 further includes an ACC power source disconnection signal input unit 128, in addition to the data input/output units 101 and 102, the control unit 103, the operation input unit 104, the image/sound presenting unit 105, and the content recording unit 111.

The ACC power source disconnection signal input unit 128 receives an ACC power source disconnection signal indicating that the ACC power source is turned off from the vehicle, when the ACC power source is turned off. The ACC power source disconnection signal input unit 128 outputs the inputted ACC power source disconnection signal to the control unit 103.

When the ACC power source disconnection signal is outputted from the ACC power source disconnection signal input unit 128, the control unit 103 determines that the driving is ended. Note that the on-vehicle apparatus 100 can execute the process after the ACC power source is turned off, by always receiving a power supply from the vehicle.

(10) Determination by Means of a Distance Between on-Vehicle Apparatus 100 and Communication Terminal 200 (Determination by Means of GPS)

In this determination method, when it is detected that the on-vehicle apparatus 100 and the communication terminal 200 are apart from each other by a predetermined distance based on the respective positions of the on-vehicle apparatus 100 and the communication terminal 200, it is determined that the driving is ended. This is because, in this case, it is considered that the user carrying the communication terminal 200 gets out of the vehicle, and is apart from the vehicle (on-vehicle apparatus 100).

Figure 34:
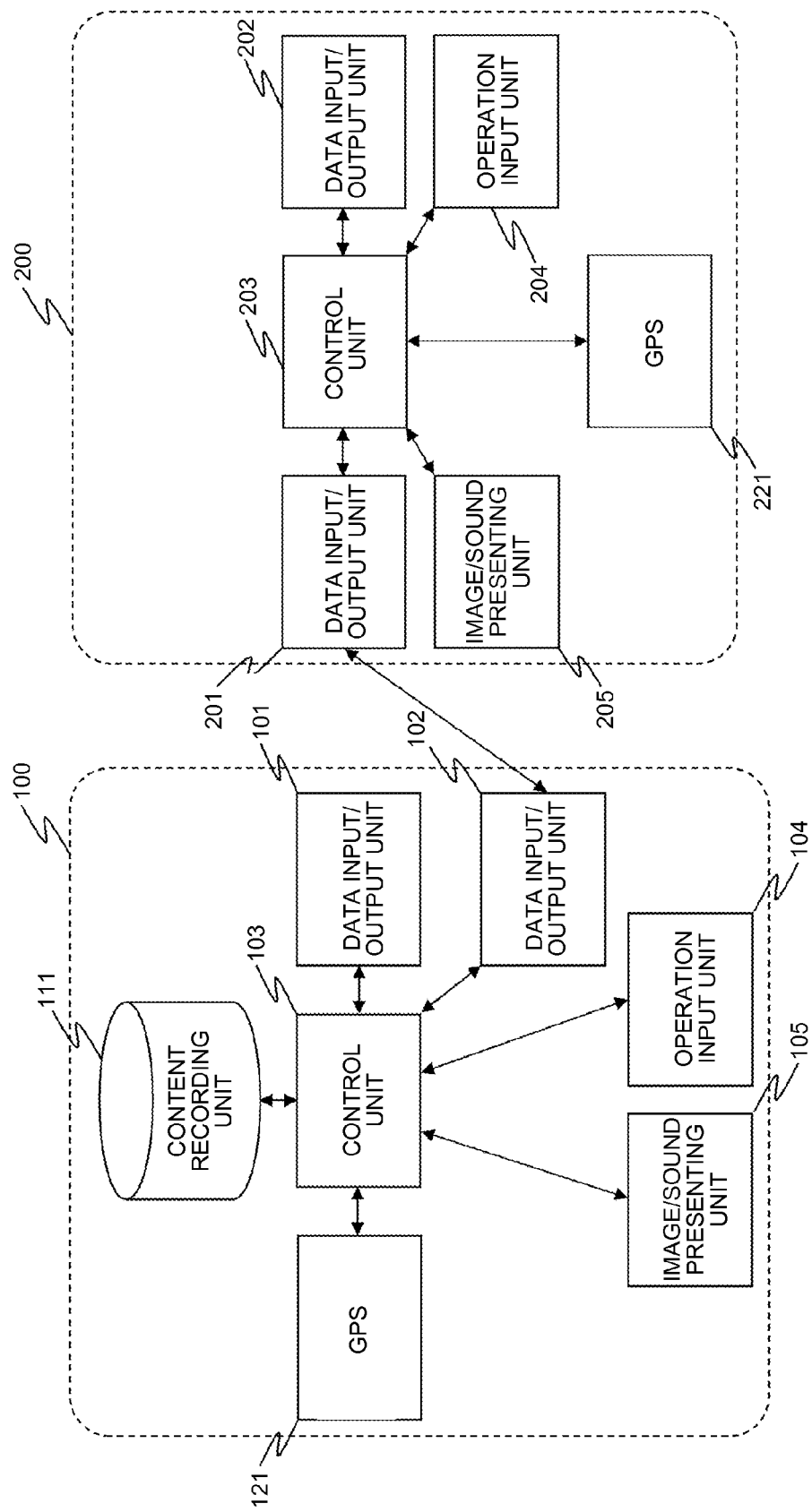
FIG. 34 is a block diagram illustrating an example of a configurations of the on-vehicle apparatus and the communication terminal in the case of executing a determination method by means of a distance between the on-vehicle apparatus and the communication terminal (determination by means of a GPS)

A configuration of the on-vehicle apparatus 100 in the case of executing the determination method by means of a distance between the on-vehicle apparatus 100 and the communication terminal 200 will be described with reference to FIG. 34. FIG. 34 is a block diagram illustrating an example of the configurations of the on-vehicle apparatus 100 and the communication terminal 200 in the case of executing the determination method by means of a distance between the on-vehicle apparatus 100 and the communication terminal 200.

The on-vehicle apparatus 100 further includes a GPS 121, in addition to the data input/output units 101 and 102, the control unit 103, the operation input unit 104, the image/sound presenting unit 105, and the content recording unit 111. The GPS 121 is as described above, so that the description will be omitted.

The communication terminal 200 further includes a GPS 221, in addition to the data input/output units 201 and 202, the control unit 203, the operation input unit 204, and the image/sound presenting unit 205. The GPS 221 is as described above, so that the description will be omitted.

The GPS 221 of the communication terminal 200 sequentially generates positioning information, and outputs the resultant to the control unit 203. The control unit 203 transmits the positioning information outputted from the GPS 221, to the on-vehicle apparatus 100 via the data input/output unit 201.

On the other hand, the GPS 121 of the on-vehicle apparatus 100 sequentially generates positioning information, and outputs the resultant to the control unit 103. The control unit 103 receives the positioning information transmitted from the communication terminal 200, via the data input/output unit 102. The control unit 103 calculates a distance between a position indicated by the positioning information received from the communication terminal 200 and a position indicated by the positioning information outputted from the GPS 121 upon receiving the positioning information from the communication terminal 200. Specifically, the control unit 103 calculates a distance between a position of the communication terminal 200 and a position of the on-vehicle apparatus 100. When the calculated distance is the predetermined distance or more, the control unit 103 determines that the driving is ended. When the calculated distance is not the predetermined distance or more, the control unit 103 determines that the driving is not ended.

(11) Determination by Means of Logout of On-Vehicle Apparatus 100 from Server 300

Here, as described above, communication is established between the on-vehicle apparatus 100 and the server 300 via a session established by login. Specifically, when the on-vehicle apparatus 100 logs out of the server 300, and the session is disconnected, the server 300 cannot receive the driving end notification information from the on-vehicle apparatus 100 via the session. Therefore, when the on-vehicle apparatus 100 logs out of the server 300, the control unit 103 of the on-vehicle apparatus 100 may transmit the driving end notification information to the server 300 in order to prevent the omission of the notification of the driving end.

Specifically, the operation input unit 104 of the on-vehicle apparatus 100 receives from the user an input requesting the logout from the server 300. The operation input unit 104 generates input information indicating the input detail according to the input from the user, and outputs the resultant to the control unit 103. The control unit 103 generates the driving end notification information according to the output from the operation input unit 104 of the input information indicating the input requesting the logout from the server 300, and transmits the driving end notification information to the server 300 via the data input/output unit 101. Thereafter, the control unit 103 generates logout requesting information requesting the logout, and transmits the generated logout requesting information to the server 300 via the data input/output unit 101 as described above.

Note that the control unit 302 of the server 300 receives the logout requesting information transmitted from the on-vehicle apparatus 100, via the data input/output unit 301. According to the reception of the logout request information, the control unit 302 disconnects the session with the on-vehicle apparatus 100, and performs a process involved with the logout, such as the process of updating the logout date and time indicated by the logout date and time information 3305 included in the user management information 3300 stored in the user information recording unit 312 to the current data and time.

Determination of Driving End by Control Unit 203 of Communication Terminal 200

Instead of the on-vehicle apparatus 100, the communication terminal 200 may execute the process of determining the driving end in the formal license request urging process in step S5 as described above.

Note that the process of generating and transmitting the driving end notification information of the communication terminal 200 is similar to the process of generating and transmitting the driving end notification information by the on-vehicle apparatus 100 described with reference to FIG. 25, except that the control unit 203 of the communication terminal 200 executes the process instead of the control unit 103 of the on-vehicle apparatus 100, so that the description will be omitted.

Here, as the method of determining the driving end in the communication terminal 200, the determination methods described in (1) to (5) and (10) out of the above-described methods of determining the driving end are preferably executed. Hereinafter, the case of executing the six determination methods of (1) to (5) and (10) in the communication terminal 200 will be described. Note that the description about the points similar to the above-described process will be omitted appropriately. Furthermore, a determination method (12) by means of a disconnection between the on-vehicle apparatus 100 and the communication terminal 200 will also be described newly.

(1) Determination by Means of Map Information and GPS

In this determination method, when the arrival of the vehicle to a destination is detected based on a map and a position of the communication terminal 200 (i.e., a position of the vehicle) carried by the user that drives the vehicle, it is determined that the driving is ended. This is because, when the vehicle arrives at the destination set by the user, it is considered that the driving does not continue any more in general. Specifically, in this determination method, the case in which the communication terminal 200 has a car navigation function is described.

Figure 35:
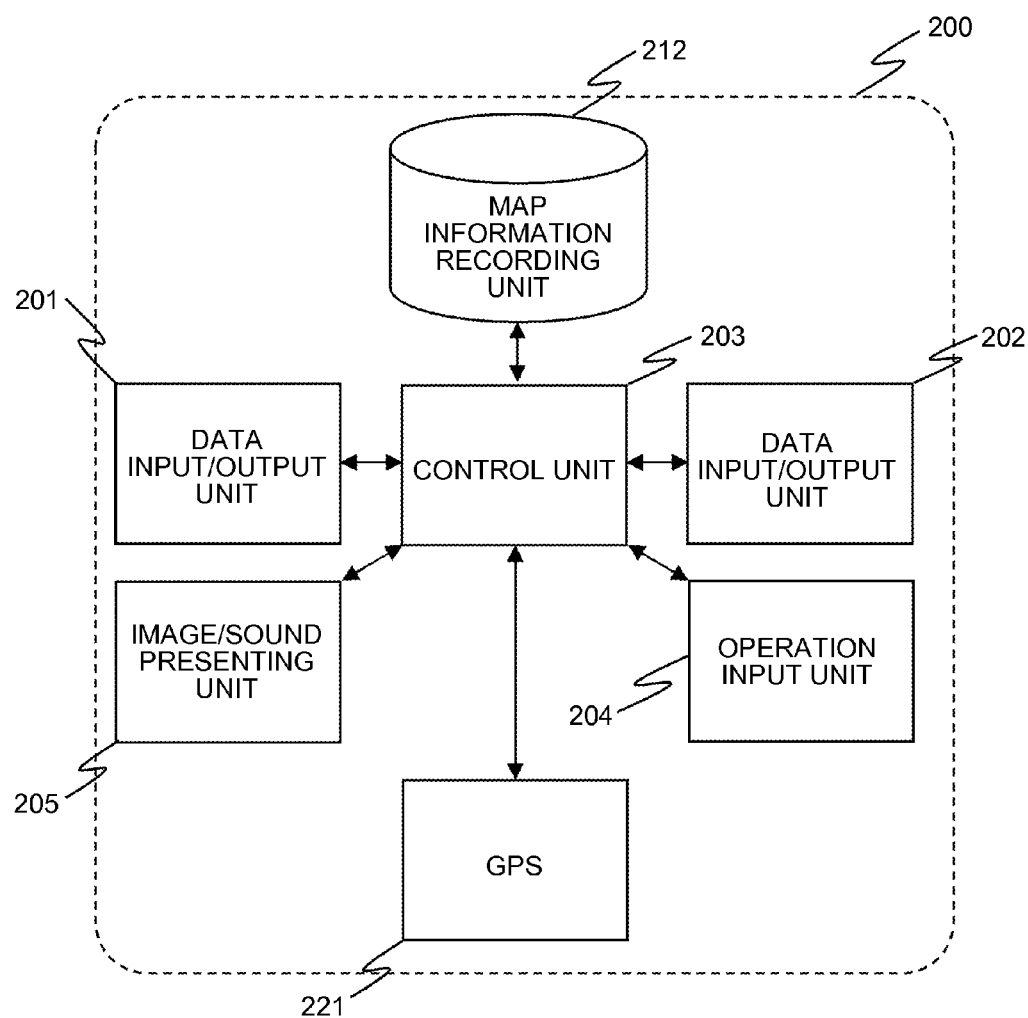
FIG. 35 is a block diagram illustrating an example of a configuration of the communication terminal in the case of executing a determination method by means of map information and a GPS.

A configuration of the communication terminal 200 in the case of executing the determination method by means of map information and a GPS will be described with reference to FIG. 35. FIG. 35 is a block diagram illustrating an example of the configuration of the communication terminal 200 in the case of executing the determination method by means of the map information and GPS.

The communication terminal 200 further includes a map information recording unit 212 and a GPS 221, in addition to the data input/output units 201 and 202, the control unit 203, the operation input unit 204, and the image/sound presenting unit 205. The GPS 221 is as described above, so that the description will be omitted. The map information recording unit 212 is similar to the map information recording unit 112, so that the description will be omitted.

It is supposed here that a destination of the vehicle is set by the user on a map indicated by map information stored in the map information recording unit 212 of the communication terminal 200. Specifically, the operation input unit 204 receives an input setting a destination from the user. The operation input unit 204 generates input information indicating the input detail, according to the input from the user, and outputs the input information to the control unit 203. The control unit 203 sets the destination on the map according to the output from the operation input unit 204 of the input information indicating the input setting the destination.

The GPS 221 sequentially generates positioning information, and outputs the resultant to the control unit 203. The control unit 203 determines whether or not a position indicated by the positioning information outputted from the GPS 221 becomes a position of the destination on the map indicated by the map information stored in the map information recording unit 212, according to the output of the positioning information from the GPS 221. When the position indicated by the positioning information becomes the position of the destination on the map indicated by the map information, the control unit 203 determines that the driving is ended. When the position indicated by the positioning information does not become the position of the destination on the map indicated by the map information, the control unit 203 determines that the driving is not ended.

(2) Determination by Means of Distance Between On-Vehicle apparatus 100 and Communication Terminal 200 (Determination by Means of Communication)

When this determination method is executed in the communication terminal 200, the control unit 203 of the communication terminal 200 detects an interruption of the communication with the on-vehicle apparatus 100 via the data input/output unit 201. Specifically, the process is similar to the above-described process in the case of executing in the on-vehicle apparatus 100, except that the process to be executed in the control unit 103 of the on-vehicle apparatus 100 is replaced by the process to be executed in the control unit 203 of the communication terminal 200, so that the description of the specific process will be omitted.

Other known technology can be employed so long as it can determine that the distance between the communication terminal 200 and the on-vehicle apparatus 100 becomes a predetermined distance or more, such as a technology of utilizing a change in radio field intensity of the communication between the communication terminal 200 and the on-vehicle apparatus 100.

(3) Determination by Means of Output of Sensor

A configuration of the communication terminal 200 in the case of executing this determination method in the communication terminal 200 is similar to the configuration described with reference to FIG. 29, so that the description will be omitted. In the case of executing this determination method in the communication terminal 200, the control unit 203 of the communication terminal 200 determines whether or not the driving is ended based on the output from the sensor (the GPS 221, the gyro sensor 222, and the acceleration sensor 223) included in the communication terminal 200. Specifically, the process is similar to the above-described process in the case of executing in the on-vehicle apparatus 100, except that the process executed by the control unit 103, the GPS 121, the gyro sensor 122, and the acceleration sensor 123 is executed by the control unit 203, the GPS 221, the gyro sensor 222, and the acceleration sensor 223, so that the description of the specific process will be omitted.

(4) Determination by Means of Matching Between Outputs from Sensors of On-Vehicle Apparatus 100 and Communication Terminal 200

In the case of executing this determination method in the communication terminal 200, the control unit 203 of the communication terminal 200 determines whether or not an output value from the sensor in the on-vehicle apparatus 100, which is transmitted from the on-vehicle apparatus 100, and an output value from the sensor in the communication terminal 200 match. Specifically, the process is similar to the above-described process in the case of executing in the on-vehicle apparatus 100, except that the process to be executed in the control unit 103 of the on-vehicle apparatus 100 is replaced by the process to be executed in the control unit 203 of the communication terminal 200, so that the description of the specific process will be omitted.

(5) Determination by Means of Operating Condition of Communication Terminal 200

In the case of executing this determination method in the communication terminal 200, the control unit 203 of the communication terminal 200 generates the driving end notification information, when determining that the input detail indicated by the input information from the operation input unit 204 is a predetermined input detail to be detected, and transmits the driving end notification information to the server 300 via the data input/output unit 202. Specifically, the transmission of the operation notification information to the on-vehicle apparatus 100 is unnecessary.

(10) Determination by Means of Distance Between On-Vehicle Apparatus 100 and Communication Terminal 200 (Determination by Means of GPS)

In the case of executing this determination method in the communication terminal 200, the control unit 203 of the communication terminal 200 calculates a distance between a position indicated by the positioning information of the GPS 121 transmitted from the on-vehicle apparatus 100 and a position indicated by the positioning information of the GPS 221 in the communication terminal 200, and determines whether or not the calculated distance is the predetermined distance or more. Specifically, the process is similar to the above-described process in the case of executing in the on-vehicle apparatus 100, except that the process to be executed in the control unit 103 of the on-vehicle apparatus 100 is replaced by the process to be executed in the control unit 203 of the communication terminal 200, so that the description of the specific process will be omitted.

(12) Determination Method by Means of Disconnection Between On-Vehicle Apparatus 100 and Communication Terminal 200

Here, in the case of executing the above-described (4), it is necessary that communication is established between the on-vehicle apparatus 100 and the communication terminal 200. Specifically, when wireless communication between the on-vehicle apparatus 100 and the communication terminal 200 is disconnected, the output from the sensor cannot be transmitted from the on-vehicle apparatus 100 to the communication terminal 200, so that the driving end cannot be determined. Therefore, when the wireless communication between the on-vehicle apparatus 100 and the communication terminal 200 is disconnected, the control unit 203 of the communication terminal 200 may transmit the driving end notification information to the server 300 in order to prevent the omission of the urging of the content purchasing procedure.

Specifically, the operation input unit 204 receives from the user an input requesting the disconnection of the communication between the on-vehicle apparatus 100 and the communication terminal 200. The operation input unit 204 generates input information indicating the input detail, according to the input from the user, and outputs the input information to the control unit 203. The control unit 203 disconnects the communication with the on-vehicle apparatus 100 according to the output from the operation input unit 204 of the input information indicating the input requesting the disconnection of the communication with the on-vehicle apparatus 100. In other words, the transmission and reception operation in the data input/output unit 201 is caused to stop. In this case, the control unit 203 generates the driving end notification information, and transmits the driving end notification information to the server 300 via the data input/output unit 202.

Determination of driving end by control unit 302 of server 300

The process of the driving end determination in the formal license request urging process in step S5 described above may be executed in the server 300, instead of the on-vehicle apparatus 100 or the communication terminal 200.

Figure 36:
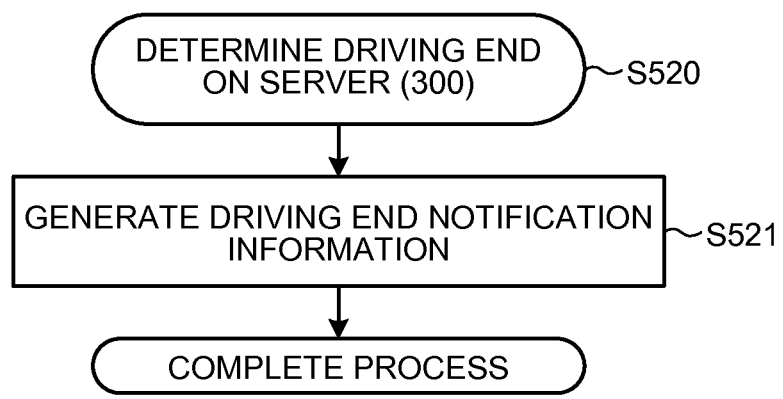
FIG. 36 is a process flow illustrating a process of driving end determination of the server according to the embodiment of the present invention.

Firstly, a process of the driving end determination of the server 300 will be described with reference to FIG. 36. FIG. 36 is a process flow illustrating the process of the driving end determination of the server 300.

The control unit 302 of the server 300 determines the driving end of the vehicle by the user (S520). The driving end notification information generating unit 3007 generates the driving end notification information according to the determination of the driving end (S521). Step S520 corresponds to step S50. Step S521 corresponds to step S52.

Here, as the method of determining the driving end in the server 300, the determination methods described in (1) and (10) out of the above-described methods of determining the driving end are preferably executed. Hereinafter, the case of executing the two determination methods of (1) and (10) in the server 300 will be described.

(1) Determination by Means of Map Information and GPS

In this determination method, when the arrival of the vehicle to a destination is detected based on a map and a position of the vehicle (on-vehicle apparatus 100), it is determined that the driving is ended. This is because, when the vehicle arrives at the destination set by the user, it is considered that the driving does not continue any more in general. Specifically, in this determination method, the case in which the server 300 has a car navigation function is described.

Figure 37:
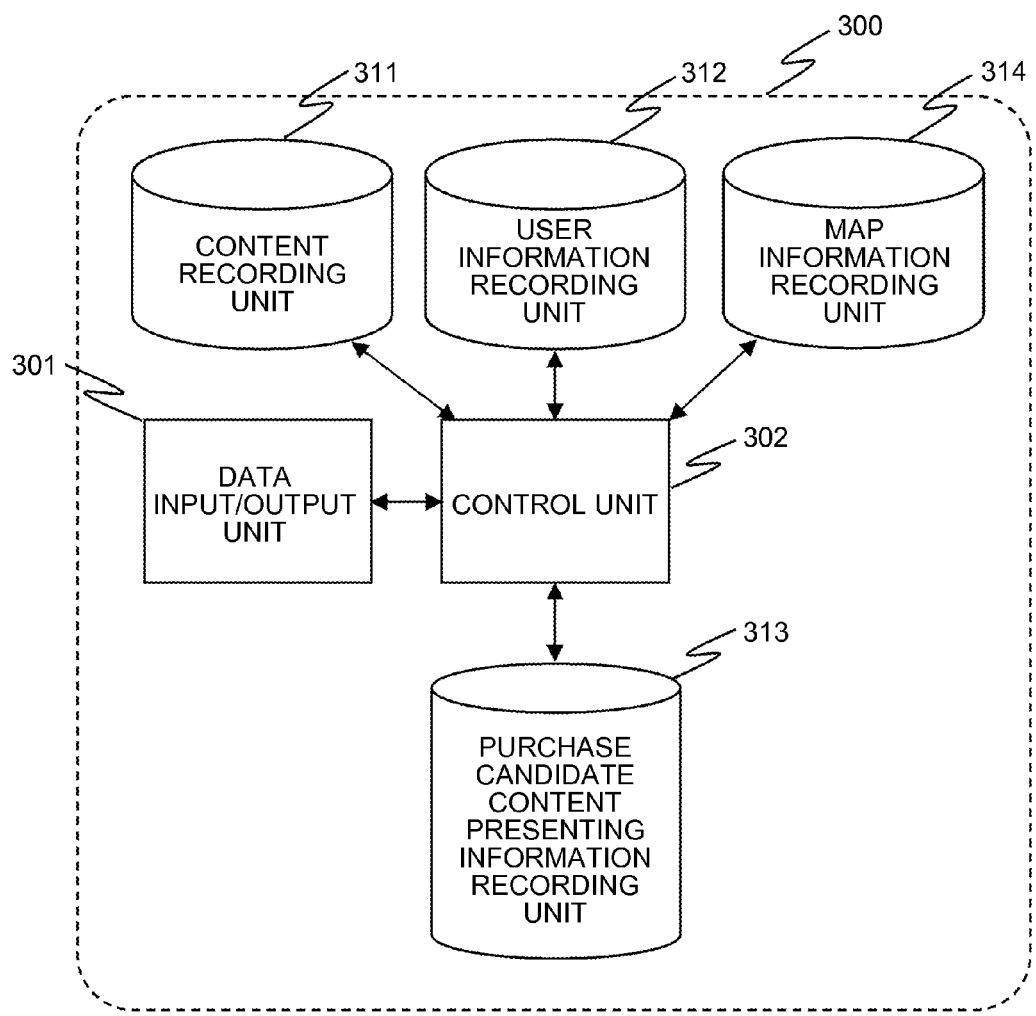
FIG. 37 is a block diagram illustrating an example of a configuration of the server in the case of executing a determination method by means of map information and a GPS.

A configuration of the server 300 in the case of executing the determination method by means of map information and a GPS will be described with reference to FIG. 37. FIG. 37 is a block diagram illustrating an example of the configuration of the server 300 in the case of executing the determination method by means of the map information and GPS.

The server 300 further includes a map information recording unit 314, in addition to the data input/output unit 301, the control unit 302, the content recording unit 311, the user information recording unit 312, and the purchase candidate content presenting information recording unit 313. The map information recording unit 314 is similar to the map information recording unit 112, so that the description will be omitted.

It is supposed here that a destination of the vehicle is set by the user on a map indicated by map information stored in the map information recording unit 314 of the server 300. When the user sets the destination of the vehicle on a map indicated by map information stored in the map information recording unit 112 of the on-vehicle apparatus 100, the setting of the destination is reflected on the map indicated by the map information stored in the map information recording unit 314 of the server 300. In other words, the map indicated by the map information stored in the map information recording unit 112 and the map indicated by the map information stored in the map information recording unit 314 preferably indicate the same detail.

Specifically, the operation input unit 104 receives from the user an input setting a destination. The operation input unit 104 generates input information indicating the input detail, according to the input from the user, and outputs the input information to the control unit 103. The control unit 103 generates destination information indicating a position of the destination on the map, according to the output from the operation input unit 104 of the input information indicating the input setting the destination. The control unit 103 transmits the generated destination information to the server 300 via the data input/output unit 101. The control unit 302 of the server 300 receives the destination information transmitted from the on-vehicle apparatus 100, via the data input/output unit 301. The control unit 302 sets the destination indicated by the received destination information as the destination of the vehicle on the map indicated by the map information stored in the map information recording unit 314.

The GPS 121 sequentially generates positioning information, and outputs the resultant to the control unit 103. The control unit 103 transmits the positioning information outputted from the GPS 121, to the server 300 via the data input/output unit 101. The control unit 302 of the server 300 receives the positioning information transmitted from the on-vehicle apparatus 100, via the data input/output unit 301. The control unit 302 determines whether or not the position indicated by the received positioning information becomes the position of the destination on the map indicated by the map information stored in the map information recording unit 314. When the position indicated by the positioning information becomes the position of the destination on the map indicated by the map information, the control unit 302 determines that the driving is ended. When the position indicated by the positioning information does not become the position of the destination on the map indicated by the map information, the control unit 302 determines that the driving is not ended.

(10) Determination by Means of Distance Between on-Vehicle Apparatus 100 and Communication Terminal 200 (Determination by GPS)

Configurations of the on-vehicle apparatus 100 and the communication terminal 200 in the case of executing this determination method in the server 300 are similar to the configurations described with reference to FIG. 34, so that the description will be omitted. In this determination method, when it is detected that the on-vehicle apparatus 100 and the communication terminal 200 are apart from each other by a predetermined distance based on the respective positions of the on-vehicle apparatus 100 and the communication terminal 200, it is determined that the driving is ended. This is because, in this case, it is considered that the user carrying the communication terminal 200 gets out of the vehicle and is apart from the vehicle (on-vehicle apparatus 100).

The GPS 121 of the on-vehicle apparatus 100 sequentially generates positioning information, and outputs the resultant to the control unit 103. The control unit 103 transmits the positioning information outputted from the GPS 121, to the server 300 via the data input/output unit 101. On the other hand, the GPS 221 of the communication terminal 200 also sequentially generates positioning information, and outputs the positioning information to the control unit 203. The control unit 203 transmits the positioning information outputted from the GPS 221, to the server 300 via the data input/output unit 202.

The control unit 302 of the server 300 receives the positioning information transmitted from the on-vehicle apparatus 100 and the positioning information transmitted from the communication terminal 200, via the data input/output unit 301. The control unit 302 calculates a distance between a position indicated by the positioning information received from the on-vehicle apparatus 100 and a position indicated by the positioning information received from the communication terminal 200. Specifically, the control unit 302 calculates a distance between a position of the communication terminal 200 and a position of the on-vehicle apparatus 100. When the calculated distance is a predetermined distance or more, the control unit 302 determines that the driving is ended. When the calculated distance is not the predetermined distance or more, the control unit 302 determines that the driving is not ended.

Note that a determination method other than the above-described (1) and (10) can also be executed in such a manner that the server 300 acquires various kinds of information from at least any one of the on-vehicle apparatus 100 and the communication terminal 200.

10. Formal License Requesting Process (S6)

Subsequently, the content purchasing procedure based on the request of the formal license in step S6 will be described in more detail.

Figure 38:
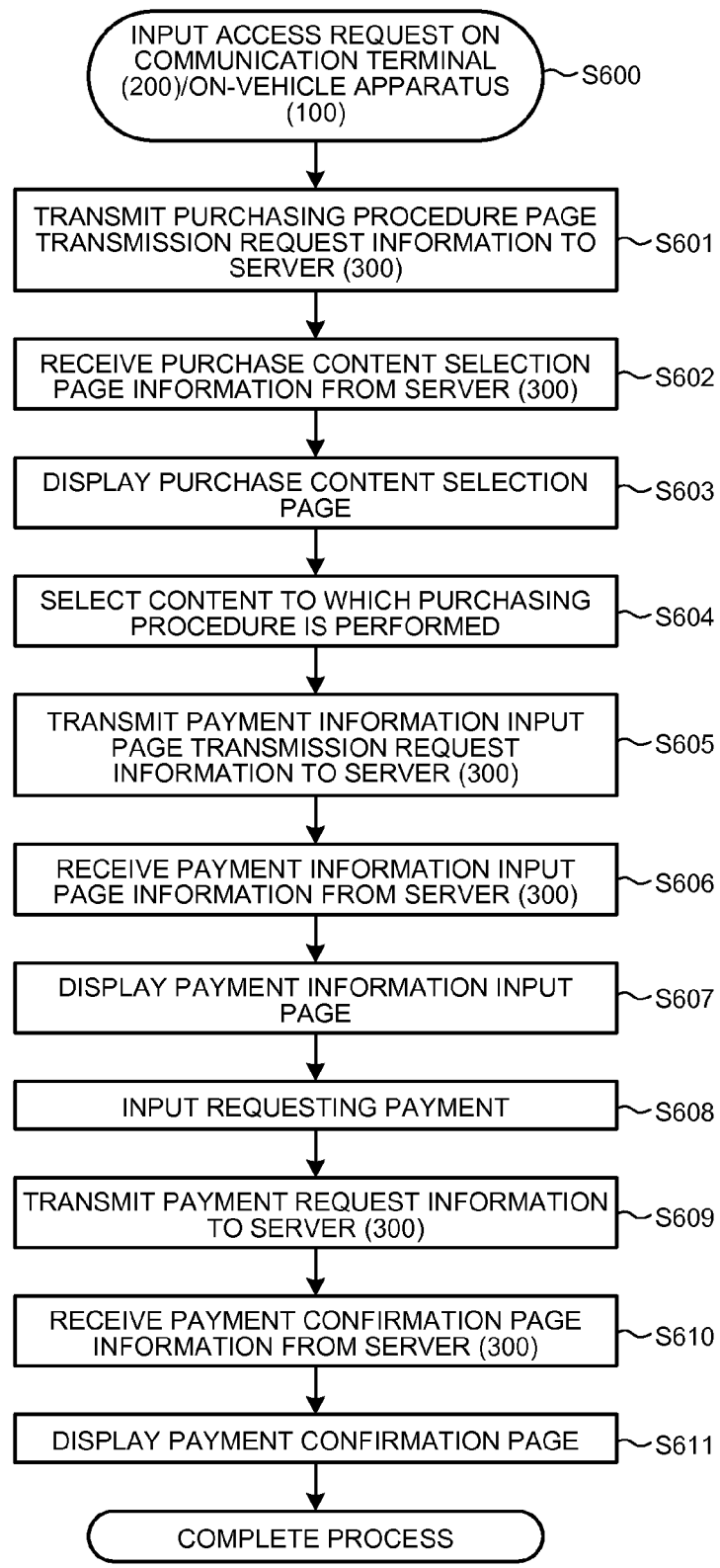
FIG. 38 is a process flow illustrating a process of the communication terminal or the on-vehicle apparatus upon the content purchasing procedure according to the embodiment of the present invention.

A process of the communication terminal 200 or the on-vehicle apparatus 100 upon the content purchasing procedure will be described with reference to FIG. 38. FIG. 38 is a process flow illustrating the process of the communication terminal 200 or the on-vehicle apparatus 100 upon the content purchasing procedure.

The operation input unit 204 of the communication terminal 200 or the operation input unit 104 of the on-vehicle apparatus 100 receives from the user an input requesting an access to a URL of a purchasing procedure page by the user, based on the received purchasing procedure mail (S600). The operation input unit 204 or the operation input unit 104 generates input information indicating the input detail, according to the input from the user, and outputs the resultant to the control unit 203 or the control unit 103. Step S600 corresponds to step S60.

The purchasing procedure page transmission request information generating unit 2001 or the purchasing procedure page transmission request information generating unit 1004 generates purchase content selection page transmission request information, which requests the transmission of a purchase content selection page that becomes a web page indicated by the URL, according to the output from the operation input unit 204 or the operation input unit 104 of the input information indicating the input requesting the access to the URL of the purchasing page written on the purchasing procedure mail. The control unit 203 or the control unit 103 transmits the generated purchase content selection page transmission request information to the server 300 via the data input/output unit 202 (S601). Accordingly, the purchasing procedure page information generating unit 3004 of the server 300 generates purchase content selection page information indicating the purchase content selection page, and transmits the resultant to the communication terminal 200 or the on-vehicle apparatus 100. Step S601 corresponds to step S61.

The communication terminal 200 or the on-vehicle apparatus 100 receives the purchase content selection page information transmitted from the server 300, via the data input/output unit 202 or the data input/output unit 101 (S602). According to the reception of the purchase content selection page information, the control unit 203 or the control unit 103 displays the purchase content selection page indicated by the purchase content selection page information (S603). Specifically, the control unit 203 or the control unit 103 generates image information indicating the purchase content selection page based on the purchase content selection page information. The control unit 203 outputs the generated image information to the image/sound presenting unit 205 or the image/sound presenting unit 105. The image/sound presenting unit 205 or the image/sound presenting unit 105 displays the purchase content selection page indicated by the image information, according to the output of the image information from the control unit 203. The purchase content selection page information includes, for example, information indicating HTML (HyperText Markup Language) of the purchase content selection page. Steps S602 and S603 correspond to step S64.

Figure 39A:
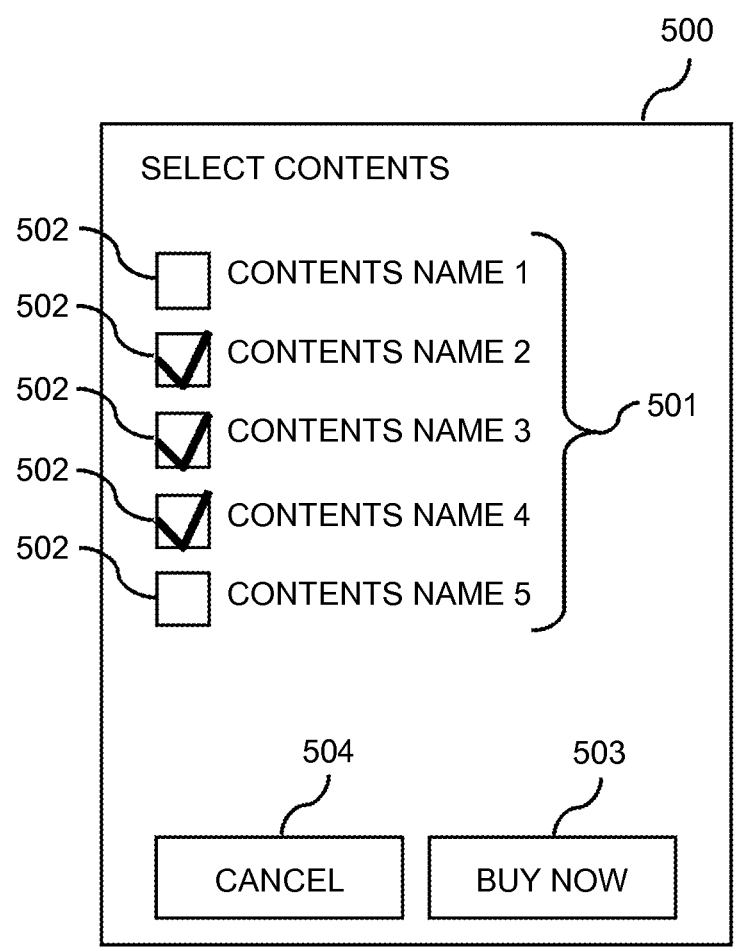
FIG. 39A is a diagram illustrating one example of a purchase content selection page according to the embodiment of the present invention.

FIG. 39A illustrates one example of a purchase content selection page 500. As illustrated in FIG. 39A, the purchase content selection page 500 includes a list 501 of previewed content, a check box 502 for selecting each piece of content, a button 503 for formally offering to purchase the selected content, and a button 504 for canceling the formal purchase of the content. FIG. 39A illustrates the case where an interface component (Widget) for selecting content is the check box 502, and an interface component for formally offering to purchase the content is the button 503; however, other types of interface components may be used.

The operation input unit 204 or the operation input unit 104 receives from the user an input to the purchase content selection page 500 that selects the content to which the purchasing procedure is performed (S604). In the case illustrated in FIG. 39A, the input selecting the content to which the purchasing procedure is performed includes an input selecting the check box 502 and an input depressing the button 503. The operation input unit 204 or the operation input unit 104 generates input information indicating the input detail, and outputs the input information to the control unit 203 or the control unit 103.

The control unit 203 or the control unit 103 generates payment information input page transmission request information requesting a transmission of a payment information input page for the payment of the selected content, according to the output from the operation input unit 204 or the operation input unit 104 of the input information indicating the input selecting the content to which the purchasing procedure is performed. The control unit 203 or the control unit 103 transmits the generated payment information input page transmission request information to the server 300 via the data input/output unit 202 or the operation input unit 104 (S605). Accordingly, the payment information input page information indicating the payment information input page is transmitted from the server 300.

Figure 39B:
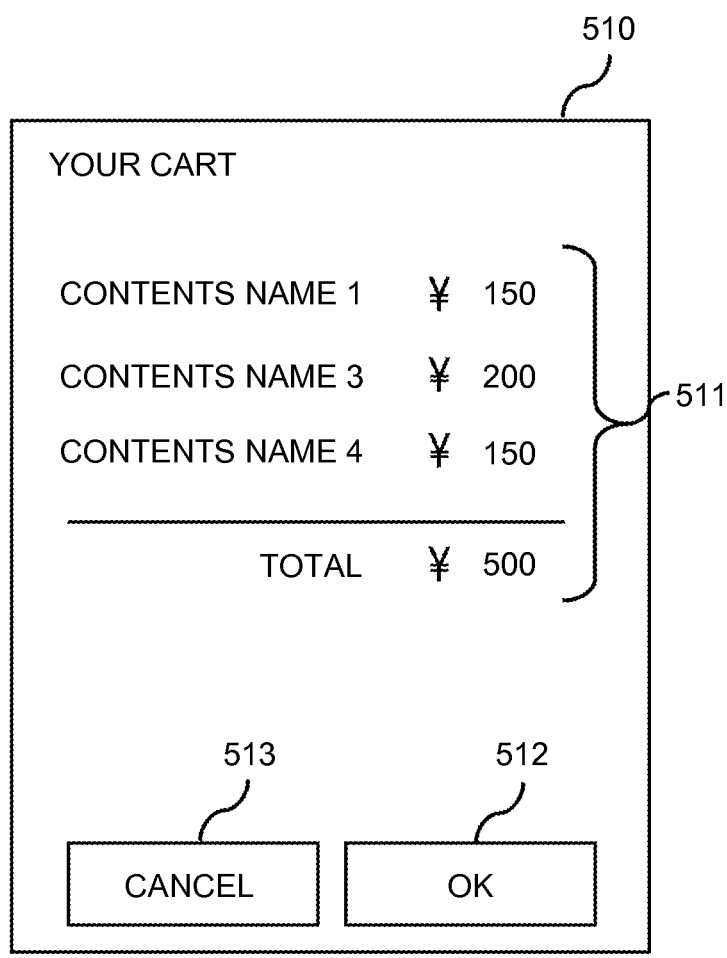
FIG. 39B is a diagram illustrating one example of a purchasing content confirmation page according to the embodiment of the present invention.

Here, the control unit 203 or the control unit 103 may display a purchase content confirmation page 510 as illustrated in FIG. 39B according to the output of the input information indicating the input selecting the content to which the purchasing procedure is performed, and when receiving from the user an input to the purchase content confirmation page that notifies that there is no problem in the content to which the purchasing procedure is performed, the control unit 203 or the control unit 103 may transmit the payment information input page transmission request information to the server 300.

Specifically, the control unit 203 or the control unit 103 generates image information indicating the purchase content confirmation page 510, and outputs the image information to the image/sound presenting unit 205 or the image/sound presenting unit 105. The image/sound presenting unit 205 or the image/sound presenting unit 105 displays the purchase content confirmation page 510 indicated by the image information, according to the output of the image information. The purchase content confirmation page 510 includes, for example, a list 511 of the selected content and its price, a button 512 for notifying that the total amount and there is no problem in the content to which the purchasing procedure is performed, and a button 513 for canceling the formal purchase of the content. FIG. 39B illustrates the case where an interface component for notifying that there is no problem in the content to which the purchasing procedure is performed and an interface component for canceling the formal purchase of the content are the button 512 and the button 513 respectively, however, other types of interface components may be used.

The operation input unit 204 or the operation input unit 104 receives from the user the input notifying that there is no problem in the content to which the purchasing procedure is performed. In the operation input unit 204 or the operation input unit 104, in the case illustrated in FIG. 39B, the input notifying that there is no problem in the content to which the purchasing procedure is performed corresponds to an input depressing the button 512. The operation input unit 204 or the operation input unit 104 generates input information indicating the input detail according to the input from the user, and outputs the input information to the control unit 203. Then, the control unit 203 transmits the payment information input page transmission request information to the server 300 according to the output of the input information indicating the input notifying that there is no problem in the content to which the purchasing procedure is performed (S605). Step S605 corresponds to step S61.

The control unit 203 or the control unit 103 receives the payment information input page information transmitted from the server 300, via the data input/output unit 202 or the data input/output unit 101 (S606). According to the reception of the payment information input page information, the control unit 203 or the control unit 103 displays the payment information input page indicated by the payment information input page information (S607). Specifically, the control unit 203 or the control unit 103 generates image information indicating the payment information input page based on the payment information input page information. The control unit 203 or the control unit 103 outputs the generated image information to the image/sound presenting unit 205 or the image/sound presenting unit 105. The image/sound presenting unit 205 or the image/sound presenting unit 105 displays the payment information input page indicated by the image information according to the output of the image information from the control unit 203 or the control unit 103. The payment information input page information includes, for example, information indicating HTML of the payment information input page. Steps S606 and S607 correspond to step S64.

Figure 39C:
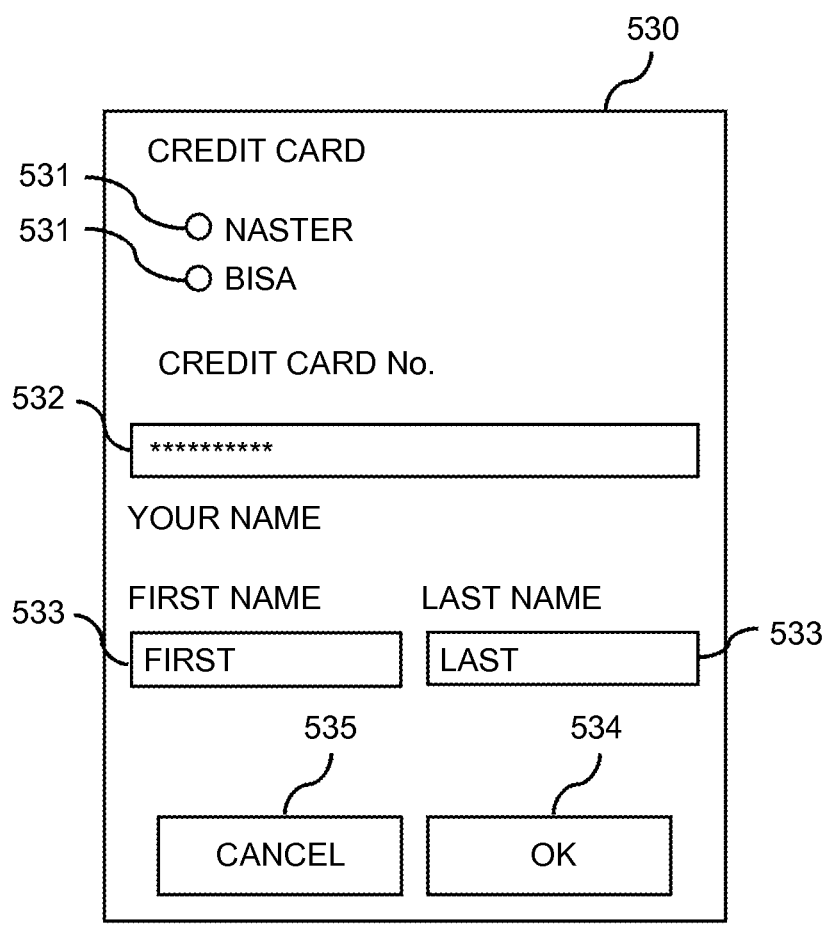
FIG. 39C is a diagram illustrating one example of a payment information input page according to the embodiment of the present invention.

FIG. 39C illustrates one example of a payment information input page 530. As illustrated in FIG. 39C, the payment information input page 530 includes, for example, a radio button 531 for selecting a credit card that is used for the payment, a text box 532 for inputting a credit card number, a text box 533 for inputting a user name, a button 534 for determining the input detail of those described above, and a button 535 for canceling the formal purchase of the content. FIG. 39C illustrates the case where an interface component for selecting the credit card that is used for the payment is the radio button 531, interface components for inputting the credit card number and the user name are the text boxes 532 and 533, and an interface component for determining the input of those described above or and an interface component for canceling the formal purchase of the content are the buttons 534 and 535, respectively, however, other types of interface components may be used.

The operation input unit 204 or the operation input unit 104 receives from the user an input to the payment information input page that requests the payment (S608). The input requesting the payment includes an input designating a credit card used for the payment, an input of a credit card number, an input of a user name, and an input determining the input detail of those described above. In the case illustrated in FIG. 39C, the input designating a credit card used for the payment corresponds to an input selecting the radio button 531, the input of a credit card number and a user name corresponds to an input to the text boxes 532 and 533, and the input for determining the input detail corresponds to an input depressing the button 534. The operation input unit 204 or the operation input unit 104 generates input information indicating the input detail according to the input from the user, and outputs the input information to the control unit 203 or the control unit 103. Step S608 corresponds to step S65.

The control unit 203 generates payment request information requesting the payment, according to the output from the operation input unit 204 or the operation input unit 104 of the input information indicating the input requesting the payment. The payment request information is generated to indicate the input detail (a credit card used for the payment, a credit card number, and a user name) indicated in the input information. The control unit 203 or the control unit 103 transmits the generated payment request information to the server 300 via the data input/output unit 202 or the data input/output unit 101 (S609). Accordingly, the payment of the content to which the formal purchase is offered is made in the server 300. Then, after the end of the payment, payment confirmation page information indicating a payment confirmation page is transmitted from the server 300. Step S609 corresponds to step S66.

The control unit 203 or the control unit 103 receives the payment confirmation page information transmitted from the server 300, via the data input/output unit 202 or the data input/output unit 101 (S610). According to the reception of the payment confirmation page information, the control unit 203 or the control unit 103 displays the payment confirmation page indicated by the payment confirmation page information (S611). Specifically, the control unit 203 or the control unit 103 generates image information indicating the payment confirmation page based on the payment confirmation page information. The control unit 203 or the control unit 103 outputs the generated image information to the image/sound presenting unit 205 or the image/sound presenting unit 105. The image/sound presenting unit 205 or the image/sound presenting unit 105 displays the payment confirmation page indicated by the image information, according to the output of the image information from the control unit 203 or the control unit 103. The payment confirmation page information includes, for example, information indicating HTML of the payment confirmation page. Steps S610 and S611 correspond to step S68. Specifically, the payment confirmation page information corresponds to purchasing procedure completion notification (for the communication terminal).

Figure 39D:
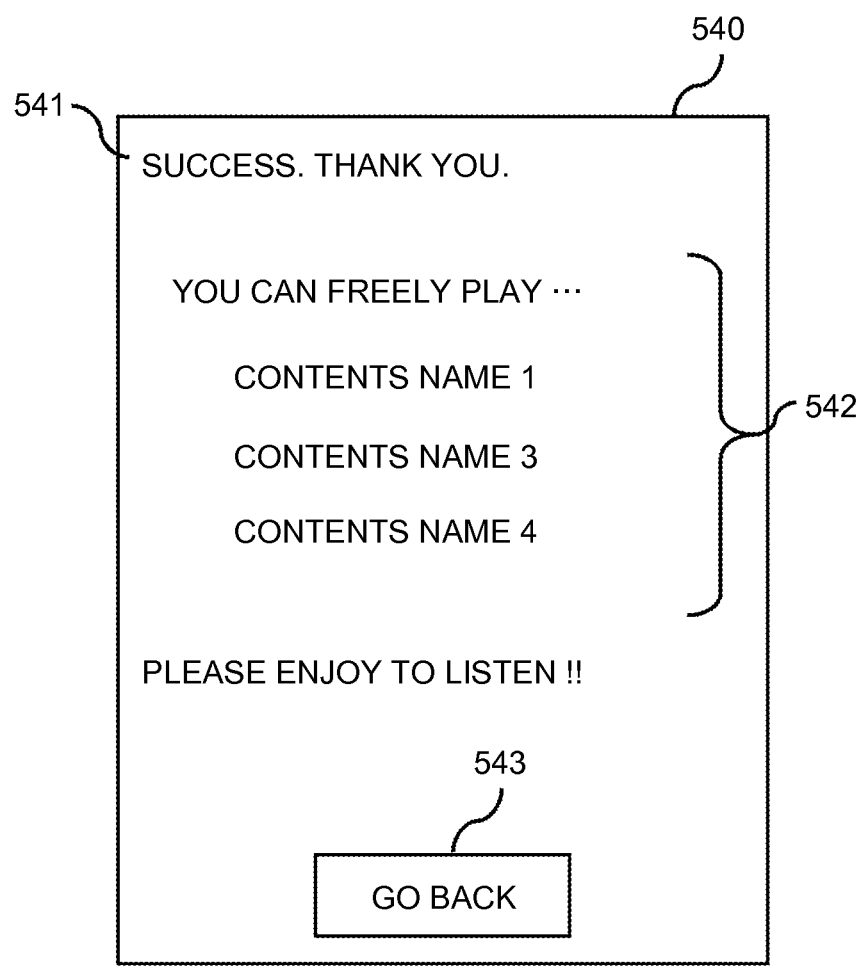
FIG. 39D is a diagram illustrating one example of a payment confirmation page according to the embodiment of the present invention.

FIG. 39D illustrates one example of a payment confirmation page 540. As illustrated in FIG. 39D, the payment confirmation page 540 includes, for example, a message 541 informing that the payment is determined, a list 542 of the content of which the payment is determined, and a button 543 for returning to a top page. FIG. 39D illustrates the case where an interface component for returning to the top page is the button 543; however, other types of interface components may be used.

The user can recognize that the purchasing procedure for the content is completed from the payment confirmation page 540.

Figure 40:
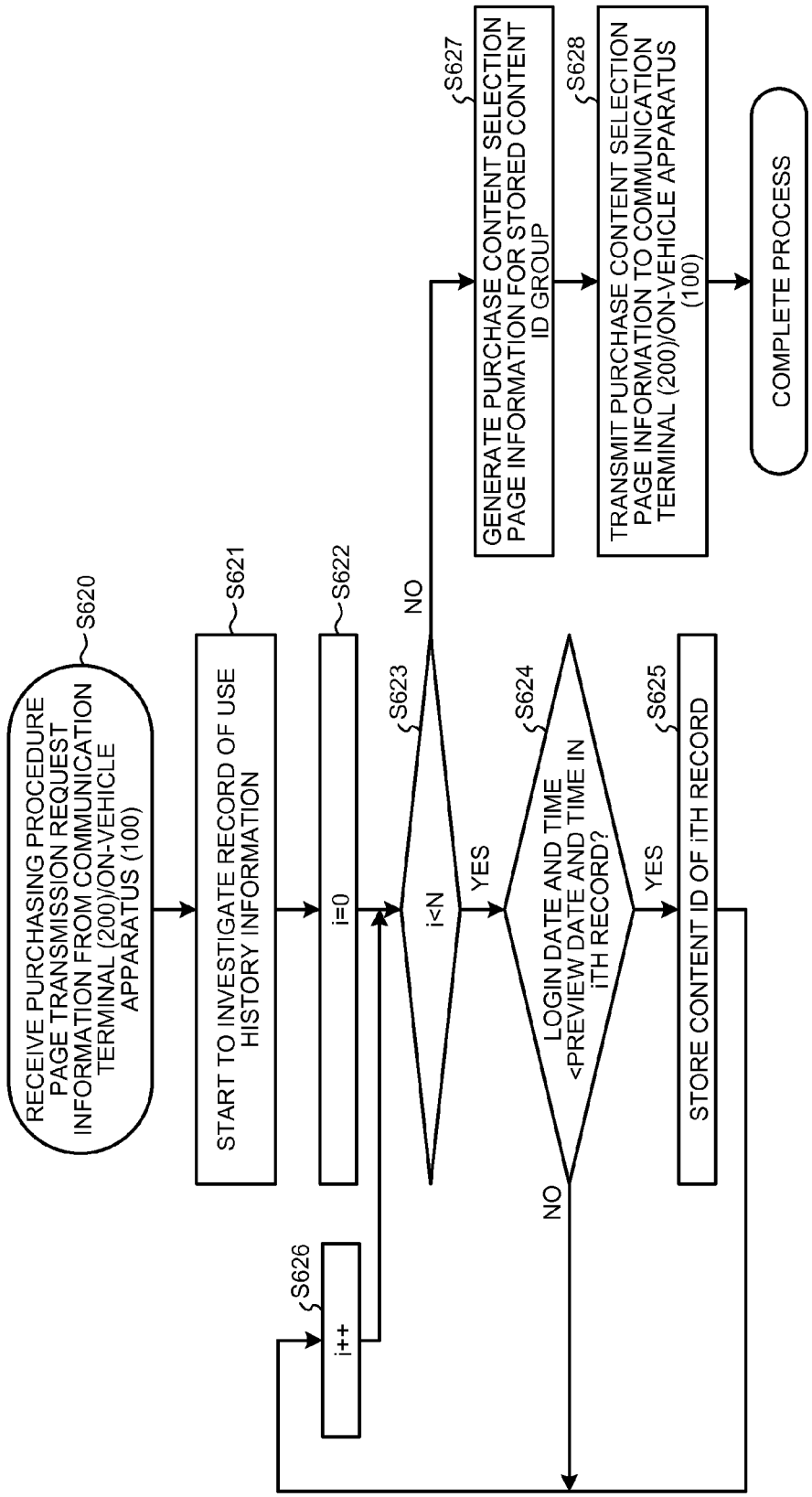
FIG. 40 is a process flow illustrating a process of the server upon receiving a purchasing procedure page transmission request according to the embodiment of the present invention.

Subsequently, a process of the server 300 upon receiving the purchasing procedure page transmission request will be described with reference to FIG. 40. FIG. 40 is a process flow illustrating the process of the server 300 upon receiving the purchasing procedure page transmission request.

The control unit 302 receives the purchasing procedure page transmission request information transmitted from the communication terminal 200 or the on-vehicle apparatus 100, via the data input/output unit 301 (S620). According to the reception of the purchasing procedure page transmission request information, the control unit 302 starts to investigate a record of the use history information 3200 stored in the user information recording unit 312 (S621). Here, the description will be made supposing that the number of records included in the use history information 3200 is N. In other words, it is supposed that the use history information 3200 includes 0th to (N–1)th records. Hereinafter, a record number to be investigated is indicated by i.

The control unit 302 substitutes 0 into i (S622). Specifically, the control unit 302 sets the ith record to be investigated to the 0th record. The control unit 302 determines whether or not the record number i to be investigated is smaller than N (S623). When the record number i to be investigated is smaller than N (S623: Yes), the control unit 302 determines whether or not the preview date and time indicated by the preview date and time information 3202 is a date and time after the login date and time indicated by the login date and time information 3304 of the user management information 3300 (S624).

When the preview date and time is a date and time after the login date and time in the ith record (0th record) to be investigated (S624: Yes), the control unit 302 stores the content ID information 3201 indicating the content ID of the ith record (0th record) in any storage device included in the server 300 (S625).

When the preview date and time is not a date and time after the login date and time in the ith record (0th record) to be investigated (S624: No), and when the storage of the content ID information 3201 ends (S625), the control unit 302 adds 1 to i (S626). Specifically, the control unit 302 sets the record number to be investigated to the record number obtained by adding 1 to the current record number. Here, since the record number is 0, the record number is set to 1.

Next, processes after step S623 are similarly executed with respect to the ith record (1st record) to be investigated. Specifically, afterward, the processes after step S623 are repeated with respect to all of the N records (S623: Yes). As a result, the content ID information indicating the content ID of the content previewed after the login is stored in the storage device.

When the record number i to be investigated becomes N or more (S623: No), the control unit 302 acquires the attribute information 3103 of the record indicating the content ID of a content ID group indicated by the content ID information 3201 stored in the storage device, in the content management information 3100, and generates the purchase content selection page information based on the acquired attribute information 3103 (S627). For example, when the list 501 of the names of the previewed content is indicated in the purchase content selection page 500 as illustrated in FIG. 39A, the list 501 of the names of the previewed content is created based on the names (titles) of the content indicated by the attribute information 3103. In other words, the purchase content selection page 500 indicating the content that is previewed after the login as a subject to be selected as the purchasing procedure is generated. The control unit 302 transmits the generated purchase content selection page information to the communication terminal 200 or the on-vehicle apparatus 100 via the data input/output unit 301 (S628). Steps S620 to S628 correspond to step S62.

Figure 41:
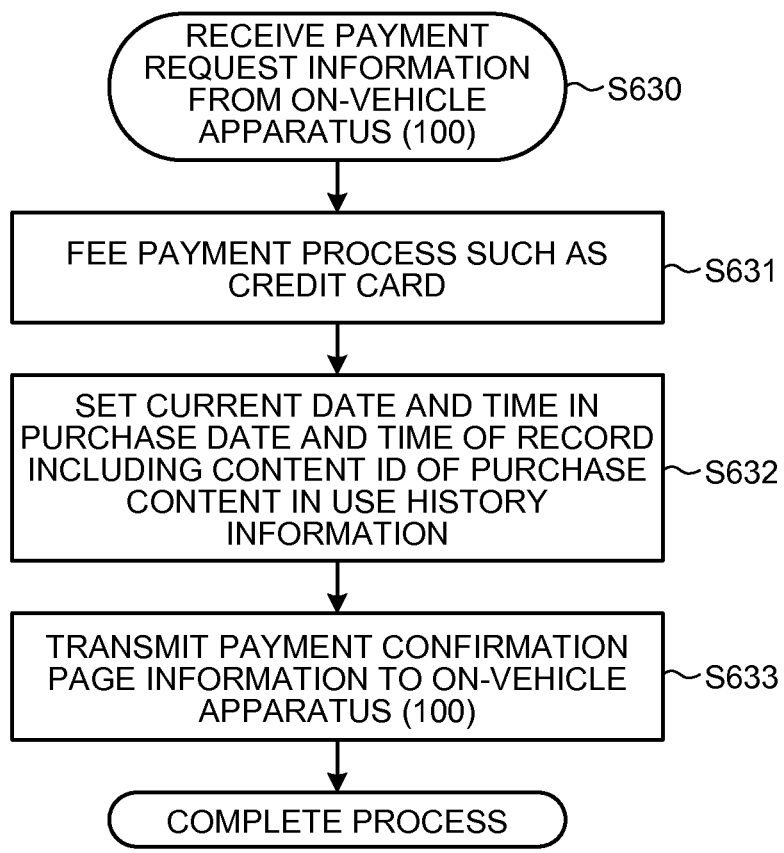
FIG. 41 is a process flow indicating a process of the server upon receiving payment request information according to the embodiment of the present invention.

Subsequently, a process of the server 300 upon receiving the payment request information will be described with reference to FIG. 41. FIG. 41 is a process flow illustrating the process of the server 300 upon receiving the payment request information.

The control unit 302 receives the payment request information transmitted from the communication terminal 200 or the on-vehicle apparatus 100, via the data input/output unit 301 (S630). The control unit 302 makes a payment of the content fee by a payment method (credit card, etc.) indicated by the payment request information (S631). The control unit 302 sets the current date and time in the purchase date and time information 3203 of the record indicating the content ID of the content of which the payment is completed, in the use history information 3200 stored in the user information recording unit 312 (S632). The control unit 302 generates payment confirmation page information, and transmits the payment confirmation page information to the control unit 103 and the control unit 203 via the data input/output unit 301 (S633). Note that the control unit 302 of the server 300 transmits the purchase content selection page including the content ID information of the content that can be selected on the purchase content selection page, to the on-vehicle apparatus 100, and the control unit 103 of the on-vehicle apparatus 100 transmits the content ID information of the content selected from the purchase content selection page, which is included in the payment information input page transmission information or the payment request information, to the server 300, whereby the control unit 302 of the server 300 can specify the content that is a subject for the payment by the content ID information included in the payment information input page transmission request information or the payment request information.

Figures 42, 43:
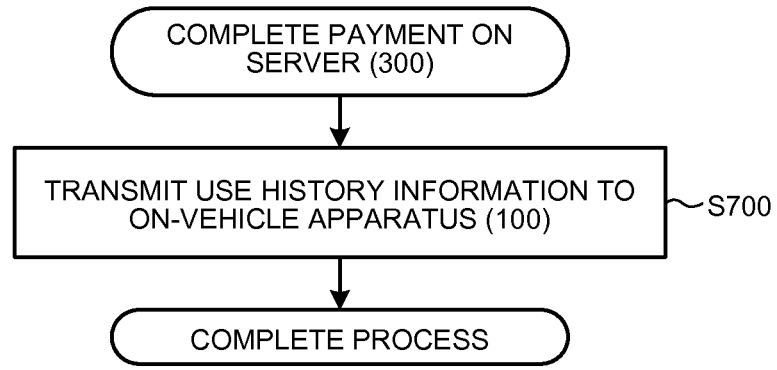
FIG. 42 is a diagram illustrating a relationship between an input in a temporary license request and an input in a formal license request according to the embodiment of the present invention.
FIG. 43 is a diagram illustrating a process flow of the server upon a completion of a payment according to the embodiment of the present invention.

Here, a relationship between an input in a temporary license request and an input in a formal license request will be described with reference to FIG. 42. FIG. 42 is a diagram illustrating the relationship between the input in the temporary license request and the input in the formal license request.

The input in the temporary license request and the input in the formal license request have the relationship as illustrated in FIG. 42 in which the input in the temporary license request is easier than the input in the formal license request. FIG. 42 illustrates the relationship from four different viewpoints.

The first one indicates that the input in the temporary license request becomes a sound input, and the input in the formal license request becomes a manual operation input. Specifically, here, the relationship in the case of executing the above-described "(2) request input method by sound" in the temporary license request is illustrated. On the other hand, in the formal license request, it is necessary to input the input items (a credit card used for the payment, a credit card number, a user name, etc.) in the purchasing procedure by the manual operation input as described above. The sound input becomes an input method easier than the manual operation input in a state of driving the vehicle, in the point that the driving of the vehicle can be continued.

The second one indicates that the operating time is small in the input in the temporary license request, and the operating time is larger in the input in the formal license request than in the input in the temporary license request. In the temporary license request, the operating time is only one that is the depression of the get button 403, the get button 413, the get button 422, or the get button 432, or sound input, as described with reference to FIGS. 17A, 17B, 20A, and 20B. On the other hand, in the formal license request, it is necessary to input the plural input items (a credit card used for the payment, a credit card number, a user name, etc.) in the purchasing procedure as described above. Furthermore, the operating time increases according to the number of characters to be inputted upon inputting a character string of a credit card number, a user name, and the like.

The third one indicates that the input in the temporary license request is selection operation (touch operation), and the input in the formal license request becomes a character input. In the temporary license request, the input performing the selection operation (touch operation) on the get button 403, the get button 413, the get button 422, or the get button 432 is only performed as described with reference to FIGS. 17A, 17B, 20A, and 20B. On the other hand, in the formal license request, a character input is included in the input of the input items (a credit card used for the payment, a credit card number, a user name, etc.) in the purchasing procedure as described above.

The fourth one indicates that the number of the input items is small in the input in the temporary license request, and the number of the input items is larger in the input in the formal license request than in the input in the temporary license request. In the temporary license request, the input item is only one item of the input of the get button 403, the get button 413, the get button 422, or the get button 432 as described with reference to FIGS. 17A, 17B, 20A, and 20B. On the other hand, in the formal license request, it is necessary to input the plural input items (a credit card used for the payment, a credit card number, a user name, etc.) in the purchasing procedure as described above.

As described above, in the present embodiment, the input in the temporary license request becomes an input easier than the input in the formal license request, whereby the content which the user intends to purchase (plans to purchase) while driving the vehicle can be downloaded from the server 300 and used while driving the vehicle by the input easier than in the actual purchasing procedure.

11. Issuance of Formal License (S7)

Subsequently, the formal license issuing process in step S7 will be described in more detail.

Here, the following four management methods will be described as the content data management method.

(1) Management by means of a temporary storage area (2) Management by means of re-issuance of formal content data (3) Management by means of a key (4) Management by means of splitting content data (1) Management by Means of Temporary Storage Area This management method is the content data management method directed to the method of adding restriction during reproduction of content and providing the content with restriction. In this management method, the content recording unit 111 includes a temporary storage area that temporarily stores content data, and a permanent storage area that permanently stores content data. In this management method, the content data acquired during the preview is stored in the temporary storage area. Then, the content data stored in the temporary storage area is moved to the permanent storage area after the completion of the purchasing procedure for the content, and the content data can continuously be used. Furthermore, in this management method, the continuous illegal use of the content without performing the purchasing procedure is prevented by deleting the content data stored in the temporary storage area at a predetermined time point.

A process of the server upon the completion of the payment will be described with reference to FIG. 43. FIG. 43 is a diagram illustrating a process flow of the server 300 upon the completion of the payment.

The control unit 302 acquires the use history information 3200 stored in the user information recording unit 312 after the completion of the payment, and transmits the use history information to the on-vehicle apparatus 100 via the data input/output unit 301 (S700). Step S700 corresponds to step S70. In other words, the use history information 3200 corresponds to the purchasing procedure completion notification information (for the on-vehicle apparatus).

Figure 44:
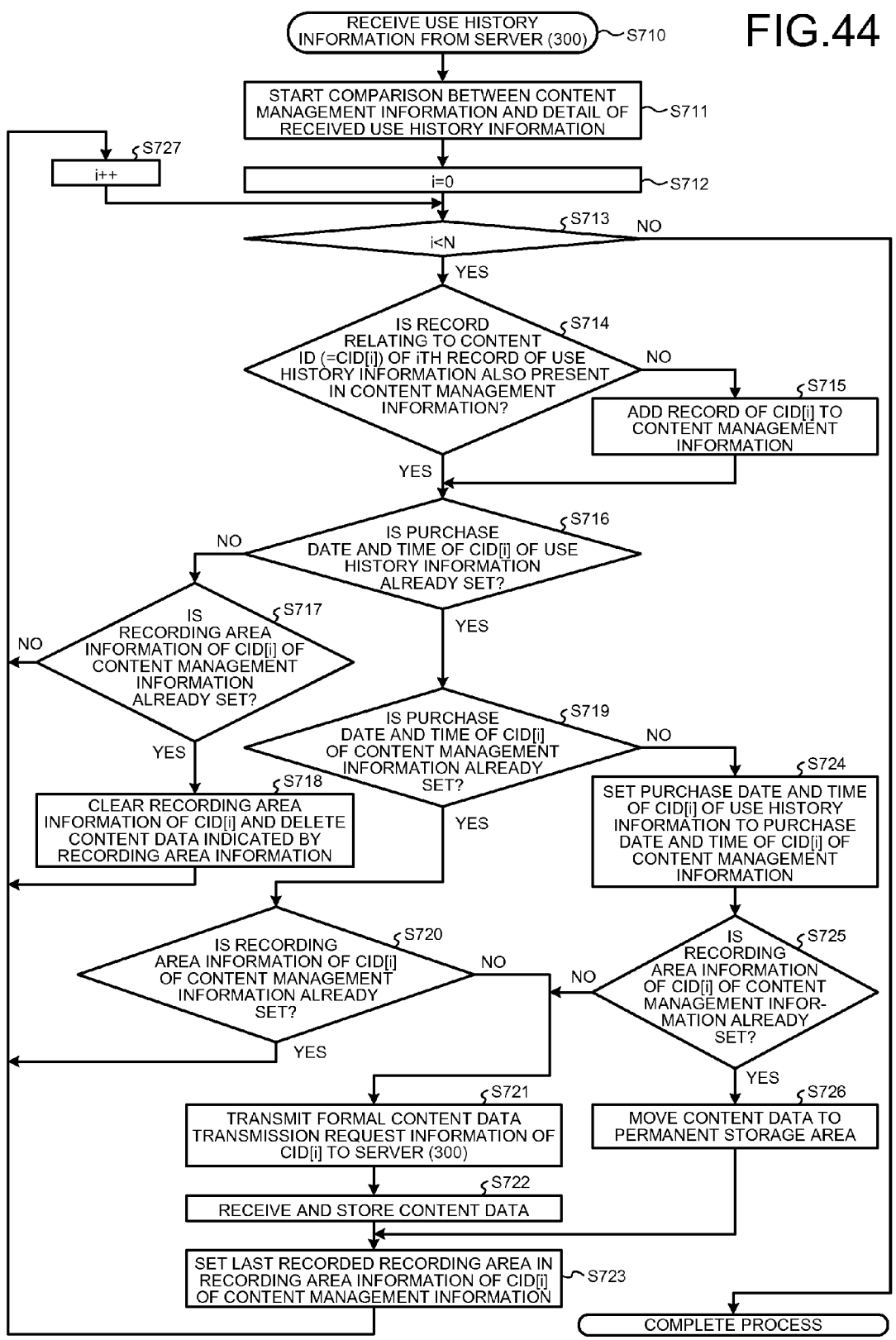
FIG. 44 is a diagram illustrating a process flow of the on-vehicle apparatus upon receiving use history information in the case of executing a management method by means of a temporary storage area.

Subsequently, a process of the on-vehicle apparatus 100 upon receiving the use history information will be descried with reference to FIG. 44. FIG. 44 is a diagram illustrating a process flow of the on-vehicle apparatus 100 upon receiving the use history information.

The control unit 103 receives the use history information 3200 transmitted from the server 300, via the data input/output unit 101 (S710). The control unit 103 starts to compare the content management information 1100 stored in the content recording unit 111 and the detail of the received use history information 3200, when receiving the use history information 3200 (S711). Here, the description will be made supposing that the number of records included in the use history information 3200 is N.

In other words, it is supposed that the use history information 3200 includes 0th to (N−1)th records. Hereinafter, a record number to be investigated is indicated by i.

The control unit 103 substitutes 0 into i (S712). Specifically, the control unit 302 sets the ith record to be compared to the 0th record. The control unit 103 determines whether or not the record number i to be compared is smaller than N (S713). When the record number to be investigated is smaller than N (S713: Yes), the control unit 103 determines whether or not the record relating to the content ID indicated by the ith record of the use history information 3200 is also present in the content management information 1100 (S714). When the record relating to the content ID indicated by the ith record is not present in the content management information 1100 (S714: No), the control unit 103 adds a record indicating the content ID to the content management information 1100 (S715). The control unit 302 sets the purchase date and time information 1102 of the added record so as to indicate the purchase date and time indicated by the ith record of the use history information 3200.

When the record relating to the content ID indicated by the ith record of the use history information 3200 is also present in the content management information 1100 (S714: Yes), and after the execution of step S715, the control unit 103 determines whether or not the purchase date and time information 3203 of the ith record of the use history information 3200 is already set (S716).

When the purchase date and time information 3203 of the ith record of the use history information 3200 is not yet set (S716: No), the control unit 103 determines whether or not the recording area information 1103 of the record indicating the content ID indicated by the ith record of the use history information 3200 is already set in the content management information 1100 (S717). When the recording area information 1103 is already set (S717: Yes), the control unit 103 clears the setting of the recording area information 1103, and deletes the content data stored in the recording area (temporary storage area) indicated by the recording area information 1103 (S718). Then, the control unit 103 proceeds to step S727 in order to execute the process with respect to the next record. Furthermore, when the recording area information 1103 is not yet set (S717: No), the control unit 103 proceeds to step S727.

When the purchase date and time information 3203 of the ith record of the use history information 3200 is already set (S716: Yes), the control unit 103 determines whether or not the purchase date and time information 1102 of the record indicating the content ID indicated by the ith record of the use history information 3200 is already set in the content management information 1100 (S719).

When the purchase date and time information 1102 is already set (S719: Yes), the control unit 103 determines whether or not the recording area information 1103 of the record indicating the content ID indicated by the ith record of the use history information 3200 is already set in the content management information 1100 (S720).

When the recording area information 1103 is already set (S720: Yes), the content is already purchased, and its content data is also already stored in the permanent storage area. In this case, the control unit 103 proceeds to step S727 in order to execute the process with respect to the next record.

When the recording area information 1103 is not yet set (S720: No), the control unit 103 generates formal content data transmission request information requesting the transmission of the content data of the content ID indicated by the ith record of the use history information 3200. The formal content data transmission request information is generated so as to indicate the content ID indicated by the ith record of the use history information 3200. When the content is already purchased, but its content data is not yet stored, the determination in step S720 becomes No. The control unit 103 transmits the generated formal content data transmission request information to the server 300 via the data input/output unit 101 (S721). Accordingly, the content data of the content ID designated by the formal content data transmission request information is transmitted from the server 300. The control unit 103 receives the content data transmitted from the server 300, via the data input/output unit 101, and stores the content data in the permanent storage area of the content recording unit 111 (S722). The control unit 103 sets the recording area storing the content data in the recording area information 1103 (S723). Then, the control unit 103 proceeds to step S727 in order to execute the process with respect to the next record.

When the purchase date and time information 1102 is not yet set (S719: No), the control unit 103 sets the purchase date and time, indicated by the purchase date and time information 3203 of the ith record of the use history information 3200, in the purchase date and time information 1102 of the record indicating the content ID indicated by the ith record of the use history information 3200 in the content management information 1100 (S724). When content is newly purchased, the determination in step S729 becomes No. The control unit 103 determines whether or not the recording area information 1103 of the record indicating the content ID indicated by the ith record in the use history information 3200 is already set in the content management information 1100 (S725).

When the recording area information 1103 is already set (S725: Yes), the control unit 103 moves the content data stored in the recording area (temporary storage area) indicated by the recording area information 1103 to the permanent storage area of the content recording unit 111 (S726), and sets the recording area information 1103 so as to indicate the recording area to which the content data is moved (S723). When the content is already purchased, and step S718 is not executed with respect to the content data of this content, the determination in step S725 becomes Yes. When the recording area information 1103 is not yet set (S725: No), the control unit 103 executes step S721. This happens when the content is already purchased, but step S718 is executed with respect to the content data of this content and the content data is deleted. Then, after steps S721 to S723 are executed, the control unit 103 proceeds to step S727 in order to execute the process with respect to the next record.

The control unit 103 adds 1 to i (S727). Specifically, the control unit 103 sets the record number to be investigated to the record number obtained by adding 1 to the current record number. Here, since the record number is 0, the record number is set to 1.

Next, the processes after step S714 are similarly executed with respect to the ith record (1st record) to be compared. In other words, afterward, the processes after step S714 are repeated with respect to all of the N records (S713: Yes). When the record number i to be compared becomes N or more (S713: No), the control unit 103 ends the process. Steps S710 to S727 correspond to step S71.

Note that, in the process described here, the timing of deleting the content data stored in the temporary storage area is the time when the use history information 3200 is received, however, the timing of deleting the content data stored in the temporary storage area is not limited thereto. The content data may be deleted at a predetermined time point, so long as the use of the content data without performing the purchasing procedure can be prevented. For example, the content data may be deleted at the timing when the on-vehicle apparatus 100 logs out of the server 300, or may be deleted at the timing when the on-vehicle apparatus 100 shuts down, or may be deleted when the reproduction of the content by means of the content data is performed at a predetermined number of times.

Figure 45:
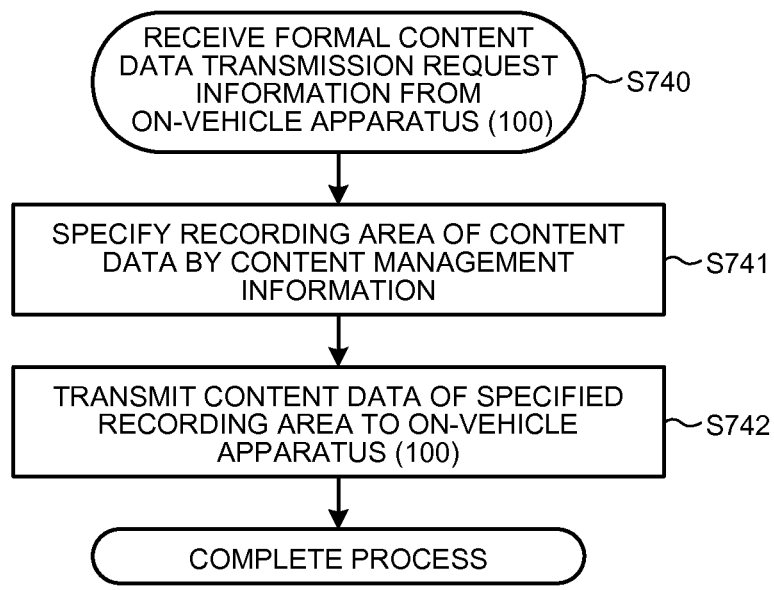
FIG. 45 is a process flow illustrating a process of the server upon receiving a formal content data transmission request in the case of executing the management method by means of the temporary storage area.

Subsequently, a process of the server 300 upon receiving the formal content data transmission request will be described with reference to FIG. 45. FIG. 45 is a process flow illustrating the process of the server 300 upon receiving the formal content data transmission request.

The control unit 302 receives the formal content data transmission request information transmitted from the on-vehicle apparatus 100, via the data input/output unit 301 (S740). The control unit 302 specifies the recording area of the content data of the content ID indicated by the formal content data transmission request information, according to the reception of the formal content data transmission request information (S741). Specifically, the control unit 302 specifies the recording area indicated by the recording area information 3102 in the record including the content ID information 3101 indicating the content ID indicated by the formal content data transmission request information, as the recording area of the content data in the content management information 3100.

The control unit 302 acquires the content data stored in the specified recording area from the content recording unit 311, and transmits the content data to the on-vehicle apparatus 100 or the communication terminal 200 via the data input/output unit 301 (S742). Note that, in this case, restriction can also be provided in the number of transmissions of the formal content data, i.e., the number of times of download. This is to prevent a user other than the user who has performed the purchasing procedure from illegally downloading and obtaining the content data.

(2) Management by Means of Re-Issuance of Formal Content Data

This management method is the content data management method directed to the method of adding restriction to content itself and providing the content with restriction. Specifically, in this management method, the content recording unit 311 stores beforehand content data with restriction and content data without restriction. Then, the on-vehicle apparatus 100 acquires the content data without restriction as the formal content data from the server 300 after the completion of the purchasing procedure of the content, whereby the content without restriction can continuously be used. In this management method, the continuous illegal use of the content without performing the purchasing procedure is prevented by deleting the content data with restriction at a predetermined time point.

Figure 46:
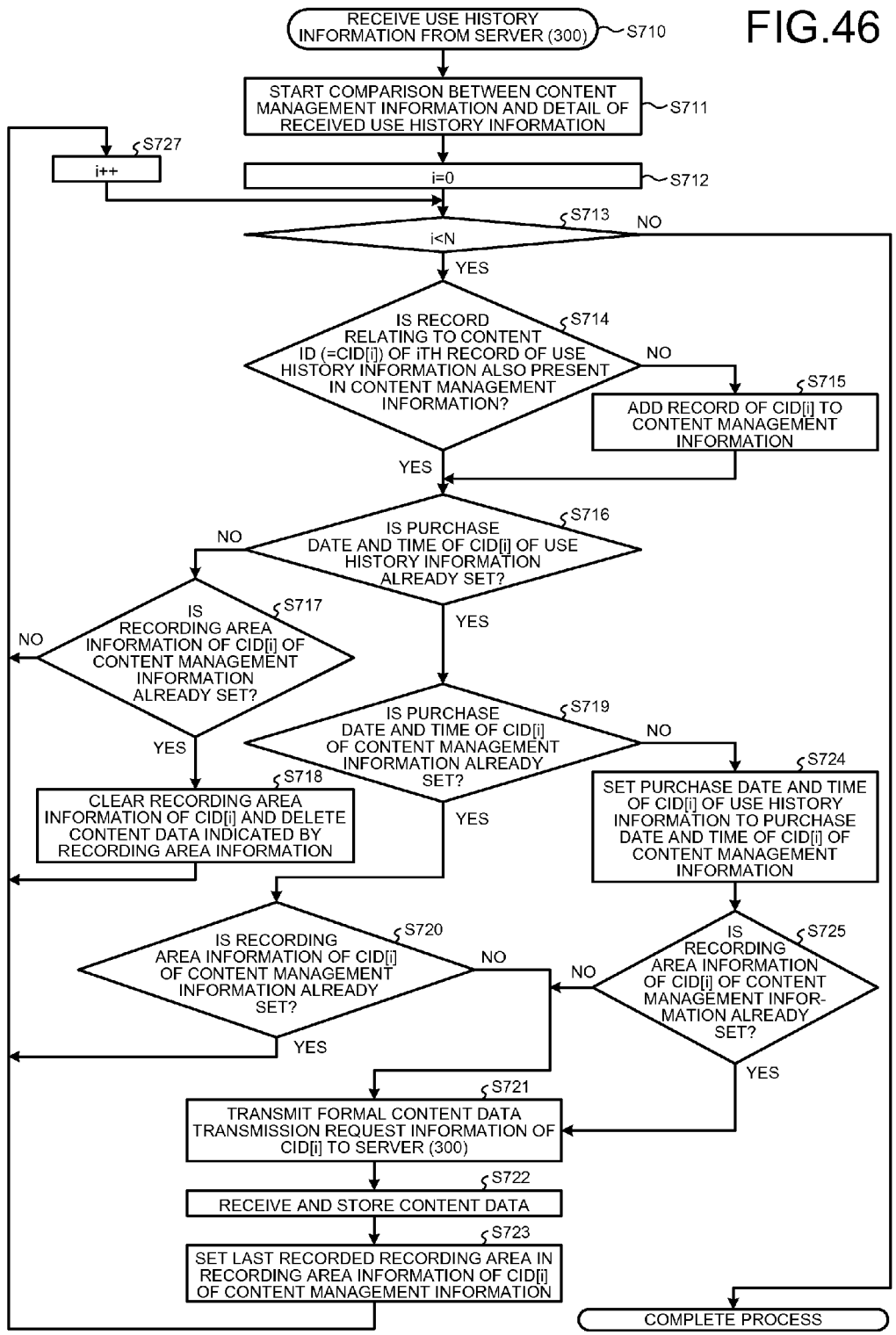
FIG. 46 is a process flow illustrating a process of the on-vehicle apparatus upon receiving the use history information in the case of executing a management method by means of re-issuance of formal content data.

Subsequently a process of the on-vehicle apparatus 100 upon receiving the use history information will be described with reference to FIG. 46. FIG. 46 is a process flow illustrating the process of the on-vehicle apparatus 100 upon receiving the use history information. Hereinafter, different points from the management method (1) will be described.

This management method is different from the process upon receiving the formal content data transmission request described with reference to FIG. 44 in that step S721 is also executed in the case where the recording area information 1103 of the content management information 1100 is already set (S725: Yes). In this management method, the content data with restriction is stored in the content recording unit 111 in this case (S725: Yes). Therefore, in this case, the control unit 103 also transmits the formal content data transmission request information to the server 300. Then, in this management method, the control unit 302 of the server 300 transmits the content data without restriction stored in the content recording unit 311 to the on-vehicle apparatus 100, according to the reception of the formal content data transmission request information (S742 in FIG. 45).

Here, in this management method, the content management information 3100 illustrated in FIG. 47 is stored in the content recording unit 311 of the server 300. As illustrated in FIG. 47, the content management information 3100 includes recording area information 3102a indicating the recording area in which the content data with restriction is stored, and recording area information 3102b indicating the recording area in which the content data without restriction is stored, as the recording area information 3102. Then, during preview, the control unit 302 of the server 300 specifies the recording area of the content data with restriction as the recording area of the content data to be transmitted according to a transmission request of the on-vehicle apparatus 100 for the content data, based on the recording area information 3102a indicating the recording area in which the content data with restriction is stored (S405 in FIG. 22), and after the completion of the content purchasing procedure, the control unit 302 specifies the recording area for the content data without restriction as the recording area of the content data transmitted according to the transmission request of the on-vehicle apparatus 100 for the content data, based on the recording area information 3102b indicating the recording area in which the content data without restriction is stored (S741 in FIG. 45).

(3) Management by Means of Key

This management method is the content data management method directed to the method of adding restriction during reproduction of content and providing the content with restriction. In this management method, it is supposed that content data is encrypted data. It is also supposed that the content recording unit 311 of the server 300 also stores key data indicating a decryption key used for the decryption of the content data, so as to correspond to each piece of the content data. When transmitting the content data to the on-vehicle apparatus 100, the control unit 302 of the server 300 transmits the key data corresponding to the content data. Then, the control unit 103 of the on-vehicle apparatus 100 stores the key data together with the content data in the content recording unit 111, and when reproducing the content, the control unit 103 reproduces the content while decrypting the content data by using the key data. Furthermore, in this management method, the continuous illegal use of the content without performing the purchasing procedure is prevented by deleting the key data at a predetermined time point. Then, after the completion of the content purchasing procedure, the control unit 103 acquires the key data from the server 300, and the content can continuously be used.

Here, in this management method, the content management information 1100 illustrated in FIG. 48 is stored in the content recording unit 111 of the on-vehicle apparatus 100. As illustrated in FIG. 48, the content management information 1100 includes key recording area information 1104 indicating a recording area in which the key data of the content indicated by the same record is recorded. The control unit 103 of the on-vehicle apparatus 100 sets the key recording area information 1104 so as to indicate the recording area in which the key data is stored, in the record to be added when receiving the content data (S412 in FIG. 23). Then, the control unit 103 reproduces the content while decrypting the content data, based on the key data recorded in the recording area (S413 in FIG. 23).

Furthermore, in this management method, the content management information 3100 illustrated in FIG. 49 is stored in the content recording unit 311 of the server 300. As illustrated in FIG. 49, the content management information 3100 includes key recording area information 3104 indicating a recording area in which the key data of the content indicated by the same record is recorded. Then, when transmitting the content data (S405, S406 in FIG. 22), the control unit 302 of the server 300 similarly specifies the recording area of the key data based on the key recording area information 3104, and transmits the key data stored in the specified recording area to the on-vehicle apparatus 100 together with the content data.

Figure 50:
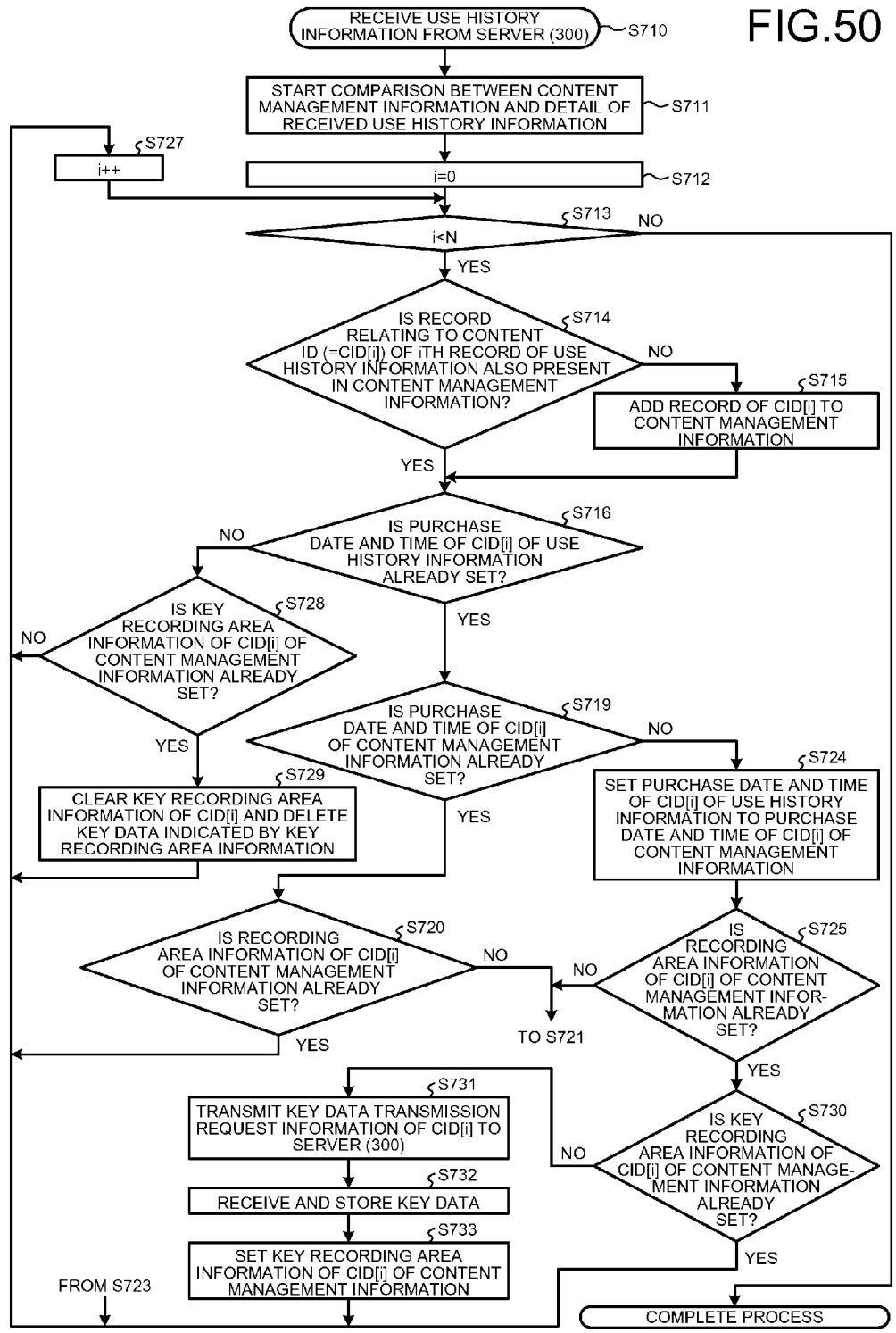
FIG. 50 is a diagram illustrating a process flow of a process of the on-vehicle apparatus upon receiving the use history information in the case of executing the management method by means of a key.

Subsequently, a process of the on-vehicle apparatus 100 upon receiving the use history information will be described with reference to FIG. 50. FIG. 50 is a process flow illustrating the process of the on-vehicle apparatus 100 upon receiving the use history information. The different points from the management method (1) will be described. Note that, in FIG. 50, the illustration of steps S721 to S723 is omitted.

This management method is different from the process upon receiving the formal content data transmission request described with reference to FIG. 44 in that steps S728 and S729 are executed instead of steps S717 and S718. Specifically, the control unit 103 determines whether or not the key recording area information 1104 of the record indicating the content ID indicated by the ith record of the use history information 3200 is already set in the content management information 1100 stored in the content recording unit 111 (S728). When the key recording area information 1104 is already set (S728: Yes), the control unit 103 clears the setting of the key recording area information 1104, and deletes the key data stored in the recording area indicated by the key recording area information 1104 (S729). The control unit 103 then proceeds to step S727 in order to execute the process with respect to the next record. Furthermore, when the key recording area information 1104 is not yet set (S728: No), the control unit 103 also proceeds to step S727.

This management method is also different from the process upon receiving the formal content data transmission request described with reference to FIG. 44 in that steps S730 to S733 are executed instead of steps S726 and S723, when the recording area information 1103 of the content management information 1100 is already set (S725: Yes).

Specifically, when the recording area information 1103 of the content management information 1100 is already set (S725: Yes), the control unit 103 determines whether or not the key recording area information 1104 of the record indicating the content ID indicated by the ith record of the use history information 3200 is already set in the content management information 1100 stored in the content recording unit 111 (S730). When the key recording area information 1104 is already set (S730: Yes), the control unit proceeds to step S727 in order to execute the process with respect to the next record.

When the key recording area information 1104 is not yet set (S730: No), the control unit 103 generates key data transmission request information requesting the transmission of the key data of the content of the content ID indicated by the ith record of the use history information 3200. This key data transmission request information is generated so as to indicate the content ID indicated by the ith record of the use history information 3200. When the content is already purchased and the content data of this content is stored, but step S729 is executed and the key data of this content data is deleted, the determination in step S730 becomes No. The control unit 103 transmits the generated key data transmission request information to the server 300 via the data input/output unit 101 (S731). Accordingly, the key data of the content of the content ID designated by the key data transmission request information is transmitted from the server 300.

The control unit 103 receives the key data transmitted from the server 300, via the data input/output unit 101, and stores the key data in the content recording unit 111 (S732). The control unit 103 sets the recording area, in which the content data is stored, in the key recording area information 1104 (S733). The control unit 103 then proceeds to step S727 in order to execute the process with respect to the next record. When the key recording area information 1104 is already set (S730: Yes), the control unit 103 proceeds to step S727.

Figure 51:
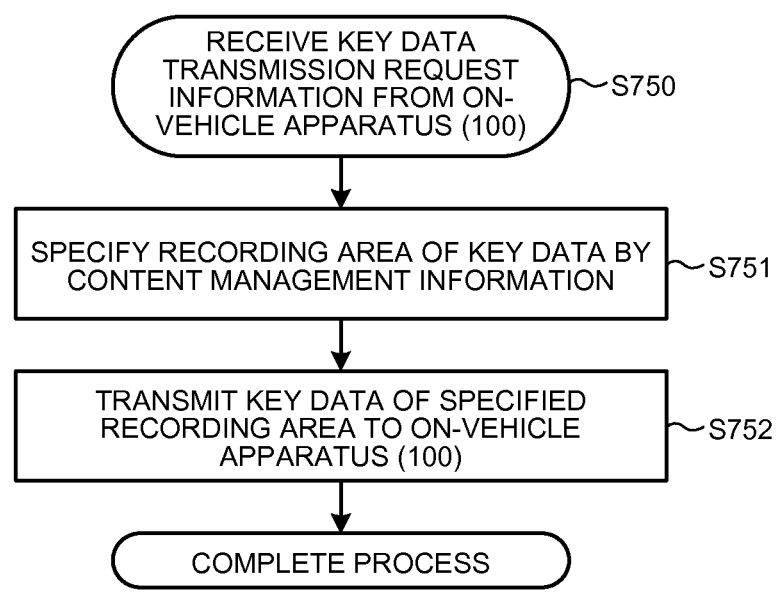
FIG. 51 is a process flow illustrating a process of the server upon receiving a key data transmission request in the case of executing the management method by means of a key.

Subsequently, a process of the server 300 upon receiving the key data transmission request will be described with reference to FIG. 51. FIG. 51 is a process flow illustrating the process of the server 300 upon receiving the key data transmission request.

The control unit 302 receives the key data transmission request information transmitted from the on-vehicle apparatus 100, via the data input/output unit 301 (S750). According to the reception of the key data transmission request information, the control unit 302 specifies the recording area of the key data of the content of the content ID indicated by the key data transmission request information, based on the content management information 3100 stored in the content recording unit 311 (S751). Specifically, the control unit 302 specifies the recording area indicated by the key recording area information 3104 in the record including the content ID information 3101 indicating the content ID indicated by the key data transmission request information, as the recording area of the key data.

The control unit 302 acquires the key data stored in the specified recording area, from the content recording unit 311, and transmits the key data to the on-vehicle apparatus 100 via the data input/output unit 301 (S752).

(4) Management Method by Means of Splitting Content Data

This management method is the content data management method directed to the method of adding restriction during reproduction of content and providing the content with restriction. When receiving the content data from the server 300, the control unit 103 of the on-vehicle apparatus 100 transmits a part of the content data to the communication terminal 200. The communication terminal 200 stores the part of the content data transmitted from the on-vehicle apparatus 100 in the storage device included in the communication terminal 200. Then, in this management method, the continuous illegal use of the content without performing the purchasing procedure is prevented by deleting the part transmitted to the communication terminal 200 at a predetermined time point. Then, after the completion of the content purchasing procedure, the control unit 103 acquires the part of the content data from the communication terminal 200, and the content can continuously be used.

Figure 52:
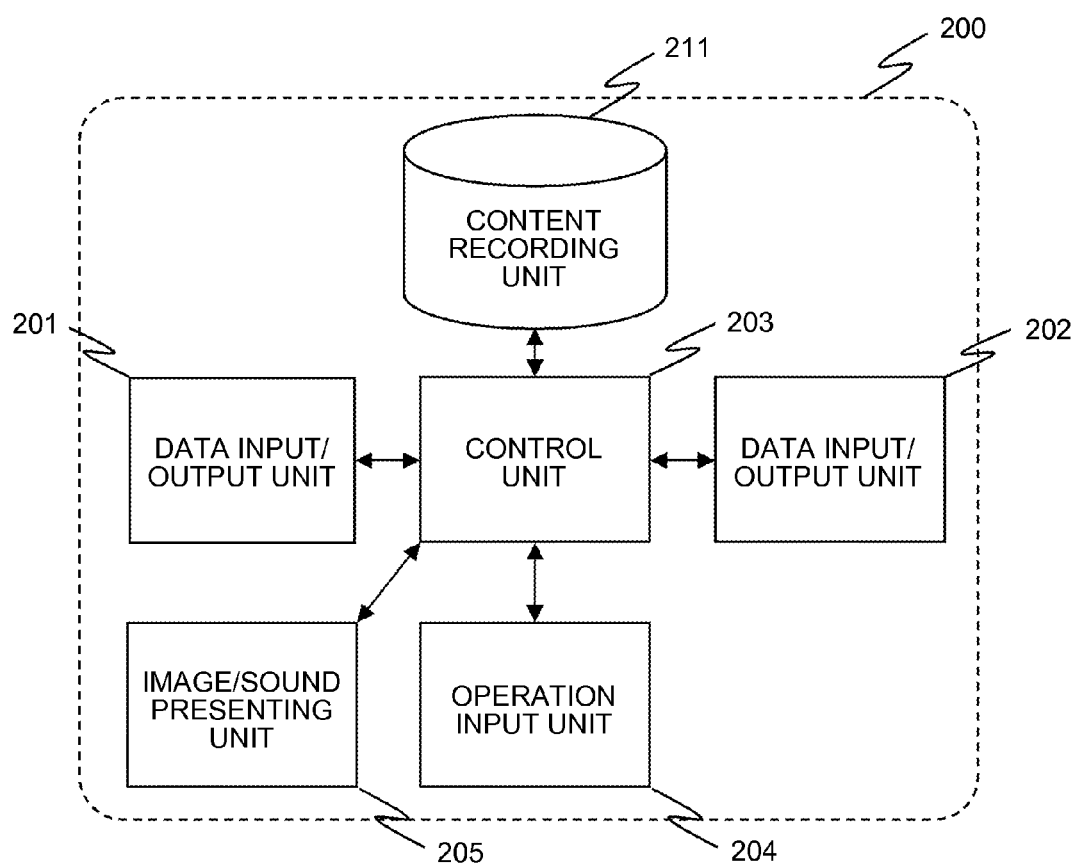
FIG. 52 is a block diagram illustrating an example of a configuration of the communication terminal in the case of executing a management method by means of splitting content data.

A configuration of the communication terminal 200 in the case of executing the management method by means of splitting content data will be described with reference to FIG. 52. FIG. 52 is a block diagram illustrating an example of the configuration of the communication terminal 200 in the case of executing the management method by means of splitting content data.

The communication terminal 200 further includes a content recording unit 211, in addition to the data input/output units 201 and 202, the control unit 203, the operation input unit 204, and the image/sound presenting unit 205. The content recording unit 211 stores a part of the content data transmitted from the on-vehicle apparatus 100 and the content management information 2100. The content management information 2100 will be described later with reference to FIG. 53. The content recording unit 211 includes any recording device for storing content data and the content management information 2100.

Figure 53:
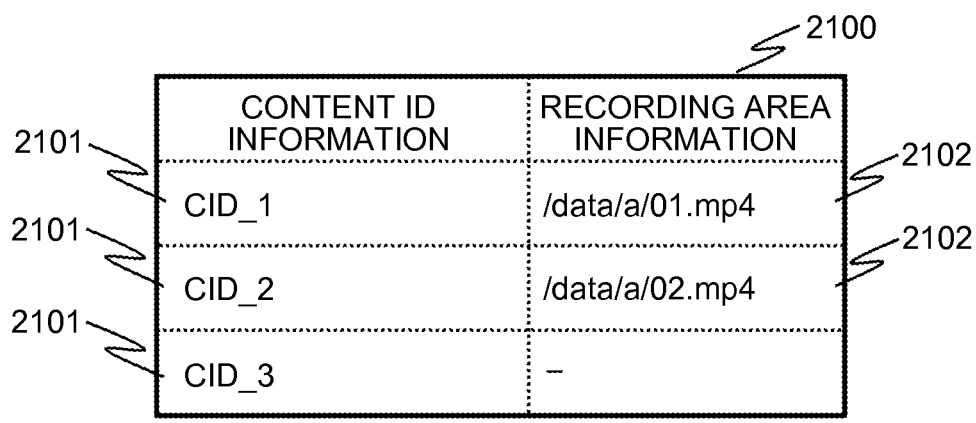
FIG. 53 is a diagram illustrating content management information of the communication terminal in the case of executing the management method by means of splitting content data.

Here, in this management method, the content management information 2100 illustrated in FIG. 53 is stored in the content recording unit 211 of the communication terminal 200. The content management information 2100 does not include a record in an initial state; however, the content management information is updated so as to include one or more records according to the transmission of the part of the content data from the on-vehicle apparatus 100. One record includes content ID information 2101, and recording area information 2102. Each record indicates information relating to the content of the content ID indicated by the content ID information 2101 included in this record.

The content ID information 2101 is similar to that described above, so that the description will be omitted. The recording area information 2102 is information indicating the recording area where a part of content data is recorded in the content recording unit 211. The recording area becomes a path where a part of content data is stored as illustrated in FIG. 53.

In this management method, when requesting the temporary license and receiving content data from the server 300 (S410 in FIG. 23), the control unit 103 of the on-vehicle apparatus 100 transmits a copy of a part of the received content data to the communication terminal 200 via the data input/output unit 102. The control unit 203 of the communication terminal 200 receives the part of the content data transmitted from the on-vehicle apparatus 100, via the data input/output unit 201. The control unit 203 stores the part of the received content data in the content recording unit 211. The control unit 203 adds a record including the content ID information 2101 indicating the content ID of the received content data, to the content management information 2100 stored in the content recording unit 211. For example, the control unit 203 receives the part of the content data together with the content ID information of this content data from the control unit 103 of the on-vehicle apparatus 100, thereby recognizing the received content ID information. The control unit 203 sets the recording area information 2102 in the added record so as to indicate the recording area where the part of the content data is stored.

Figure 54:
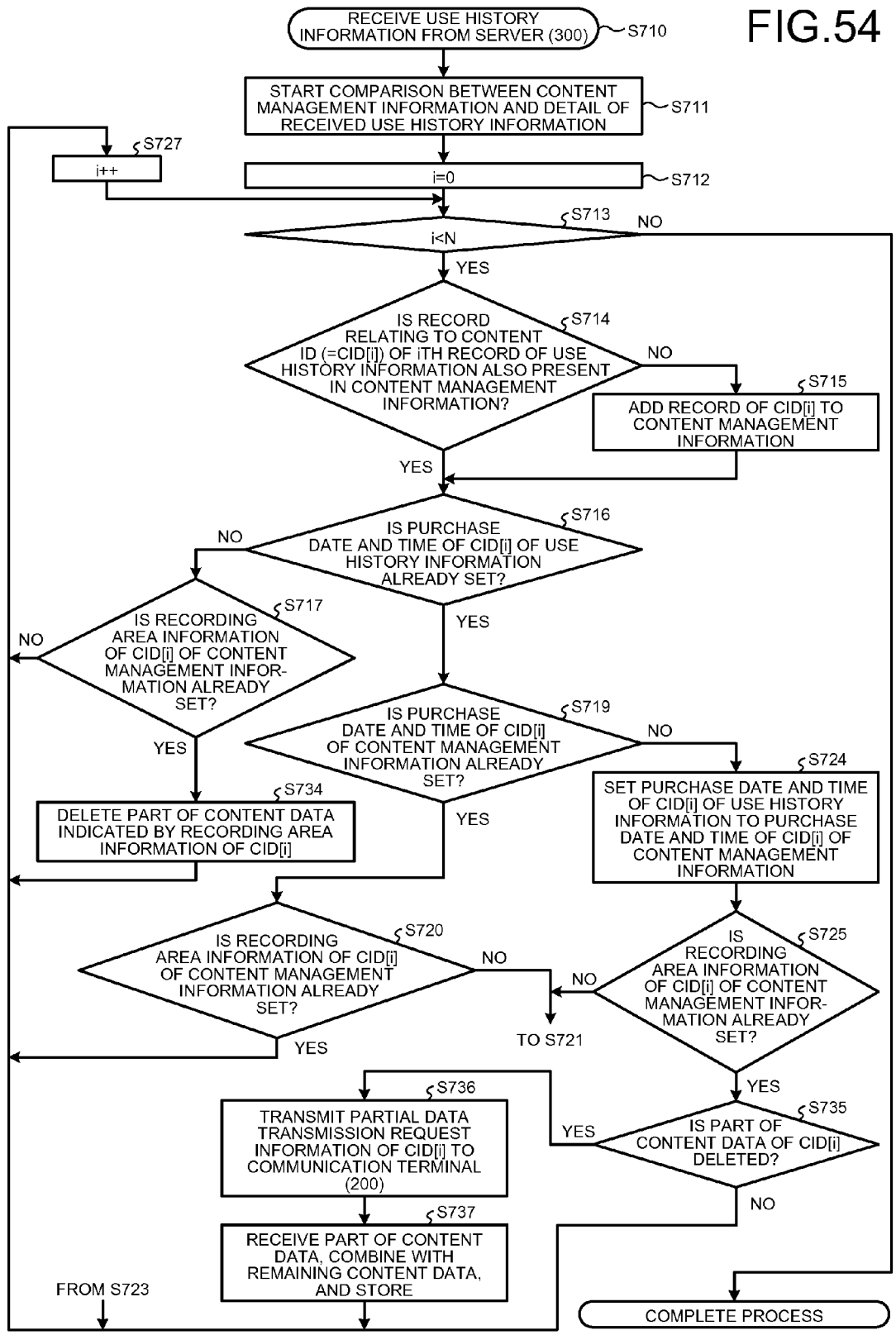
FIG. 54 is a diagram illustrating a process flow of the on-vehicle apparatus upon receiving the use history information in the case of executing the management method by means of splitting content data.

Subsequently, a process of the on-vehicle apparatus 100 upon receiving the use history information will be described with reference to FIG. 54. FIG. 54 is a diagram illustrating a process flow of the on-vehicle apparatus 100 upon receiving the use history information. Hereinafter, the different points from the management method (1) will be described. Note that, in FIG. 54, the illustration of steps S721 to S723 is omitted.

This management method is different from the process upon receiving the formal content data transmission request described with reference to FIG. 44 in that step S734 is executed instead of step S718. Specifically, when the recording area information 1103 of the content management information 1100 is already set (S717: Yes), the control unit 103 deletes a part of the content data stored in the recording area indicated by the recording area information 1103 (S734). Here, the part to be deleted is the part whose copy is transmitted to the communication terminal 200. The control unit 103 then proceeds to step S727 in order to execute the process with respect to the next record.

This management method is also different from the process upon receiving the formal content data transmission request described with reference to FIG. 44 in that steps S735 to S737 are executed instead of steps S726 and S723, when the recording area information 1103 of the content management information 1100 is already set (S725: Yes).

Specifically, when the recording area information 1103 of the content management information 1100 is already set (S725: Yes), the control unit 103 determines whether or not a part of the content data stored in the recording area indicated by the record indicating the content ID indicated by the ith record of the use history information 3200 is already deleted in the content management information 1100 stored in the content recording unit 111 (S735). When the part of the content data is not yet deleted (S735: No), the control unit 103 proceeds to step S727 in order to execute the process with respect to the next record.

When the part of the content data is already deleted (S735: Yes), the control unit 103 generates partial data transmission request information requesting a transmission of the part of the content data of the content ID indicated by the ith record of the use history information 3200. The partial data transmission request information is generated so as to indicate the content ID indicated by the ith record of the use history information 3200. When the content is already purchased, and its content data is stored, but step S734 is executed and the part of the content data is deleted, the determination in step S735 becomes Yes. The control unit 103 transmits the generated partial data transmission request information to the communication terminal 200 via the data input/output unit 101 (S736). Accordingly, the part of the content data of the content ID designated by the partial data transmission request information is transmitted from the communication terminal 200.

The control unit 103 receives the part of the content data transmitted from the communication terminal 200, via the data input/output unit 101. The control unit 103 combines the received part of the content data and the other part of the content data left in the content recording unit 111, thereby restoring the content data. The control unit 103 stores the restored content data in the content recording unit 111 (S737). In this case, the control unit 103 may overwrite the left content data with the restored content data and keep the setting of the recording area information 1103 as is, or the control unit 103 may store the restored content data in a recording area different from the recording area of the left content data and set this recording area in the recording area information 1103. The control unit 103 then proceeds to step S727 in order to execute the process with respect to the next record.

Figure 55:
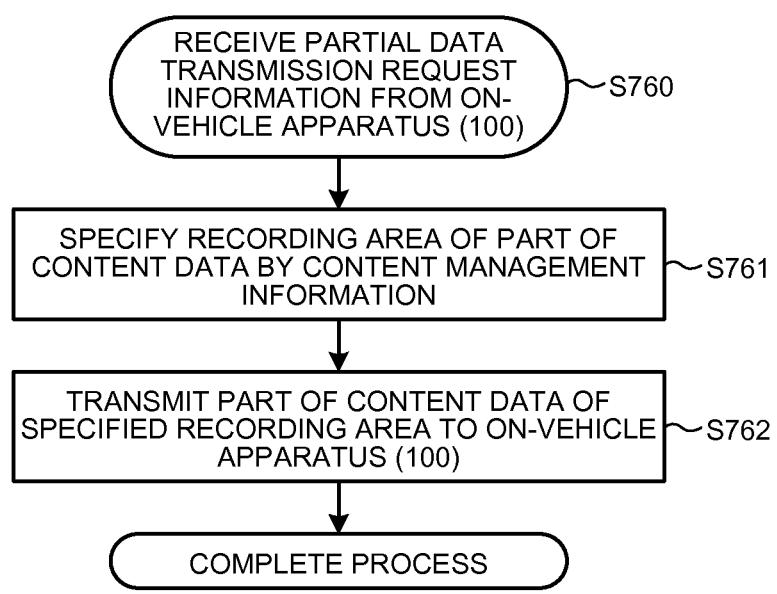
FIG. 55 is a process flow illustrating a process of the communication terminal upon receiving a partial data transmission request in the case of executing the management method by means of splitting content data.

Subsequently, a process of the communication terminal 200 upon receiving the partial data transmission request will be described with reference to FIG. 55. FIG. 55 is a process flow illustrating the process of the communication terminal 200 upon receiving the partial data transmission request.

The control unit 203 receives the partial data transmission request information transmitted from the on-vehicle apparatus 100, via the data input/output unit 201 (S760). The control unit 203 specifies the recording area in which the part of the content data of the content ID indicated by the partial data transmission request information is stored, based on the content management information 2100 stored in the content recording unit 211 (S761). Specifically, the control unit 203 specifies the recording area indicated by the recording area information 2102 in the record including the content ID information 2101 indicating the content ID indicated by the partial data transmission request information, as the recording area in which the part of the content data is stored, in the content management information 2100.

The control unit 203 acquires the part of the content data stored in the specified recording area from the content recording unit 211, and transmits the part of the content data to the on-vehicle apparatus 100 via the data input/output unit 201 (S762).

12. Modification

Subsequently, a modification of the above embodiment will be described. Here, the modification in the case where the above-described "(9) Determination method by means of ACC power source state" is applied as the method of determining the driving end will be described. When detecting an OFF state of an ACC power source, a car navigation system, a car audio, and the like are generally is shut down in order to reduce battery consumption of a vehicle. In this modification, the case where the above-described embodiment is modified to a process suitable for the above-described case will be described as an example. Note that a configuration of an on-vehicle apparatus 100 is similar to that described with reference to FIG. 33 in "(9) Determination method by means of ACC power source state", so that the description will be omitted.

Figure 56:
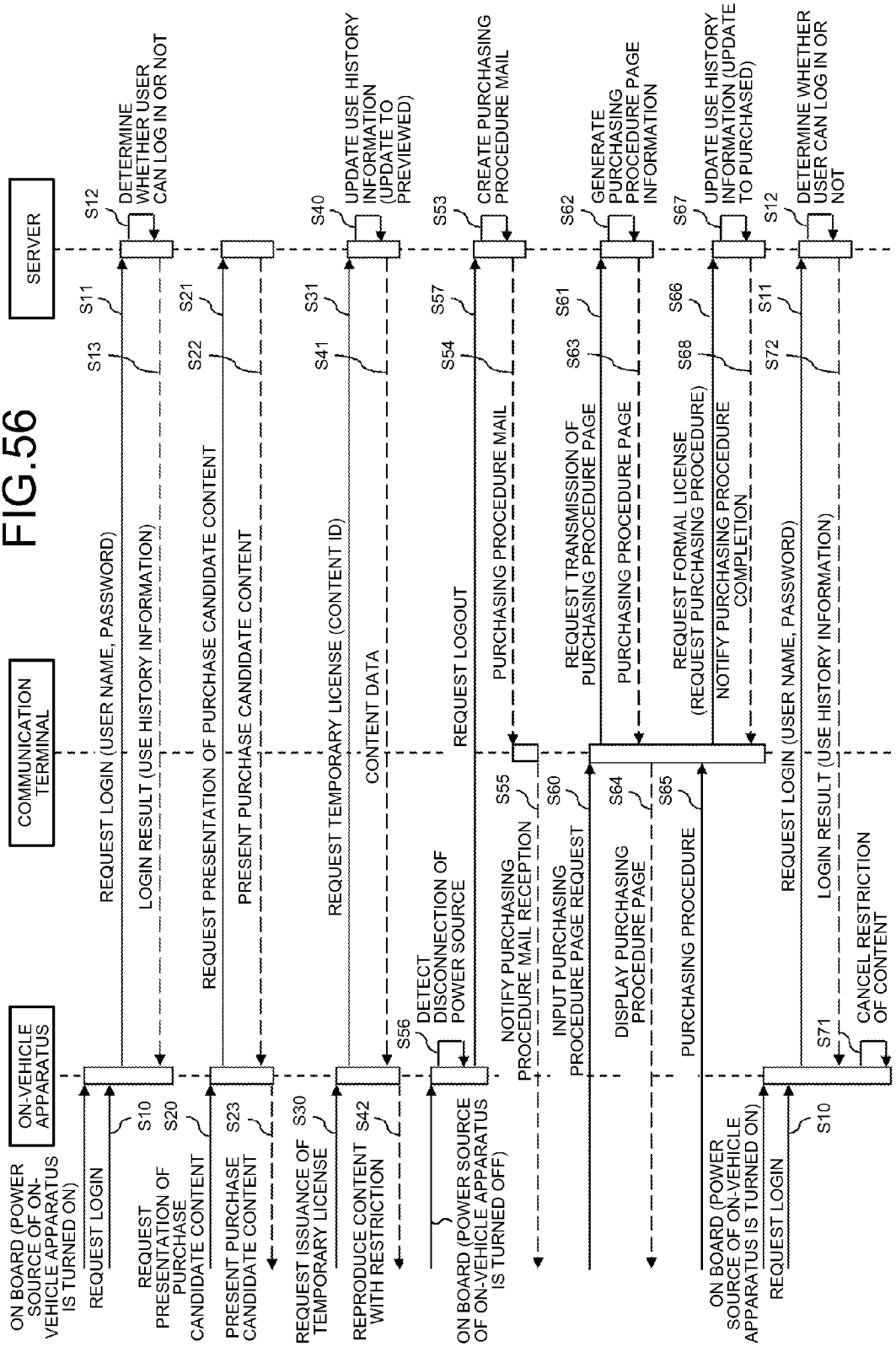
FIG. 56 is a process flow illustrating a process of a content data distribution system according to a modification of the embodiment of the present invention.

A content data distribution system 1 according to the modification of the embodiment of the present invention will be described with reference to FIG. 56. FIG. 56 is a process sequence illustrating the process of the content data distribution system 1 according to the modification of the embodiment of the present invention. Hereinafter, the different points from the process of the content data distribution system 1 described with reference to FIG. 11 will be described.

Step S5

In this modification, when a control unit 103 of the on-vehicle apparatus 100 detects an OFF state of an ACC power source, which becomes a trigger of power source disconnection of the on-vehicle apparatus 100 by the user (S56), the control unit 103 generates logout request information requesting logout, and outputs the generated logout request information to a data input/output unit 101 in step S5. The data input/output unit 101 transmits the logout request information outputted from the control unit 103, to the server 300 (S57). The logout request information corresponds to driving end notification information.

Step S7

In this modification, the ACC power source of the on-vehicle apparatus 100 is turned on by the user, and accordingly the on-vehicle apparatus 100 is turned on and starts up in step S7. After the start-up, the on-vehicle apparatus 100 establishes connection to the Internet in order to enable communication with a server 300. Then, the login processes in steps S10 to S12 are performed as described above.

Here, in this modification, when the server 300 transmits login result notification information indicating successful login, to the on-vehicle apparatus 100, the server 300 transmits the use history information included in the login result notification information to the on-vehicle apparatus 100 (S72).

Figure 57:
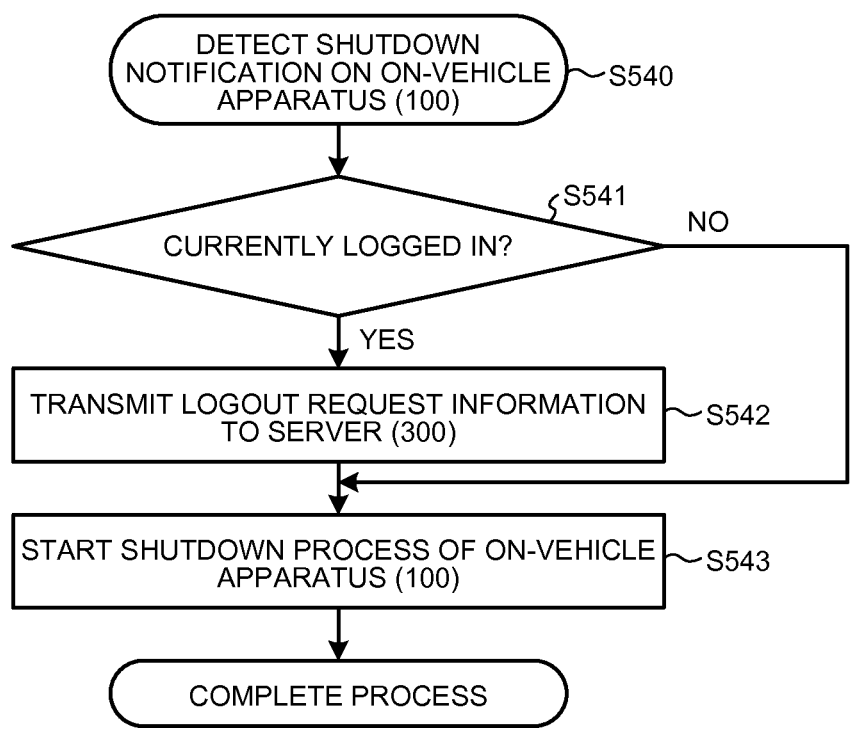
FIG. 57 is a process flow illustrating a process of an on-vehicle apparatus upon detecting shutdown notification according to the modification of the embodiment of the present invention.

Subsequently, a process of the on-vehicle apparatus 100 upon detecting shutdown notification according to the modification of the embodiment of the present invention will be described with reference to FIG. 57. FIG. 57 is a process flow illustrating the process of the on-vehicle apparatus 100 upon detecting the shutdown notification according to the modification of the embodiment of the present invention.

An ACC power source disconnection signal input unit 128 outputs an ACC power source disconnection signal to the control unit 103 as a shutdown notification signal, when the ACC power source is turned off, as described above. According to detection of the shutdown notification signal from the ACC power source disconnection signal input unit 128 (S540), the control unit 103 determines whether or not the on-vehicle apparatus 100 logs in to the server 300 (S541). When determining that the on-vehicle apparatus 100 currently logs in to the server 300 (S541: Yes), the control unit 103 generates logout request information. The control unit 103 transmits the generated logout request information to the server 300 via the data input/output unit 101 (S542).

When determining that the on-vehicle apparatus 100 does not log in to the server 300 (S541: No), and after the execution of the process in step S542, the control unit 103 starts a shutdown process of the on-vehicle apparatus 100 (S543).

Figure 58:
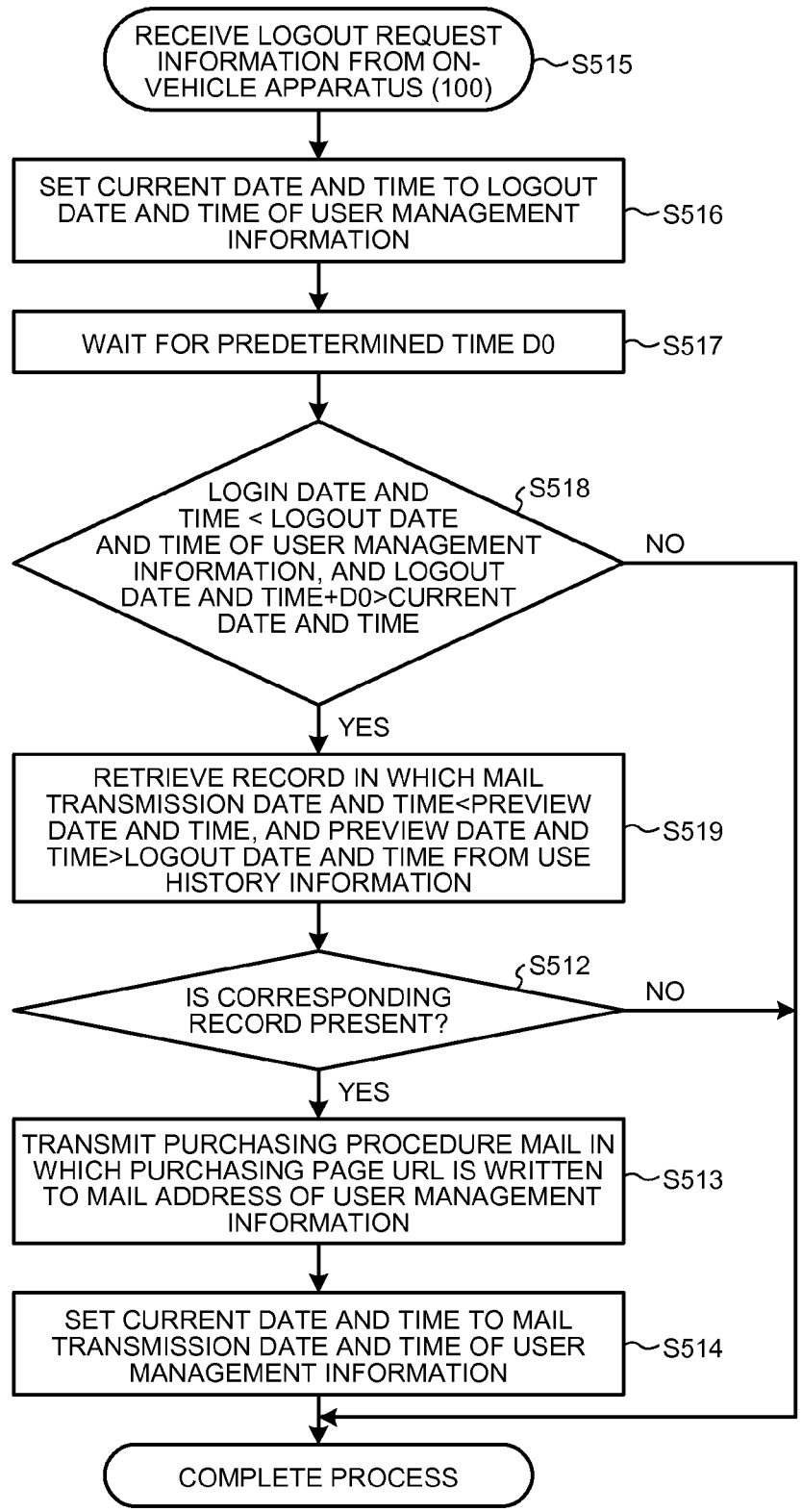
FIG. 58 is a process flow illustrating a process of a server upon receiving a logout request according to the modification of the embodiment of the present invention.

Subsequently, a process of the server 300 upon receiving the logout request will be described with reference to FIG. 58. FIG. 58 is a process flow illustrating the process of the server 300 upon receiving the logout request. Hereinafter, the different points from the process of the server 300 upon receiving the driving end notification described with reference to FIG. 26 will be described below.

A control unit 302 receives the logout request information transmitted from the on-vehicle apparatus 100, via a data input/output unit 301 (S515). According to the reception of the logout request information, the control unit 302 updates a logout date and time indicated by logout date and time information 3305 included in user management information 3300 stored in a user information recording unit 312, so as to indicate the current date and time (S516).

The control unit 302 waits for a predetermined time D0 (S517). After waiting for the predetermined time D0, the control unit 302 determines whether or not a login date and time indicated by login date and time information 3304 is a date and time before the logout date and time indicated by the logout date and time information 3305, and a date and time obtained by adding the predetermined time D0 to the logout date and time indicated by the logout date and time information 3305 is a date and time after the current date and time, in the user management information 3300 (S518). When the login date and time is not a date and time before the logout date and time, or when the date and time obtained by adding the predetermined time D0 to the logout date and time is not a date and time after the current date and time (S518: No), the on-vehicle apparatus 100 logs in again during the predetermined time D0. In this case, the process ends without transmitting a purchasing procedure mail.

When the login date and time is a date and time before the logout date and time, and the date and time obtained by adding the predetermined time D0 to the logout date and time is a date and time after the current date and time (S518: Yes), the control unit 302 retrieves a record including preview date and time information 3202 indicating a preview date and time that becomes a date and time after a mail transmission date and time indicated by mail transmission date and time information 3307 included in the user management information 3300 and becomes a date and time after the logout date and time indicated by the logout date and time information 3305 included in the user management information 3300, from the use history information 3200 stored in the user information recording unit 312 (S519). The processes after step S512 are similar to the processes of the server 300 upon receiving the driving end notification described with reference to FIG. 26, so that the description will be omitted.

According to this process, even when the vehicle travels in a location having a poor radio wave condition, and the login and logout are repeated, the number of the purchasing procedure mails transmitted to the on-vehicle apparatus 100 can be reduced.

Here, the server 300 detects a state where the on-vehicle apparatus 100 cannot transmit the logout request information to the server 300 due to the radio wave condition, and voluntarily executes a logout process (a process upon receiving the logout request). Hereinafter, this process will be described.

Figure 59:
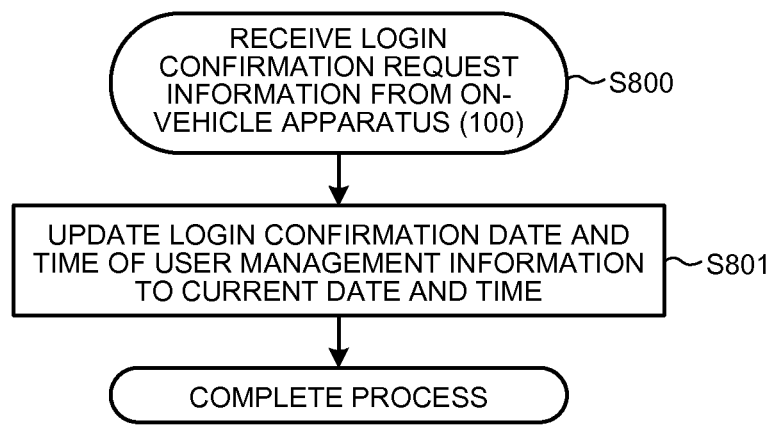
FIG. 59 is a process flow illustrating a process of the server upon receiving login confirmation request information according to the modification of the embodiment of the present invention.

Firstly, a process of the server 300 upon receiving the login confirmation request information will be described with reference to FIG. 59. FIG. 59 is a process flow illustrating the process of the server 300 upon receiving the login confirmation request information. Note that it is supposed that, after logging in to the server 300, the control unit 103 of the on-vehicle apparatus 100 generates the login confirmation request information at each fixed time interval, and transmits the login confirmation request information to the server 300 via the data input/output unit 101.

The control unit 302 receives the login confirmation request information transmitted from the on-vehicle apparatus 100, via the data input/output unit 101 (S800). The control unit 302 updates a login confirmation date and time indicated by login confirmation date and time information 3306 of the user management information 3300 stored in the user information recording unit 312, to the current date and time, according to the reception of the login confirmation request information (S801).

Subsequently, an automatic logout process of the server 300 will be described with reference to FIG. 60. FIG. 60 is a process flow illustrating the automatic logout process of the server 300.

After the completion of the login process (S810), the control unit 302 determines whether or not the login date and time indicated by the login date and time information 3304 is a date and time before the logout date and time indicated by the logout date and time information 3305 in the user management information 3300 (S811). When the login date and time is not a date and time before the logout date and time (S811: No), the control unit 302 ends the process. This is because, in this case, the on-vehicle apparatus 100 is in a logout state, so that login confirmation is unnecessary.

When the login date and time is a date and time before the logout date and time (S811: Yes), the control unit 302 waits for a predetermined time D1 (S812). After waiting for the predetermined time D1, the control unit 302 determines whether or not a date and time obtained by adding D1 to the login confirmation date and time indicated by the login confirmation date and time information 3306 is a date and time before the current date and time in the user management information 3300 (S813). When the date and time obtained by adding D1 to the login confirmation date and time is not a date and time before the current date and time (S813: No), the control unit 302 returns the process to step S811.

When the date and time obtained by adding D1 to the login confirmation date and time is a date and time before the current date and time (S813: Yes), the control unit 302 executes the logout process (S814). Specifically, the process upon receiving the logout request described with reference to FIG. 59 is executed. This is because, in this case, the logout of the on-vehicle apparatus 100 cannot be confirmed during the predetermined time D1.

As described above, in the present embodiment, the on-vehicle apparatus 100 receives content data indicating content that is designated to be purchased, from the server 300 according to an input designating the content to be purchased from the user, and reproduces the content designated to be purchased with restriction based on the received content data. Then, after the purchasing procedure of the content designated to be purchased from the server 300 is completed, the on-vehicle apparatus 100 cancels the restriction in the reproduction of the content designated to be purchased, according to the reception of purchasing procedure completion notification information transmitted from the server 300.

According to the above, the user can use content only by designating content to be purchased. Furthermore, a complicated content purchasing procedure can be performed later in order to cancel the restriction. Therefore, the content to be purchased can promptly be used while safety is maintained.

Note that the present invention is not limited to the above embodiment, and various modifications can be made without departing from the spirit of the present invention.

The above-described embodiment describes the case where the user purchases content such as sound and a moving image, but is not limited thereto. For example, when a product is introduced in broadcast content reproduced by stream data, this product may similarly be presented as a purchase candidate. Then, when the user offers to purchase the product, a purchasing procedure mail thereof is transmitted to the communication terminal 200. According to the above, the missing of a chance to purchase a product can be prevented.

The above-described embodiment describes the case where the on-vehicle apparatus 100 directly transmits and receives data to and from the server 300, but is not limited thereto. The on-vehicle apparatus 100 may transmit and receive data to and from the server 300 by tethering by means of the communication terminal 200. Specifically, the control unit 103 of the on-vehicle apparatus 100 transmits data to the communication terminal 200 via the data input/output unit 102, when transmitting data to the server 300. The control unit 203 of the communication terminal 200 receives the data transmitted from the on-vehicle apparatus 100, via the data input/output unit 201, and transmits the received data to the server 300 via the data input/output unit 202. Then, the control unit 302 of the server 300 receives the data transmitted from the communication terminal 200, via the data input/output unit 301. On the other hand, the control unit 302 of the server 300 transmits data to the on-vehicle apparatus 100 via the data input/output unit 301, when transmitting data to the on-vehicle apparatus 100. The control unit 203 of the communication terminal 200 receives the data transmitted from the server 300, via the data input/output unit 202, and transmits the received data to the on-vehicle apparatus 100 via the data input/output unit 201. Then, the on-vehicle apparatus 100 receives the data transmitted from the communication terminal 200, via the data input/output unit 102.

The on-vehicle apparatus 100, the communication terminal 200, and the server 300 according to the embodiment of the present invention can be configured such that a program realizing the functions of the above-described embodiment is executed by a computer (the on-vehicle apparatus 100, the communication terminal 200, and the server 300) or a processor (a CPU, an MPU (Micro Processing Unit)) included in the computer.

Furthermore, this program can be stored by using various types of non-transitory computer readable mediums, and supplied to the computer. The non-transitory computer readable medium includes various types of tangible storage mediums. Examples of the non-transitory computer readable medium include a magnetic recording medium (e.g., a flexible disk, a magnetic tape, a hard disk drive), an optical magnetic recording medium (e.g., an optical magnetic disk), a CD-ROM (Read Only Memory), a CD-R, a CD-R/W, and a semiconductor memory (e.g., a mask ROM, a PROM (Programmable ROM), an EPROM (Erasable PROM), a flash ROM, a RAM (Random Access Memory)). Furthermore, the program may be supplied to the computer by various types of transitory computer readable mediums. Examples of the transitory computer readable mediums include an electric signal, an optical signal, and an electromagnetic wave. The transitory computer readable medium can supply the program to the computer via a wired communication path such as electric wires and optical fibers, or a wireless communication path.

Furthermore, the embodiment of the present invention includes not only the case where the computer executes the program that realizes the functions of the above-described embodiment and thus the functions of the above-described embodiment are realized, but also the case where this program realizes the functions of the above embodiment in cooperation with an OS (Operating System) or application software running on the computer.

As described above, according to one aspect of the present invention, such an effect is obtained that content to be purchased can easily be used while safety is maintained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A content data distribution system including an on-vehicle apparatus, a communication terminal, and a server, the on-vehicle apparatus includes:
   a first license request input unit configured to receive an input of a first license request to content to be purchased;
   a first license request information generating unit configured to generate first license request information based on the inputted first license request;
   a first license request information transmission unit configured to transmit the first license request information to the server; and
   a content data receiving unit configured to receive content data, to which a first license issued by the server based on the transmitted first license request information is added, from the server, and
   the server includes:
   a first license request information receiving unit configured to receive the first license request information from the on-vehicle apparatus;
   a first license issuing unit configured to issue the first license based on the received first license request information;
   a content data transmission unit configured to transmit content data, to which the issued first license is added, to the on-vehicle apparatus;
   a driving end notification information receiving/generating unit configured to receive or generate driving end notification information indicating that driving of a vehicle having the on-vehicle apparatus mounted thereon is ended;
   a second license request demanding information generating unit configured to generate second license request demanding information for demanding a second license request based on the driving end notification information;
   a second license request demanding information transmission unit configured to transmit the generated second license request demanding information to the communication terminal;
   a second license request information receiving unit configured to receive second license request information; and
   a second license issuing unit configured to issue a second license to the content data based on the received second license request information, wherein one of the on-vehicle apparatus and the communication terminal includes:
   a second license request demanding information receiving unit configured to receive the second license request demanding information from the server;
   a second license request input unit configured to receive an input of a second license request based on presentation according to the received second license request demanding information;
   a second license request information generating unit configured to generate second license request information based on the inputted second license request;
   a second license request information transmission unit configured to transmit the generated second license request information to the server;
   a driving end notification information generating unit configured to generate the driving end notification information based on determination that the driving of the vehicle having the on-vehicle apparatus mounted thereon is ended; and
   a driving end notification information transmission unit configured to transmit the generated driving end notification information to the server, and wherein
   a number of times of the input of the first license request is less than a number of times of the input of the second license request.

2. The content data distribution system according to claim 1, wherein the input of the first license request is a sound input.

3. The content data distribution system according to claim 1, wherein the input of the first license request and the input of the second license request are manual input, and the number of times of input of the first license request is less than the number of times of input of the second license request.

* * * * *